(12) United States Patent
Kumar et al.

(10) Patent No.: US 10,710,119 B2
(45) Date of Patent: Jul. 14, 2020

(54) MATERIAL SORTING USING A VISION SYSTEM

(71) Applicant: UHV Technologies, Inc., Fort Worth, TX (US)

(72) Inventors: Nalin Kumar, Fort Worth, TX (US); Manuel Gerardo Garcia, Jr., Lexington, KY (US); Kanishka Tyagi, Meerut (IN)

(73) Assignee: UHV Technologies, Inc., Fort Worth, TX (US)

( * ) Notice: Subject to any disclaimer, the term of this patent is extended or adjusted under 35 U.S.C. 154(b) by 29 days.

(21) Appl. No.: 15/963,755

(22) Filed: Apr. 26, 2018

(65) Prior Publication Data

US 2018/0243800 A1     Aug. 30, 2018

Related U.S. Application Data

(63) Continuation-in-part of application No. 15/213,129, filed on Jul. 18, 2016, now Pat. No. 10,207,296.

(60) Provisional application No. 62/490,219, filed on Apr. 26, 2017.

(51) Int. Cl.
*B07C 5/34* (2006.01)
*B07C 5/342* (2006.01)
(Continued)

(52) U.S. Cl.
CPC .......... *B07C 5/3416* (2013.01); *B07C 5/3422* (2013.01); *G01N 23/223* (2013.01);
(Continued)

(58) Field of Classification Search
CPC ..... B07C 5/3416; B07C 5/3422; B07C 5/368; B07C 2501/0054; G01N 23/223; G06N 3/08
See application file for complete search history.

(56) References Cited

U.S. PATENT DOCUMENTS 2,194,381 A    9/1937  Cadman
2,417,878 A    2/1944  Luzietti et al.
(Continued)

FOREIGN PATENT DOCUMENTS

CA    2893877       12/2015
CN    200953004     9/2007
(Continued)

OTHER PUBLICATIONS

International Alloy Designations and Chemical Composition Limits for Wrought Aluminum and Wrought Aluminum Alloys, the Aluminum Association, Inc., revised Jan. 2015, 38 pages.
(Continued)

*Primary Examiner* — Charles A Fox
*Assistant Examiner* — Kalyanavenkateshware Kumar
(74) *Attorney, Agent, or Firm* — Matheson Keys & Kordzik PLLC; Kelly Kordzik

(57) ABSTRACT

A material sorting system sorts materials utilizing a vision system that implements a machine learning system in order to identify or classify each of the materials, which are then sorted into separate groups based on such an identification or classification. The material sorting system may include an x-ray fluorescence system to perform a classification of the materials in combination with the vision system, whereby the classification efforts of the vision system and x-ray fluorescence system are combined in order to classify and sort the materials.

20 Claims, 40 Drawing Sheets

(51) Int. Cl.
*G06N 3/08* (2006.01)
*G01N 23/223* (2006.01)
*G06N 20/00* (2019.01)
*B07C 5/36* (2006.01)

(52) U.S. Cl.
CPC .............. *G06N 3/08* (2013.01); *G06N 20/00* (2019.01); *B07C 5/368* (2013.01); *B07C 2501/0054* (2013.01); *G01N 2223/643* (2013.01)

(56) References Cited

U.S. PATENT DOCUMENTS

| | | |
|---|---|---|
| 2,942,792 A | 7/1957 | Anderson et al. |
| 2,953,554 A | 9/1960 | Miller et al. |
| 3,512,638 A | 5/1970 | Chengges et al. |
| 3,662,874 A | 5/1972 | Muller |
| 3,791,518 A | 2/1974 | Vanderhoof |
| 3,955,678 A | 5/1976 | Moyer |
| 3,973,736 A | 8/1976 | Nilsson |
| 3,974,909 A | 8/1976 | Johnson |
| 4,004,681 A | 1/1977 | Clewett et al. |
| 4,031,998 A | 6/1977 | Suzuki et al. |
| 4,044,897 A | 8/1977 | Maxted |
| 4,253,154 A | 2/1981 | Russ et al. |
| 4,317,521 A | 3/1982 | Clark et al. |
| 4,413,721 A | 11/1983 | Bollier |
| 4,488,610 A | 12/1984 | Yankloski |
| 4,572,735 A | 12/1986 | Poetzschke et al. |
| 4,726,464 A | 2/1988 | Canziani |
| 4,834,870 A | 5/1989 | Osterberg et al. |
| 4,848,590 A | 7/1989 | Kelly |
| 5,054,601 A | 10/1991 | Sjogren et al. |
| 5,114,230 A | 5/1992 | Pryor |
| 5,236,092 A | 8/1993 | Krotkov et al. |
| 5,260,576 A | 11/1993 | Sommer, Jr. et al. |
| 5,410,637 A | 4/1995 | Kern et al. |
| 5,433,311 A | 7/1995 | Bonnet |
| 5,462,172 A | 10/1995 | Kumagai et al. |
| 5,570,773 A | 11/1996 | Bonnet |
| 5,663,997 A | 9/1997 | Willis et al. |
| 5,676,256 A | 10/1997 | Kumar et al. |
| 5,738,224 A | 4/1998 | Sommer, Jr. et al. |
| 5,836,436 A | 11/1998 | Fortenbery et al. |
| 5,911,327 A | 6/1999 | Tanaka et al. |
| 6,076,653 A | 6/2000 | Bonnet |
| 6,100,487 A | 8/2000 | Schultz et al. |
| 6,148,990 A | 11/2000 | Lapeyre et al. |
| 6,266,390 B1 | 7/2001 | Sommer, Jr. et al. |
| 6,273,268 B1 | 8/2001 | Axmann |
| 6,313,422 B1 | 11/2001 | Anibas |
| 6,412,642 B2 | 7/2002 | Charles et al. |
| 6,457,859 B1 | 10/2002 | Lu et al. |
| 6,519,315 B2 | 2/2003 | Sommer, Jr. et al. |
| 6,795,179 B2 | 9/2004 | Kumar |
| 6,888,917 B2 | 5/2005 | Sommer, Jr. et al. |
| 6,983,035 B2 | 1/2006 | Price et al. |
| 7,073,651 B2 | 7/2006 | Costanzo et al. |
| 7,099,433 B2 | 8/2006 | Sommer et al. |
| 7,200,200 B2 | 4/2007 | Laurila et al. |
| 7,341,154 B2 | 3/2008 | Boer |
| 7,564,943 B2 | 7/2009 | Sommer, Jr. et al. |
| 7,616,733 B2 | 11/2009 | Sommer et al. |
| 7,674,994 B1 | 3/2010 | Valerio |
| 7,763,820 B1 | 7/2010 | Sommer, Jr. et al. |
| 7,848,484 B2 | 12/2010 | Sommer, Jr. et al. |
| 7,886,915 B2 | 2/2011 | Shulman |
| 7,903,789 B2 | 3/2011 | Morton et al. |
| 7,978,814 B2 | 7/2011 | Sommer et al. |
| 7,991,109 B2 | 8/2011 | Golenhofen |
| 8,073,099 B2 | 12/2011 | Niu et al. |
| 8,144,831 B2 | 3/2012 | Sommer, Jr. et al. |
| 8,172,069 B2 | 5/2012 | Prakasam |
| 8,429,103 B1 | 4/2013 | Aradhye et al. |
| 8,433,121 B2 | 4/2013 | Kosarev |
| 8,476,545 B2 | 7/2013 | Sommer et al. |
| 8,553,838 B2 | 10/2013 | Sommer et al. |
| 8,567,587 B2 | 10/2013 | Faist et al. |
| 8,576,988 B2 | 11/2013 | Lewalter et al. |
| 8,654,919 B2 | 2/2014 | Sabol et al. |
| 8,855,809 B2 | 10/2014 | Spencer et al. |
| 8,903,040 B2 | 12/2014 | Maeyama et al. |
| 9,785,851 B1 | 10/2017 | Torek et al. |
| 2003/0038064 A1 | 2/2003 | Harbeck et al. |
| 2003/0147494 A1 | 8/2003 | Sommer, Jr. et al. |
| 2004/0151364 A1 | 8/2004 | Kenneway et al. |
| 2006/0239401 A1 | 10/2006 | Sommer, Jr. et al. |
| 2008/0029445 A1 | 2/2008 | Russcher et al. |
| 2008/0257795 A1 | 10/2008 | Shuttleworth |
| 2010/0017020 A1 | 1/2010 | Hubbard-Nelson et al. |
| 2010/0195795 A1 | 8/2010 | Golenhofen |
| 2010/0264070 A1 | 10/2010 | Sommer, Jr. et al. |
| 2010/0282646 A1 | 11/2010 | Looy et al. |
| 2012/0148018 A1 | 6/2012 | Sommer, Jr. et al. |
| 2012/0288058 A1 | 11/2012 | Maeyama et al. |
| 2013/0028487 A1 | 1/2013 | Stager et al. |
| 2013/0079918 A1 | 3/2013 | Spencer et al. |
| 2013/0092609 A1 | 4/2013 | Andersen |
| 2013/0264249 A1* | 10/2013 | Sommer, Jr. ............ B07C 5/346 209/589 |
| 2013/0304254 A1 | 11/2013 | Torek et al. |
| 2015/0092922 A1 | 4/2015 | Liu et al. |
| 2015/0170024 A1 | 6/2015 | Chatterjee et al. |
| 2015/0336135 A1* | 11/2015 | Corak .................... B07C 5/367 800/320.1 |
| 2016/0299091 A1 | 10/2016 | Bamber et al. |
| 2017/0014868 A1 | 1/2017 | Kumar et al. |

FOREIGN PATENT DOCUMENTS

| | | |
|---|---|---|
| CN | 201440132 | 4/2010 |
| CN | 201464390 | 5/2010 |
| CN | 101776620 A | 7/2010 |
| CN | 201552461 | 7/2010 |
| CN | 103745901 | 4/2014 |
| CN | 10177620 B | 6/2014 |
| CN | 103955707 | 7/2014 |
| CN | 203688493 | 7/2014 |
| CN | 204359695 | 5/2015 |
| CN | 204495749 | 7/2015 |
| CN | 204537711 | 8/2015 |
| CN | 204575572 | 8/2015 |
| DE | 202009006383 U1 | 9/2009 |
| EP | 0011892 | 11/1983 |
| EP | 0074447 | 1/1987 |
| EP | 0433828 A2 | 12/1990 |
| EP | 0351778 B1 | 10/1993 |
| EP | 2243089 A1 | 10/2010 |
| JP | 5083196 | 11/2012 |
| RU | 2004101401 | 2/2005 |
| RU | 2006136756 | 4/2008 |
| RU | 2339974 | 11/2008 |
| RU | 2361194 | 7/2009 |
| WO | 2001/022072 | 3/2001 |
| WO | 2001/022072 A1 | 3/2001 |
| WO | 2009/039284 | 3/2009 |
| WO | 2011/159269 | 12/2011 |
| WO | 2012/094568 A2 | 7/2012 |
| WO | 2013/033572 | 3/2013 |
| WO | WO 2013/180922 | 12/2013 |
| WO | 2015/195988 | 12/2015 |
| WO | 2016/199074 | 12/2016 |
| WO | 2017/001438 | 1/2017 |

OTHER PUBLICATIONS

International Searching Authority, International Search Report and the Written Opinion, International Application No. PCT/US2016/042850, dated Sep. 28, 2016.

P. R. Schwoebel et al., "Studies of a prototype linear stationary x-ray source for tomosynthesis imaging," Phys. Med Biol. 59, pp. 2393-2413, Apr. 17, 2014.

(56) References Cited

OTHER PUBLICATIONS

R. Sitko et al., "Quantification in X-Ray Fluorescence Spectrometry," X-Ray Spectroscopy, Dr. Shatendra K Sharma (Ed.), ISBN: 978-953-307-967-7, InTech, 2012, pp. 137-163; Available from: http://www.intechopen.com/books/x-ray-spectroscopy/quantification-in-x-ray-fluorescence-spectrometry.
Scrap Specifications Circular, Institute of Scrap Recycling Industries, Inc., effective Jan. 21, 2016, 58 pages.
U.S. Appl. No. 15/213,129, filed Jul. 18, 2016.
The International Bureau of WIPO, International Preliminary Report on Patentability, International Application No. PCT/US2016/42850, dated Jan. 25, 2018.
A. Lee, "Comparing Deep Neural Networks and Traditional Vision Algorithms in Mobile Robotics," Swarthmore College, 9 pages, downloaded from Internet on May 1, 2018.
C. K. Lowe et al., "Data Mining With Different Types of X-Ray Data," JCPDS—International Centre for Diffraction Data 2006, ISSN 1097-0002, pp. 315-321.
M. Razzak et al., "Deep Learning for Medical Image Processing: Overview, Challenges and Future," 30 pages, downloaded from Internet on May 1, 2018.
J. Schmidhuber et al., "Deep Learning in Neural Networks: An Overview," The Swiss AI Lab IDSIA, Technical Report IDSIA-03-14/arXiv:1404.7828 v4 [cs.NE], Oct. 8, 2014, 88 pages.
M. Singh et al., "Transforming Sensor Data to the Image Domain for Deep Learning—an Application to Footstep Detection," International Joint Conference on Neural Networks, Anchorage, Alaska, 8 pages, May 14-19, 2017.
K. Tarbell et al., "Applying Machine Learning to the Sorting of Recyclable Containers," University of Illinois at Urbana-Champaign, Urbana, Illinois, 7 pages, downloaded from Internet on May 1, 2018.
Wikipedia, Convolutional neural network, 18 pages https://en.wikipedia.org/w/index.php?title=Convolutional_neural_network, downloaded from Internet on May 1, 2018.
Wikipedia, TensorFlow, 4 pages https://en.wikipedia.org/w/index.php?title=TensorFlow&oldid=835761390, downloaded from Internet on May 1, 2018.
The United States Patent and Trademark Office, Non-Final Office Action, U.S. Appl. No. 15/213,129, dated Oct. 6, 2017.
International Searching Authority, International Search Report and the Written Opinion, International Application No. PCT/US2018/029640, dated Jul. 23, 2018.
European Patent Office; Extended Search Report for 16825313.6; dated Jan. 28, 2019; 12 pages; Munich, DE.

\* cited by examiner

|  | Si | Fe | Cu | Mn | Mg | Cr | Ni | Zn | Ti | Ag | B | Others | | Al Remainder |
|---|---|---|---|---|---|---|---|---|---|---|---|---|---|---|
|  |  |  |  |  |  |  |  |  |  |  |  | Each | Total |  |
| 6013 | 0.6-1.0 | 0.5 | 0.6-1.1 | 0.20-0.8 | 0.8-1.2 | 0.1 | ... | 0.25 | 0.1 | ... | ... | 0.05 | 0.15 | Remainder |
| 6022 | 0.8-1.5 | 0.05-0.2 | 0.01-0.11 | 0.02-0.10 | 0.45-0.7 | 0.1 | ... | 0.25 | 0.15 | 0.25 | 0.15 | 0.05 | 0.15 | Remainder |
| 6061 | 0.4-0.8 | 0.7 | 0.15-0.4 | 0.15 | 0.8-1.2 | 0.04-0.35 | ... | 0.25 | 0.15 | 0.25 | 0.15 | 0.05 | 0.15 | Remainder |

FIG. 23

| Sample | ECS |
|---|---|
| Mg | 0.00 |
| Al | 0.41 |
| Si | 0.00 |
| Ti | 0.01 |
| Cr | 0.00 |
| Mn | 0.10 |
| Fe | 0.12 |
| Cu | 0.36 |
| Zn | 0.00 |

| 6013 | ECS Signature | | Error |
|---|---|---|---|
| | ECS | | |
| Mg | 0.00 | +/− | 0.03 |
| Al | 0.40 | +/− | 0.05 |
| Si | 0.00 | +/− | 0.03 |
| Ti | 0.01 | +/− | 0.03 |
| Cr | 0.00 | +/− | 0.03 |
| Mn | 0.09 | +/− | 0.05 |
| Fe | 0.11 | +/− | 0.05 |
| Cu | 0.35 | +/− | 0.05 |
| Zn | 0.00 | +/− | 0 |

| 6022 | ECS Signature | | Error |
|---|---|---|---|
| | ECS | | |
| Mg | 0.00 | +/− | 0.03 |
| Al | 0.78 | +/− | 0.05 |
| Si | 0.00 | +/− | 0.03 |
| Ti | 0.00 | +/− | 0.03 |
| Cr | 0.00 | +/− | 0.03 |
| Mn | 0.04 | +/− | 0.05 |
| Fe | 0.11 | +/− | 0.05 |
| Cu | 0.05 | +/− | 0.05 |
| Zn | 0.01 | +/− | 0 |

FIG. 29

| 5086 Normalized Vector | 5086 Normalized Vector | Multiplied Components |
|---|---|---|
| 0.002319058 | 0.002319058 | 5.37803E-06 |
| 0.892558928 | 0.892558928 | 0.79666144 |
| 0.000649336 | 0.000649336 | 4.21637E-07 |
| 0 | 0 | 0 |
| 0.035296058 | 0.035296058 | 0.001245812 |
| 0.33116144 | 0.33116144 | 0.109667899 |
| 0.287841442 | 0.287841442 | 0.082852696 |
| 0.075369375 | 0.075369375 | 0.005680543 |
| 0.062336271 | 0.062336271 | 0.003885811 |

Dot Product   1

| 5086 Normalized Vector | 5052 Normalized Vector | Multiplied Components |
|---|---|---|
| 0.002319058 | 0 | 0 |
| 0.892558928 | 0.968282127 | 0.864248857 |
| 0.000649336 | 0 | 0 |
| 0 | 0.002808847 | 0 |
| 0.035296058 | 0.127122989 | 0.00448694 |
| 0.33116144 | 0.069133885 | 0.022894477 |
| 0.287841442 | 0.200968489 | 0.05784706 |
| 0.075369375 | 0 | 0 |
| 0.062336271 | 0.033071911 | 0.00206158 |

Dot Product   0.951538914

FIG. 30

| 5086 Normalized Vector | 5182 Normalized Vector | Multiplied Components |
|---|---|---|
| 0.002319058 | 0 | 0 |
| 0.892558928 | 0.910268527 | 0.8124683 |
| 0.000649336 | 0.00142185 | 9.23259E-07 |
| 0 | 0 | 0 |
| 0.035296058 | 0 | 0 |
| 0.331116144 | 0.306171753 | 0.101392278 |
| 0.287841442 | 0.271241632 | 0.0780074582 |
| 0.0753369375 | 0.0071109251 | 0.00053582 |
| 0.0623336271 | 0.06304101 | 0.003964842 |

Dot Product 0.996436747

| 5086 Normalized Vector | 5454 Normalized Vector | Multiplied Components |
|---|---|---|
| 0.002319058 | 0.011960463 | 2.76075E-6 |
| 0.892558928 | 0.806218084 | 0.719597149 |
| 0.000649336 | 0004899213 | 3.18124E-6 |
| 0 | 0.00293037 | 0 |
| 0.035296058 | 0.020466804 | 0.000722398 |
| 0.331116144 | 0.489097091 | 0.161970097 |
| 0.287841442 | 0.328064094 | 0.094430442 |
| 0.0753369375 | 0.028937405 | 0.002180994 |
| 0.0623336271 | 0.043360321 | 0.002702921 |

Dot Product 0.981609942

FIG. 31

| 5052 | Net Counts | ECS |
|---|---|---|
| Mg | 0 | 0.00 |
| Al | 21373 | 0.69 |
| Si | 0 | 0.00 |
| Ti | 62 | 0.00 |
| Cr | 2806 | 0.09 |
| Mn | 1526 | 0.05 |
| Fe | 4436 | 0.14 |
| Cu | 0 | 0.00 |
| Zn | 730 | 0.02 |

| 5086 | Net Counts | ECS |
|---|---|---|
| Mg | 50 | 0.00 |
| Al | 19244 | 0.53 |
| Si | 14 | 0.00 |
| Ti | 0 | 0.00 |
| Cr | 761 | 0.02 |
| Mn | 7140 | 0.20 |
| Fe | 6206 | 0.17 |
| Cu | 1625 | 0.04 |
| Zn | 1344 | 0.04 |

| 5182 | Net Counts | ECS |
|---|---|---|
| Mg | 0 | 0.00 |
| Al | 19206 | 0.58 |
| Si | 30 | 0.00 |
| Ti | 0 | 0.00 |
| Cr | 0 | 0.00 |
| Mn | 6460 | 0.20 |
| Fe | 5723 | 0.17 |
| Cu | 150 | 0.00 |
| Zn | 1342 | 0.04 |

| 5454 | Net Counts | ECS |
|---|---|---|
| Mg | 26 | 0.00 |
| Al | 17608 | 0.47 |
| Si | 107 | 0.00 |
| Ti | 64 | 0.00 |
| Cr | 447 | 0.01 |
| Mn | 10682 | 0.28 |
| Fe | 7165 | 0.19 |
| Cu | 632 | 0.02 |
| Zn | 947 | 0.03 |

FIG. 32

| ECS 5052 | Value | | Error |
|---|---|---|---|
| Mg | 0.00 | ± | 0.02 |
| Al | 0.69 | ± | 0.02 |
| Si | 0.00 | ± | 0.02 |
| Ti | 0.00 | ± | 0.02 |
| Cr | 0.09 | ± | 0.02 |
| Mn | 0.05 | ± | 0.02 |
| Fe | 0.14 | ± | 0.02 |
| Cu | 0.00 | ± | 0.01 |
| Zn | 0.02 | ± | 0.02 |

| ECS 5086 | Value | | Error |
|---|---|---|---|
| Mg | 0.00 | ± | 0.02 |
| Al | 0.53 | ± | 0.02 |
| Si | 0.00 | ± | 0.02 |
| Ti | 0.00 | ± | 0.02 |
| Cr | 0.02 | ± | 0.02 |
| Mn | 0.20 | ± | 0.02 |
| Fe | 0.17 | ± | 0.02 |
| Cu | 0.04 | ± | 0.01 |
| Zn | 0.04 | ± | 0.02 |

| ECS 5182 | Value | | Error |
|---|---|---|---|
| Mg | 0.00 | ± | 0.02 |
| Al | 0.58 | ± | 0.02 |
| Si | 0.00 | ± | 0.02 |
| Ti | 0.00 | ± | 0.02 |
| Cr | 0.00 | ± | 0.02 |
| Mn | 0.20 | ± | 0.02 |
| Fe | 0.17 | ± | 0.02 |
| Cu | 0.00 | ± | 0.01 |
| Zn | 0.04 | ± | 0.02 |

| ECS 5454 | Value | | Error |
|---|---|---|---|
| Mg | 0.00 | ± | 0.02 |
| Al | 0.47 | ± | 0.02 |
| Si | 0.00 | ± | 0.02 |
| Ti | 0.00 | ± | 0.02 |
| Cr | 0.01 | ± | 0.02 |
| Mn | 0.28 | ± | 0.02 |
| Fe | 0.19 | ± | 0.02 |
| Cu | 0.02 | ± | 0.01 |
| Zn | 0.03 | ± | 0.02 |

FIG. 33

MATERIAL SORTING USING A VISION SYSTEM

This application claims priority to U.S. Provisional Patent Application Ser. No. 62/490,219, which is hereby incorporated by reference herein. This application is a continuation-in-part of U.S. patent application Ser. No. 15/213,129, which is hereby incorporated by reference herein.

GOVERNMENT LICENSE RIGHTS

This disclosure was made with U.S. government support under Grant No. DE-AR0000422 awarded by the U.S. Department of Energy. The U.S. government may have certain rights in this disclosure.

TECHNOLOGY FIELD

The present disclosure relates in general to the sorting of materials, and in particular, to the sorting of pieces of materials (by composition) in a stream of materials moving along a conveyor system.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Recycling is the process of collecting and processing materials that would otherwise be thrown away as trash, and turning them into new products. Recycling has benefits for communities and for the environment, since it reduces the amount of waste sent to landfills and incinerators, conserves natural resources such as timber, water, and minerals, increases economic security by tapping a domestic source of materials, prevents pollution by reducing the need to collect new raw materials, and saves energy. After collection, recyclables are generally sent to a material recovery facility to be sorted, cleaned, and processed into materials that can be used in manufacturing. As a result, high throughput automated sorting platforms that economically sort highly mixed waste streams would be beneficial throughout various industries. Thus, there is a need for cost-effective sorting platforms that can identify, analyze, and separate mixed industrial or municipal waste streams with high throughput to economically generate higher quality feedstocks (which may also include lower levels of trace contaminants) for subsequent processing. Typically, material recovery facilities are either unable to discriminate between many materials, which limits the scrap to lower quality and lower value markets, or too slow, labor intensive, and inefficient, which limits the amount of material that can be economically recycled or recovered.

Moreover, high throughput technologies for improving liberation of complex scrap/joint streams are needed for all material classes. For example, consumer products often contain both metals and plastics, but with today's technologies, they cannot be effectively and economically recycled for several reasons, including that there are no existing technologies that can rapidly sort these materials for subsequent recovery and processing. Additionally, recycled paper streams (fibers) are often contaminated with ink, adhesives, glass, wood, plastic, shards, flexible films, and organics causing down-grading of waste paper and cardstock. Current sorting processes do not include contaminate removal steps, and contaminated secondary material flows limit the markets and value of the fiber products. Therefore, solutions are needed that can more effectively identify and remove glass, food, and contaminants from paper feedstocks.

In the case of recycling of electronic waste ("e-waste"), separations are generally physical for plastics and chemical for materials. To increase domestic recycling of such e-waste, high throughput approaches for separating e-waste for metals and plastics are needed which are both energy efficient and cost-effective. Additionally, existing sorting technologies have a very limited capability to separate plastics with similar densities. Such complex streams may include both joined and un-joined materials (e.g., plastics, e-waste, auto, etc.). Therefore, more energy-efficient processing methodologies that enable high-resolution sorting of specific complex mixed material streams are needed.

And, there are very few, if any, cost and energy effective recycling technologies for low value waste plastics. As a result, such low value plastics (e.g., carpets and carpet residues, tires, tennis shoes, etc.) have no effective material recovery path. Therefore, technologies for cost-effective and more energy efficient sorting of such low value plastics are needed to generate high value and high purity feedstocks from polymers (carpets, residues, etc.) and natural fibers (cotton/other cellulosic materials).

Scrap metals are often shredded, and thus require sorting to facilitate reuse of the metals. By sorting the scrap metals, metal is reused that may otherwise go to a landfill. Additionally, use of sorted scrap metal leads to reduced pollution and emissions in comparison to refining virgin feedstock from ore. Scrap metals may be used in place of virgin feedstock by manufacturers if the quality of the sorted metal meets certain standards. The scrap metals may include types of ferrous and nonferrous metals, heavy metals, high value metals such as nickel or titanium, cast or wrought metals, and other various alloys.

Wrought scrap can contain a mixture of wrought alloys. The mixed wrought scrap has limited value because the mixture, due to its combined chemical composition, must be diluted if used to produce a new wrought alloy. The reason this is so is due to the more stringent compositional tolerances of wrought alloys, which are required to meet the performance requirements of wrought products. High quality scrap should have a high absorption back into the recycled product. High absorption means that a substantial portion of the final product is composed of scrap. To increase the value of the wrought scrap requires the separation of wrought product into alloy grades or similar constituted materials to maximize absorption. Absorption is defined as the percentage of an alloy or mixture that can be used to produce an ingot of another desired composition without exceeding the specified alloy composition limits. Mixed alloy scrap presents some difficult problems in separability due to its poor absorption into high quality wrought alloys. Mixed alloy scrap has poor absorption into high quality wrought alloys, and as a result, only limited amounts of mixed scrap can be used for recycling into wrought products.

The recycling of aluminum scrap is a very attractive proposition in that up to 95% of the energy costs associated with manufacturing can be saved when compared with the laborious extraction of the more costly primary aluminum. Primary aluminum is defined as aluminum originating from aluminum-enriched ore, such as bauxite. At the same time, the demand for aluminum is steadily increasing in markets, such as car manufacturing, because of its lightweight properties. Correspondingly, it is particularly desirable to efficiently separate aluminum scrap metals into alloy families, since mixed aluminum scrap of the same alloy family is worth much more than that of indiscriminately mixed alloys. For example, in the blending methods used to recycle aluminum, any quantity of scrap composed of similar, or the same, alloys and of consistent quality, has more value than scrap consisting of mixed aluminum alloys. Within such aluminum alloys, aluminum will always be the bulk of the material. However, constituents such as copper, magnesium, silicon, iron, chromium, zinc, manganese, and other alloy elements provide a range of properties to alloyed aluminum and provide a means to distinguish one wrought alloy from the other.

The Aluminum Association is the authority that defines the allowable limits for aluminum alloy chemical composition. The data for the alloy chemical compositions is published by the Aluminum Association in "International Alloy Designations and Chemical Composition Limits for Wrought Aluminum and Wrought Aluminum Alloys," which was updated in January 2015, and which is incorporated by reference herein. The Aluminum Association also has a similar document for cast alloys. In general, according to the Aluminum Association, the 1000 series of aluminum alloys is composed essentially of pure aluminum with a minimum 99% aluminum content by weight; the 2000 series is aluminum principally alloyed with copper; the 3000 series is aluminum principally alloyed with manganese; the 4000 series is aluminum alloyed with silicon; the 5000 series is aluminum primarily alloyed with magnesium; the 6000 series is aluminum alloyed with magnesium and silicon; the 7000 series is aluminum primarily alloyed with zinc; and the 8000 series is a miscellaneous category.

While it would therefore be beneficial to be able to sort a mass or body of aluminum scrap containing a heterogeneous mixture of pieces of different alloys, to separate the different alloy compositions or at least different alloy families before re-melting for recycling, scrap pieces of different aluminum alloy compositions are not ordinarily visually distinguishable from each other. Optically indistinguishable metals (especially alloys of the same metal) are difficult to sort. For example, it is not easy to manually separate and identify small pieces of cast from wrought aluminum or to spot zinc or steel attachments encapsulated in aluminum. There also is the problem that color sorting is nearly impossible for identically colored materials, such as the all-gray metals of aluminum alloys, zinc, and lead.

Furthermore, the presence of commingled pieces of different alloys in a body of scrap limits the ability of the scrap to be usefully recycled, unless the different alloys (or, at least, alloys belonging to different compositional families such as those designated by the Aluminum Association series 1000, 2000, 3000, etc.) can be separated prior to re-melting. This is because, when commingled scrap of plural different alloy compositions or composition families is re-melted, the resultant molten mixture contains proportions of the principle alloy and elements (or the different compositions) that are too high to satisfy the compositional limitations required in any particular commercial alloy.

Moreover, as evidenced by the production and sale of the Ford F-150 pickup having a considerable increase in its body and frame parts consisting of aluminum instead of steel, it is additionally desirable to recycle sheet metal scrap, including that generated in the manufacture of automotive components from sheet aluminum. Recycling of the scrap involves re-melting the scrap to provide a body of molten metal that can be cast and/or rolled into useful aluminum parts for further production of such vehicles. However, automotive manufacturing scrap (and metal scrap from other sources such as airplanes and commercial and household appliances) often includes a mixture of scrap pieces of wrought and cast pieces and/or two or more aluminum alloys differing substantially from each other in composition. A specific example of mixed manufacturing scrap of aluminum sheet, generated in certain present-day automotive manufacturing operations, is a mixture of pieces of one or more alloys of the Aluminum Association 5000 series and pieces of one or more alloys of the Aluminum Association 6000 series. Thus, those skilled in the aluminum alloy art will appreciate the difficulties of separating aluminum alloys, especially alloys that have been worked, such as cast, forged, extruded, rolled, and generally wrought alloys, into a reusable or recyclable worked product. These alloys for the most part are indistinguishable upon visual inspection or by other conventional scrap sorting techniques, such as density and/or eddy-current techniques. Therefore, it is a difficult task to separate, for example, 2000, 3000, 5000, 6000, and 7000 series alloys; moreover, the ability to sort between aluminum alloys within the same Aluminum Association series has not been accomplished in the prior art.

As a result, there are certain economies available to the aluminum industry by developing a well-planned yet simple recycling plan or system. The use of recycled material would be a less expensive metal resource than a primary source of aluminum. As the amount of aluminum sold to the automotive industry (and other industries) increases, it will become increasingly necessary to use recycled aluminum to supplement the availability of primary aluminum.

BRIEF DESCRIPTION OF THE DRAWINGS

FIG. 23 shows elemental compositions for aluminum alloys 6013, 6022, and 6013 as defined by the Aluminum Association.

FIG. 29 shows a comparison of the normalized ECS of FIG. 28 for the exemplary material to normalized standard reference ECS's.

FIGS. 30-31 show an example of classifying aluminum alloys utilizing a dot product method.

FIG. 32 shows ECS values for four exemplary aluminum alloys.

FIG. 33 shows the ECS values of FIG. 33 with error range values.

DETAILED DESCRIPTION

Figure 1:
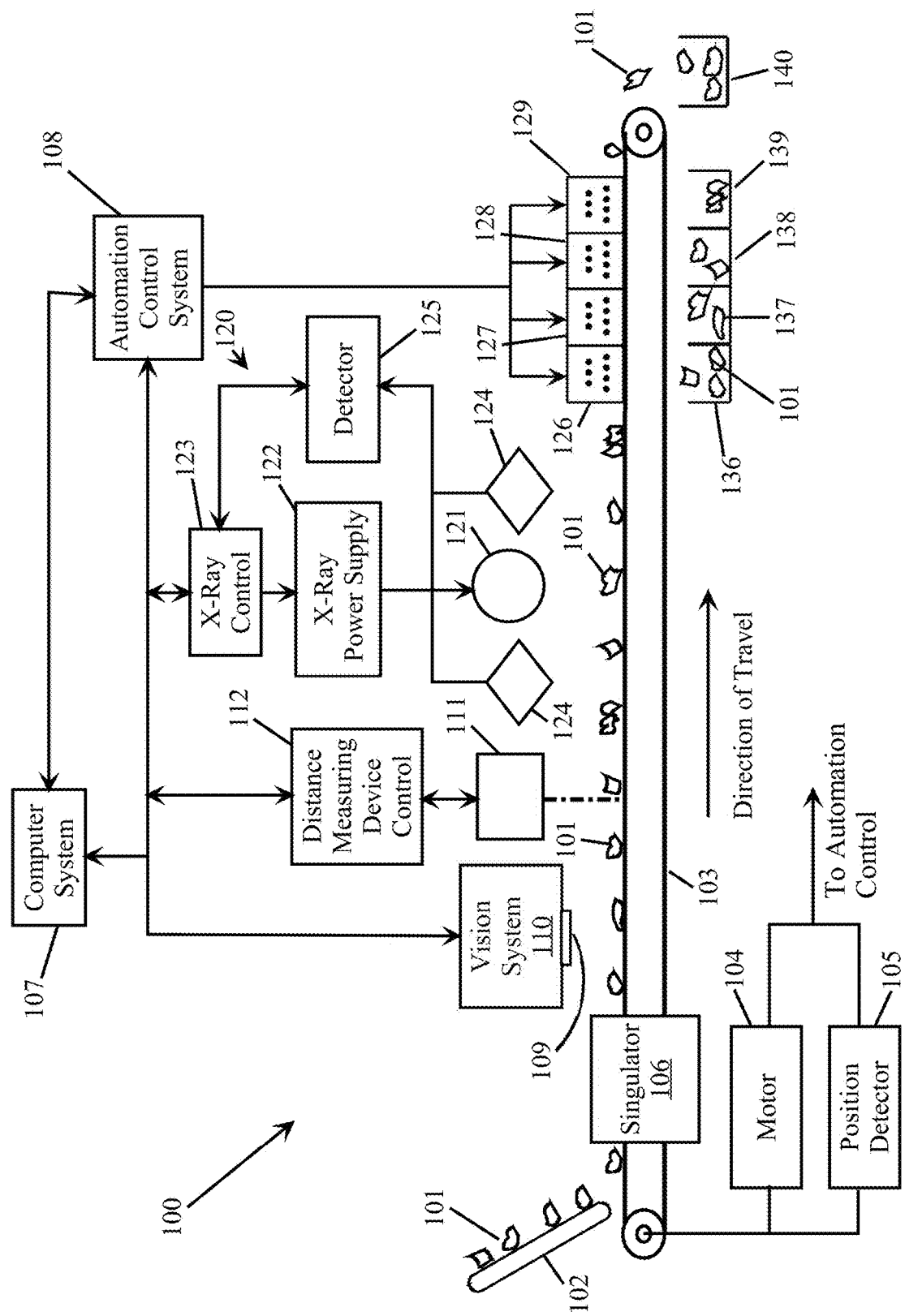
FIG. 1 illustrates a schematic of a sorting system configured in accordance with certain embodiments of the present disclosure.

Various detailed embodiments of the present disclosure are disclosed herein. However, it is to be understood that the disclosed embodiments are merely exemplary of the disclosure, which may embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

As used herein, a "material" may include a chemical element, a compound or mixture of chemical elements, or a compound or mixture of a compound or mixture of chemical elements, wherein the complexity of a compound or mixture may range from being simple to complex. As used herein, "element" means a chemical element of the periodic table of elements, including elements that may be discovered after the filing date of this application. Classes of materials may include metals (ferrous and nonferrous), metal alloys, plastics (including, but not limited to PCB, HDPE, UHMWPE, and various colored plastics), rubber, foam, glass (including, but not limited to borosilicate or soda lime glass, and various colored glass), ceramics, paper, cardboard, Teflon, PE, bundled wires, insulation covered wires, rare earth elements, etc. As used herein, the term "aluminum" refers to aluminum metal and aluminum-based alloys, viz., alloys containing more than 50% by weight aluminum (including those classified by the Aluminum Association). As used herein, the terms "scrap" and "scrap pieces" refer to material pieces in a solid state as distinguished from a molten or liquid state. Within this disclosure, the terms "scrap," "scrap pieces," "materials," and "material pieces" may be used interchangeably.

As defined within the Guidelines for Nonferrous Scrap promulgated by the Institute Of Scrap Recycling Industries, Inc., the term "Zorba" is the collective term for shredded nonferrous metals, most usually originating from end-of-life vehicles ("ELVs") or waste electronic and electrical equipment ("WEEE"). The Institute Of Scrap Recycling Industries, Inc. ("ISRI") in the United States established the specifications for Zorba. ISRI defines Zorba as "shredded mixed nonferrous metals consisting primarily of aluminum generated by eddy-current separator or other segregation techniques." In Zorba, each scrap piece may be made up of a combination of the nonferrous metals: aluminum, copper, lead, magnesium, stainless steel, nickel, tin, and zinc, in elemental or alloyed (solid) form. Furthermore, the term "Twitch" shall mean floated fragmentizer aluminum scrap (from automobile shredders).

As used herein, the terms "identify" and "classify," and the terms "identification" and "classification," may be utilized interchangeably. For example, in accordance with certain embodiments of the present disclosure, a vision system (as further described herein) may be configured (e.g., with a machine learning system) to collect any type of information that can be utilized within a sorting system to selectively sort scrap pieces as a function of a set of one or more (user-defined) physical characteristics, including, but not limited to, color, size, shape, uniformity, and/or manufacturing type of the scrap pieces. As used herein, "manufacturing type" refers to the type of manufacturing process by which the material in a scrap piece was manufactured, such as a metal part having been formed by a wrought process, having been cast (including, but not limited to, expendable mold casting, permanent mold casting, and powder metallurgy), having been forged, a material removal process, etc.

The material sorting systems described herein according to certain embodiments of the present disclosure receive a heterogeneous mix of a plurality of materials (e.g., scrap pieces), wherein at least one material within this heterogeneous mix includes a composition of elements different from one or more other materials and/or at least one material within this heterogeneous mix was manufactured differently from one or more other materials (e.g., the heterogeneous mix of scrap pieces includes wrought and cast materials or paper and plastic materials, etc.), and the sorting system is configured to sort this one material into a group separate from such other material(s). Though all embodiments of the present disclosure may be utilized to sort any types or classes of materials as defined herein, certain embodiments of the present disclosure are hereinafter described for sorting metal alloy scrap pieces, including aluminum alloy scrap pieces, and including wrought and cast aluminum scrap pieces.

It should be noted that the materials to be sorted may have irregular sizes and shapes (e.g., see FIGS. 36A-37I). For example, such material (e.g., Zorba and Twitch) may have been previously run through some sort of shredding mechanism that chops up the materials into such irregularly shaped and sized pieces (producing scrap pieces), which are then fed onto a conveyor system. Hereinafter, certain embodiments of the present disclosure will be described as identifying and/or classifying such scrap pieces, though such embodiments are not limited to doing so for scrap pieces, but may do so for any heterogeneous mixture of materials.

Embodiments of the present disclosure will be described herein as sorting scrap pieces or materials into such separate groups by physically depositing (e.g., ejecting) the scrap pieces or materials into separate receptacles or bins as a function of user-defined groupings (e.g., material type classifications). As an example, within certain embodiments of the present disclosure, scrap pieces or materials may be sorted into separate bins in order to separate scrap pieces or materials composed of a particular composition, or compositions, from other scrap pieces composed of a different composition, and/or certain scrap pieces or materials manufactured according to one process from other scrap pieces or materials manufactured from a different process even though their compositions are indistinguishable.

Moreover, certain embodiments of the present disclosure may sort aluminum alloy scrap pieces into separate bins so that substantially all of the aluminum alloy scrap pieces having a composition falling within one of the aluminum alloy series published by the Aluminum Association are sorted into a single bin (for example, a bin may correspond to one or more particular aluminum alloy series (e.g., 1000, 2000, 3000, 4000, 5000, 6000, 7000, 8000)). Furthermore, as will be described herein, certain embodiments of the present disclosure may be configured to sort aluminum alloy scrap pieces into separate bins as a function of a classification of their alloy composition even if such alloy compositions falls within the same Aluminum Association series. As a result, the sorting system in accordance with certain embodiments of the present disclosure can classify and sort aluminum alloy scrap pieces having compositions that would all classify them into a single aluminum alloy series (e.g., the 5000 series or the 6000 series) into separate bins as a function of their aluminum alloy composition. For example, certain embodiments of the present disclosure can classify and sort into separate bins aluminum alloy scrap pieces classified as aluminum alloy 5086 separate from aluminum alloy scrap pieces classified as aluminum alloy 5022. Such an ability to sort scrap pieces of aluminum alloys from each other within a particular aluminum alloy series has never been accomplished before in the prior art.

FIG. 1 illustrates an example of a material sorting system 100 configured in accordance with various embodiments of the present disclosure. A conveyor system 103 may be implemented to convey one or more streams of individual scrap pieces 101 through the sorting system 100 so that each of the individual scrap pieces 101 can be tracked, classified, and sorted into predetermined desired groups. Such a conveyor system 103 may be implemented with one or more conveyor belts on which the scrap pieces 101 travel, typically at a predetermined constant speed. However, certain embodiments of the present disclosure may be implemented with other types of conveyor systems, including a system in which the scrap pieces free fall past the various components of the sorting system. Hereinafter, the conveyor system 103 will simply be referred to as the conveyor belt 103.

Furthermore, though FIG. 1 illustrates a single stream of scrap pieces 101 on a conveyor belt 103, certain embodiments of the present disclosure may be implemented in which a plurality of such streams of scrap pieces are passing by the various components of the sorting system 100 in parallel with each other. For example, as will be further described herein (e.g., see FIG. 3), the scrap pieces may be distributed into two or more parallel singulated streams travelling on a single conveyor belt, or a set of parallel conveyor belts. As such, certain embodiments of the present disclosure are capable of simultaneously tracking, classifying, and sorting a plurality of such parallel travelling streams of scrap pieces.

In accordance with certain embodiments of the present disclosure, some sort of suitable feeder mechanism may be utilized to feed the scrap pieces 101 onto the conveyor belt 103, whereby the conveyor belt 103 conveys the scrap pieces 101 past various components within the sorting system 100. Within certain embodiments of the present disclosure, the conveyor belt 103 is operated to travel at a predetermined speed by a conveyor belt motor 104. This predetermined speed may be programmable and/or adjustable by the operator in any well-known manner Monitoring of the predetermined speed of the conveyor belt 103 may alternatively be performed with a position detector 105. Within certain embodiments of the present disclosure, control of the conveyor belt motor 104 and/or the position detector 105 may be performed by an automation control system 108. Such an automation control system 108 may be operated under the control of a computer system 107 and/or the functions for performing the automation control may be implemented in software within the computer system 107.

The conveyor belt 103 may be a conventional endless belt conveyor employing a conventional drive motor 104 suitable to move the conveyor belt 103 at the predetermined speeds. A position detector 105, which may be a conventional encoder, may be operatively coupled to the conveyor belt 103 and the automation control system 108 to provide information corresponding to the movement (e.g., speed) of the conveyor belt 103. Thus, as will be further described herein, through the utilization of the controls to the conveyor belt drive motor 104 and/or the automation control system 108 (and alternatively including the position detector 105), as each of the scrap pieces 101 travelling on the conveyor belt 103 are identified, they can be tracked by location and time (relative to the system 100) so that the various components of the sorting system 100 can be activated/deactivated as each scrap piece 101 passes within their vicinity. As a result, the automation control system 108 is able to track the location of each of the scrap pieces 101 while they travel along the conveyor belt 103.

In accordance with certain embodiments of the present disclosure, after the scrap pieces 101 are received by the conveyor belt 103, a tumbler and/or a vibrator may be utilized to separate the individual scrap pieces from a collection of scrap pieces, and then they may be positioned into one or more singulated (i.e., single file) streams. In accordance with certain embodiments of the present disclosure, this may be performed by an active or passive singulator 106. Furthermore, as described herein, the sorting system 100 may be configured to mechanically position each of the scrap pieces 101 within a particular singulated stream at a relatively constant distance from each other.

Figure 2:
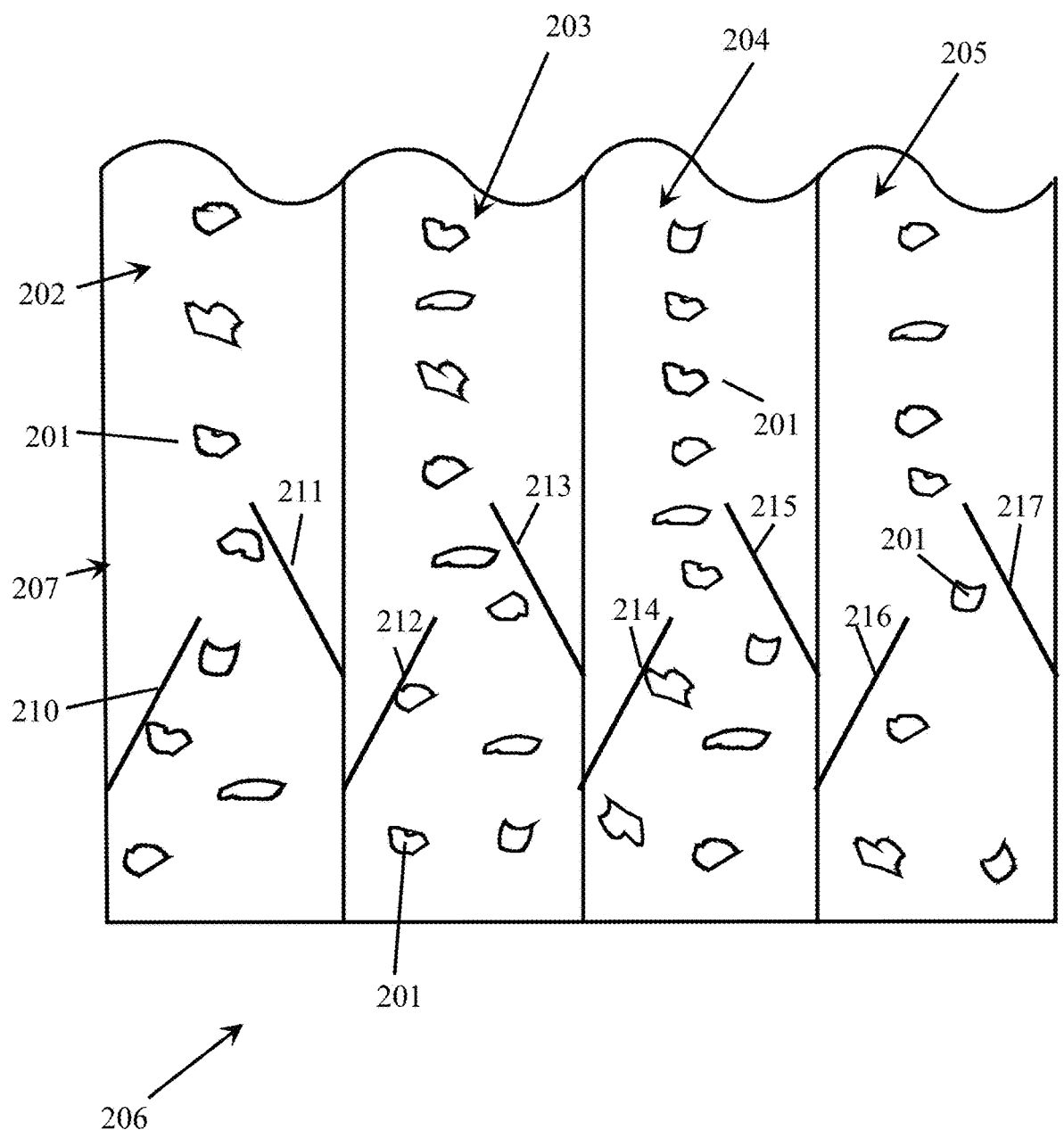
FIG. 2 illustrates a schematic of a device for passively singulating one or more streams of materials.

An example of a passive singulator 206 is illustrated in FIG. 2, which schematically shows how static alignment rods or bars 210 . . . 217 align the individual scrap pieces 201 into one or more singulated streams of scrap pieces on a conveyor belt. Though the example of FIG. 2 is not limiting, it does illustrate how the scrap pieces 201 can be singulated into four separate singulated streams 202 . . . 205 of scrap pieces 201 on a conveyor belt 207. Within certain embodiments of the present disclosure, a single conveyor belt may transport such a plurality of singulated streams, or a plurality of individually driven conveyor belts may be utilized whereby each of the conveyor belts conveys one or more of the separate singulated streams (e.g., 202 . . . 205) of scrap pieces 201.

In accordance with certain embodiments of the present disclosure, incorporation or use of a singulator is not required. Instead, the conveyor system (e.g., the conveyor belt 103) may simply convey a mass of scrap pieces, which have been deposited onto the conveyor belt 103 in a random manner.

Referring again to FIG. 1, certain embodiments of the present disclosure may utilize a vision, or optical recognition, system 110 and/or a distance measuring device 111 as a means to begin tracking each of the scrap pieces 101 as they travel on the conveyor belt 103. The vision system 110 may utilize one or more still or live action cameras 109 to note the position (i.e., location and timing) of each of the scrap pieces 101 on the moving conveyor belt 103. The vision system 110 may be further, or alternatively, configured to perform certain types of identification (e.g., classification) of all or a portion of the scrap pieces 101. For example, such a vision system 110 may be utilized to acquire information about each of the scrap pieces 101, including, but not limited to, information that an x-ray fluorescence ("XRF") system 120 cannot gather alone. For example, the vision system 110 may be configured (e.g., with a machine learning system) to collect any type of information that can be utilized within the system 100 to selectively sort the scrap pieces 101 as a function of a set of one or more (user-defined) physical characteristics, including, but not limited to, color, size, shape, uniformity, composition, and/or manufacturing type of the scrap pieces 101. The vision system 110 captures visual images of each of the scrap pieces 101, for example, by using a typical optical sensor as utilized in typical digital cameras and video equipment. Such visual images captured by the optical sensor are then stored in a memory device as visual image data. In accordance with embodiments of the present disclosure, such visual image data represents images captured within optical wavelengths of light (i.e., the wavelengths of light that are observable by the typical human eye). However, alternative embodiments of the present disclosure may utilize optical sensors that are able to capture an image of a material made up of wavelengths of light outside of the visual wavelengths of the human eye.

Additionally, such a vision system 110 may be configured to identify which of the scrap pieces 101 are not of the kind to be sorted by the sorting system 100, and send a signal to reject such scrap pieces. In such a configuration, the identified scrap pieces 101 may be ejected utilizing one of the mechanisms as described hereinafter for physically moving sorted scrap pieces into individual bins.

Figure 3:
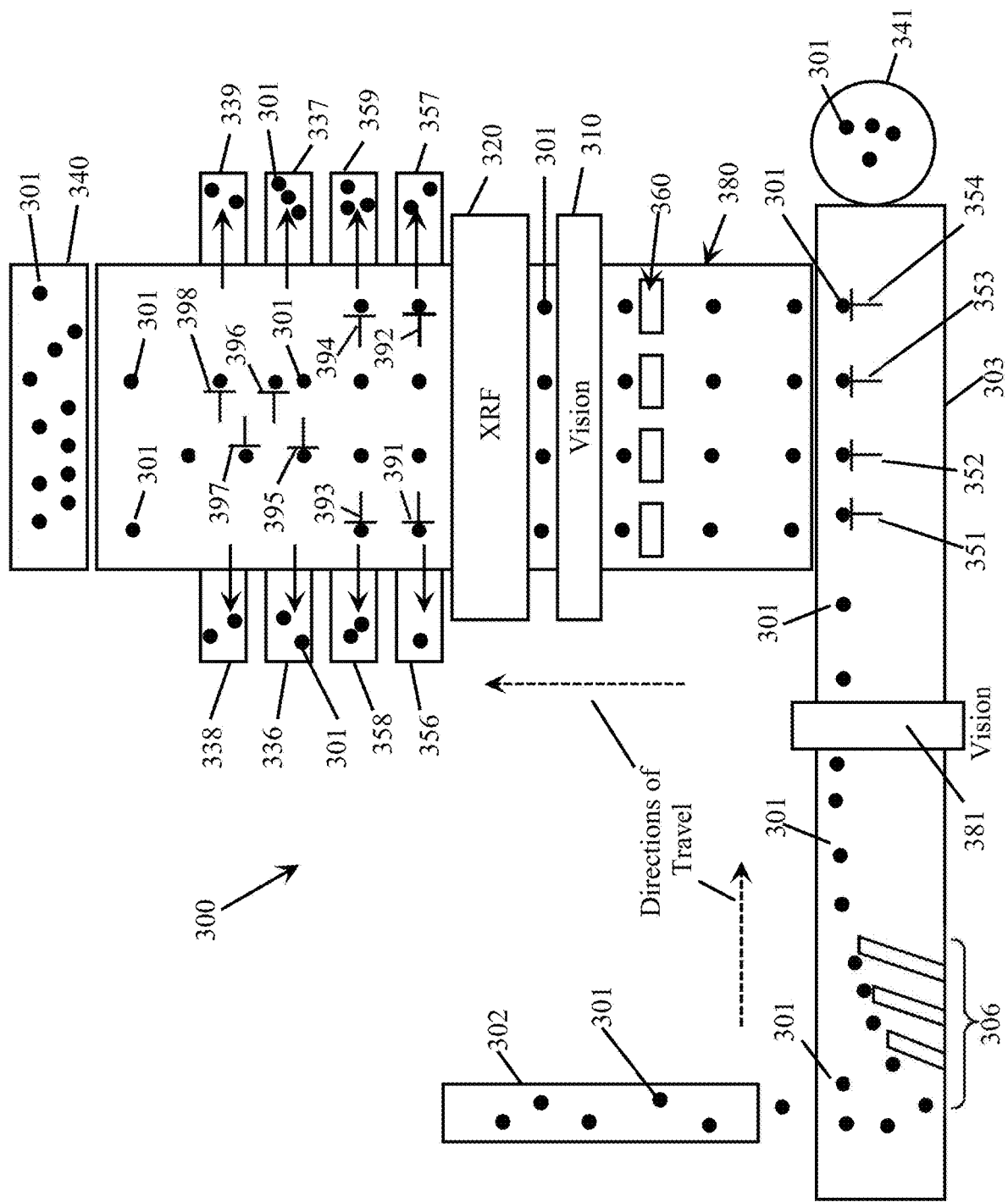
FIG. 3 illustrates a schematic of a sorting system configured in accordance with certain embodiments of the present disclosure.

Though both FIGS. 1 and 3 are illustrated as including XRF systems 120 and 320, respectively, implementation of such XRF systems is optional within certain embodiments of the present disclosure. Furthermore, certain embodiments of the present disclosure may be implemented without a distance measuring device (e.g., the distance measuring device 111) to track the scrap pieces. Within certain embodiments of the present disclosure, a combination of both the vision system 110 and an XRF system 120 may be used to classify the scrap pieces 101. Certain embodiments of the present disclosure utilizing a vision system for classifying scrap pieces are further described herein with respect to FIGS. 35-37I.

Within certain embodiments of the present disclosure, the distance measuring device 111 and accompanying control system 112 may be utilized and configured to measure the sizes and/or shapes of each of the scrap pieces 101 as they pass within proximity of the distance measuring device 111, along with the position (i.e., location and timing) of each of the scrap pieces 101 on the moving conveyor belt 103. An exemplary operation of such a distance measuring device 111 and control system 112 is described herein with respect to FIG. 5. Alternatively, as previously disclosed, the vision system 110 may be utilized to track the position (i.e., location and timing) of each of the scrap pieces 101 on the moving conveyor belt 103.

Such a distance measuring device 111 may be implemented with a well-known visible light (e.g., laser light) system, which continuously measures a distance the light travels before being reflected back into a detector of the laser light system. As such, as each of the scrap pieces 101 passes within proximity of the device 111, it outputs a signal to the control system 112 indicating such distance measurements. Therefore, such a signal may substantially represent an intermittent series of pulses whereby the baseline of the signal is produced as a result of a measurement of the distance between the distance measuring device 111 and the conveyor belt 103 during those moments when a scrap piece 101 is not in the proximity of the device 111, while each pulse provides a measurement of the distance between the distance measuring device 111 and a scrap piece 101 passing by on the conveyor belt 103. Since the scrap pieces 101 may have irregular shapes, such a pulse signal may also occasionally have an irregular height. Nevertheless, each pulse signal generated by the distance measuring device 111 provides the height of portions of each of the scrap pieces 101 as they pass by on the conveyor belt 103. The length of each of such pulses also provides a measurement of a length of each of the scrap pieces 101 measured along a line substantially parallel to the direction of travel of the conveyor belt 103. It is this length measurement (corresponding to the time stamp of process block 506 of FIG. 5) (and alternatively the height measurements) that may be utilized within certain embodiments of the present disclosure to determine when to activate and deactivate the acquisition of detected fluorescence (i.e., the XRF spectrum) of each of the scrap pieces 101 by the XRF system 120.

Within certain embodiments of the present disclosure that implement an XRF system 120, the XRF system 120 is configured to assist the vision system 110 to identify the composition, or relative compositions, and/or manufacturing types, of each of the scrap pieces 101 as they pass within proximity of the XRF system 120. An exemplary operation of such an XRF system 120 is described herein with respect to FIG. 6. The XRF system 120 includes an x-ray source 121, which may be powered by an x-ray power supply 122.

Within certain embodiments of the present disclosure, the x-ray source 121 may include any well-known commercially available x-ray tube, or commercially available x-ray sources using radioactive isotopes. Though such isotope-based sources do not typically produce x-rays at the intensity that can be produced by a commercially available x-ray tube, alternative embodiments of the present disclosure are capable of sufficiently classifying metal alloys, including aluminum alloys (even within the same aluminum alloy series) for sorting into separate bins, utilizing such isotope-based sources. Since when an x-ray source producing less intense x-rays results in less x-rays being fluoresced from the scrap pieces, the sorting system may be preprogrammed to decrease the speed of the conveyor belt to allow fluoresced x-rays to be detected by the one or more detectors from the scrap pieces for a longer period of time so that an XRF spectrum with a strong enough image, i.e., a recognizable spectral pattern, may be determined.

As will be described herein with respect to FIGS. 9-13, in accordance with certain embodiments of the present disclosure, the x-ray source may include an in-line x-ray fluorescence ("IL-XRF") tube. Such an IL-XRF tube may include a separate x-ray source dedicated for one or more of the singulated streams of conveyed scrap pieces. Likewise, one or more XRF detectors may be implemented to detect fluoresced x-rays from scrap pieces within each of the singulated streams.

Figure 22:
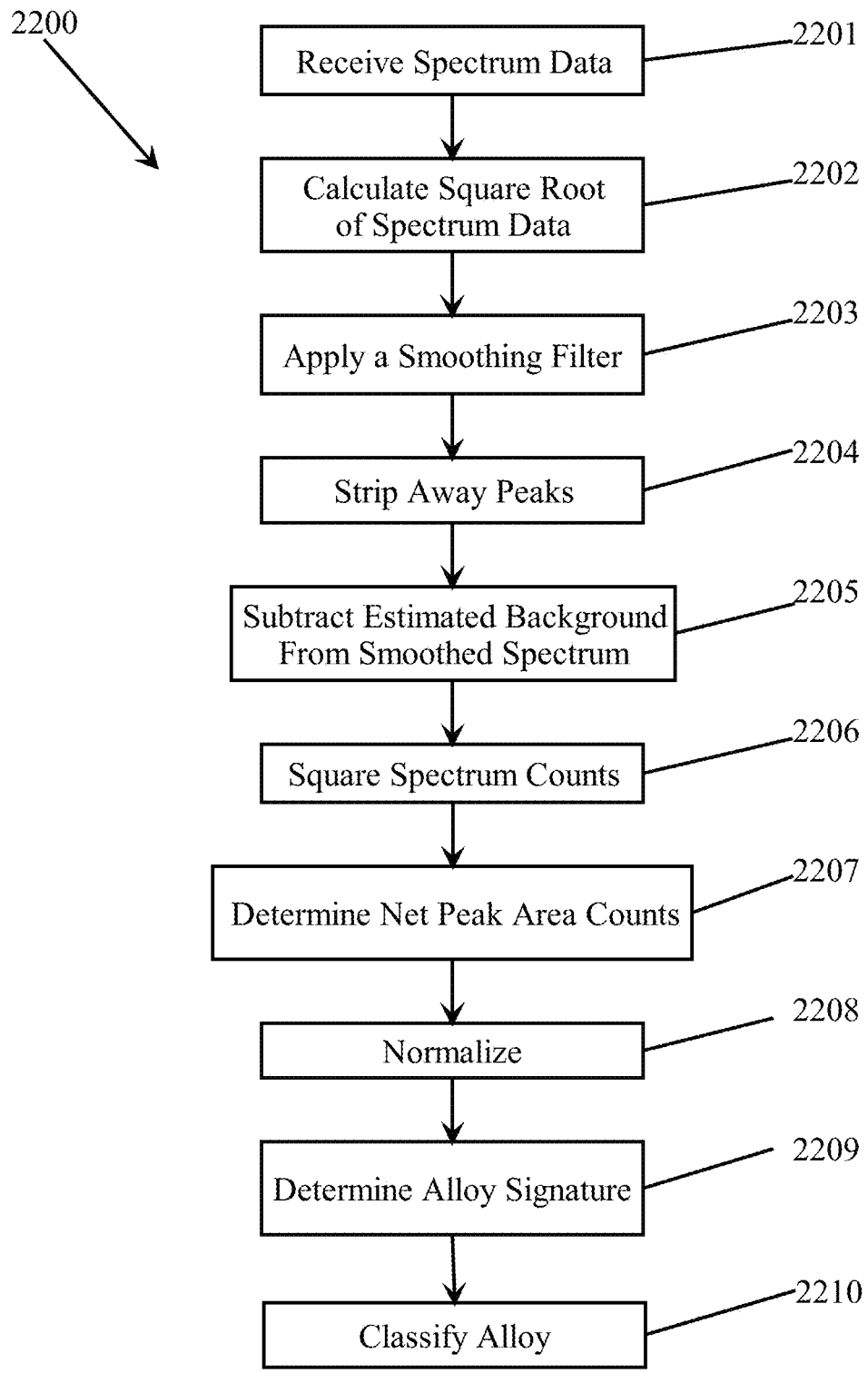
FIG. 22 illustrates a flowchart diagram, configured in accordance with certain embodiments of the present disclosure, of a system and process for classifying materials using x-ray fluorescence.

Within certain embodiments of the present disclosure, as each scrap piece 101 passes within proximity to the x-ray source 121, it is irradiated with x-rays from the x-ray source 121 resulting in an x-ray fluorescence spectrum emanating from the irradiated scrap piece 101. One or more XRF detectors 124 (e.g., see FIG. 16) are positioned and configured to detect the x-ray fluorescence emanated from the scrap piece 101. The one or more detectors 124 and the associated detector electronics 125 capture this received XRF spectrum to perform signal processing thereon and produce digitized information representing the captured XRF spectrum, which is then analyzed in accordance with certain embodiments of the present disclosure in order to assist the vision system 110 to classify each of the scrap pieces 101 (e.g., see FIGS. 7 and 22). This classification, which may be performed within the computer system 107, may then be utilized by the automation control system 108 to activate one of the N (N≥1) sorting devices 126 . . . 129 for sorting (e.g., ejecting) the scrap pieces 101 into one or more N (N≥1) sorting bins 136 . . . 139 according to the determined classifications (e.g., see FIG. 8). Four sorting devices 126 . . . 129 and four sorting bins 136 . . . 139 associated with the sorting devices are illustrated in FIG. 1 as merely a non-limiting example.

The sorting devices may include any well-known mechanisms for redirecting selected scrap pieces towards a desired location, including, but not limited to, ejecting the scrap pieces from the conveyor belt system into the plurality of sorting bins. For example, a sorting device may utilize air jets, with each of the air jets assigned to one or more of the classifications. When one of the air jets (e.g., 127) receives a signal from the automation control system 108, that air jet emits a stream of air that causes a scrap piece 101 to be ejected from the conveyor belt 103 into a sorting bin (e.g., 137) corresponding to that air jet. High speed air valves from Mac Industries may be used, for example, to supply the air jets with an appropriate air pressure configured to eject the scrap pieces 101 from the conveyor belt 103.

Although the example illustrated in FIG. 1 uses air jets to eject scrap pieces, other mechanisms may be used to eject the scrap pieces, such as robotically removing the scrap pieces from the conveyor belt, pushing the scrap pieces from the conveyor belt (e.g., with paint brush type plungers), causing an opening (e.g., a trap door) in the conveyor belt 103 from which a scrap piece may drop, or using air jets to separate the scrap pieces into separate bins as they fall from the edge of the conveyor belt. As an example, FIG. 3 shows an exemplary embodiment in which plungers are utilized to eject the scrap pieces from a conveyor belt.

In addition to the N sorting bins 136 . . . 139 into which scrap pieces 101 are ejected, the system 100 may also include a receptacle or bin 140 that receives scrap pieces 101 not ejected from the conveyor belt 103 into any of the aforementioned sorting bins 136 . . . 139. For example, a scrap piece 101 may not be ejected from the conveyor belt 103 into one of the N sorting bins 136 . . . 139 when the classification of the scrap piece 101 is not determined (or simply because the sorting devices failed to adequately eject a piece). Thus, the bin 140 may serve as a default receptacle into which unclassified scrap pieces are dumped. Alternatively, the bin 140 may be used to receive one or more classifications of scrap pieces that have deliberately not been assigned to any of the N sorting bins 136 . . . 139.

Depending upon the variety of classifications of scrap pieces desired, multiple classifications may be mapped to a single sorting device and associated sorting bin. In other words, there need not be a one-to-one correlation between classifications and sorting bins. For example, it may be desired by the user to sort certain classifications of materials (e.g., aluminum alloys, cast materials, wrought materials, paper, plastic, etc.) into the same sorting bin. To accomplish this sort, when a scrap piece 101 is classified as falling into a predetermined grouping of classifications, the same sorting device may be activated to sort these into the same sorting bin. Such combination sorting may be applied to produce any desired combination of sorted scrap pieces. The mapping of classifications may be programmed by the user (e.g., using the sorting algorithm (e.g., see FIGS. 7, 22, and 35) operated by the computer system 107) to produce such desired combinations. Additionally, the classifications of scrap pieces are user-definable, and not limited to any particular known classifications of scrap pieces.

Although the conveyor belt 103 may be made of some sort of rubberized material, the intensity of the x-rays generated from the x-ray source 121 (if implemented) may even cause elements present in the conveyor belt 103 to fluoresce x-rays. As a result, within certain embodiments of the present disclosure, the conveyor belt 103 may be made of a material that will not fluoresce x-rays at energy levels that fall within a range of the energy spectrum being detected, thereby interfering with the detected energy spectrum. The energy levels of the fluoresced x-rays depend on the energy levels at which the elements present in the scrap pieces 101 fluoresce. The energy levels at which an element fluoresces is proportional to its atomic number. For example, elements of low atomic numbers fluoresce x-rays at lower energy levels. Thus, the materials for the conveyor belt 103 may be chosen such that the belt 103 includes elements of certain atomic numbers that do not fluoresce x-rays within a certain energy range.

Within certain embodiments of the present disclosure that implement an XRF system 120, the x-ray source 121 may be located above the detection area (i.e., above the conveyor belt 103); however, certain embodiments of the present disclosure may locate the x-ray source 121 and/or detectors 124 in other positions that still produce acceptable detected XRF spectra. Moreover, the detector electronics 125 may include well-known amplifiers for amplifying one or more of the received energy levels of the fluoresced x-rays, whereby such amplified energy levels are then processed within the detector electronics 125 to be normalized with other energy levels not similarly amplified.

Signals representing the detected XRF spectrum may be converted into a discrete energy histogram such as on a per-channel (i.e., element) basis, as further described herein. Such a conversion process may be implemented within the x-ray control system 123, or the computer system 107. Within certain embodiments of the present disclosure, such an x-ray control system 123 or computer system 107 may include a commercially available spectrum acquisition module, such as the commercially available Amptech MCA 5000 acquisition card and software programmed to operate the card. Such a spectrum acquisition module, or other software implemented within the sorting system 100, may be configured to implement a plurality of channels for dispersing x-rays into a discrete energy spectrum (i.e., histogram) with such a plurality of energy levels, whereby each energy level corresponds to an element that the sorting system 100 has been configured to detect. The system 100 may be configured so that there are sufficient channels corresponding to certain elements within the chemical periodic table, which are important for distinguishing between different materials (e.g., different aluminum alloys). The energy counts for each energy level may be stored in a separate collection storage register. The computer system 107 then reads each collection register to determine the number of counts for each energy level during the collection interval, and build the energy histogram. As will be described in more detail herein, a sorting algorithm configured in accordance with certain embodiments of the present disclosure may then utilize this collected histogram of energy levels to classify at least certain ones of the scrap pieces 101 and/or assist the vision system 110 in classifying the scrap pieces 101.

The conveyor system 103 may include a circular conveyor (not shown) so that unclassified scrap pieces are returned to the beginning of the sorting system 100 to be singulated by the singulator 106 and run through the system 100 again. Moreover, because the system 100 is able to specifically track each scrap piece 101 as it travels on the conveyor system 103, some sort of sorting device (e.g., the sorting device 129) may be implemented to eject a scrap piece 101 that the system 100 has failed to classify after a predetermined number of cycles through the sorting system 100 (or the scrap piece 101 is collected in bin 140).

Within certain embodiments of the present disclosure, the conveyor belt 103 may be divided into multiple belts configured in series such as, for example, two belts, where a first belt conveys the scrap pieces past the vision system and/or an implemented XRF system, and a second belt conveys the scrap pieces from the vision system and/or an implemented XRF system to the sorting devices. Moreover, such a second conveyor belt may be at a lower height than the first conveyor belt, such that the scrap pieces fall from the first belt onto the second belt.

Referring now to FIG. 3, there are illustrated further exemplary embodiments of the present disclosure in which various alternative and/or optional aspects of a sorting system 300 are depicted. It should be noted that one of ordinary skill in the art would be able to configure a sorting system similar to those illustrated in FIG. 1 or FIG. 3, or a different sorting system that combines various aspects and components from each of these two depicted exemplary sorting systems.

Referring to FIG. 3, the scrap pieces 301 are deposited onto a conveyor system, such as via a ramp or chute 302 so that the scrap pieces 301 and onto a feeder conveyor belt 303 travelling in the noted direction of travel. In order for the scrap pieces to move in a singulated stream within proximity to the vision system 310 and/or an implemented XRF system 320, the scrap pieces 301 may be separated and then positioned into a line. A first optional step may include the use of a mechanism, such as a tumbler or a vibrator (not shown), to separate individual pieces from a collection of pieces. Certain aspects of the present disclosure may include the use of a multiple belt (e.g., two or more) conveyor system with gates (e.g., pneumatic) and sensors (e.g., electronic) in order to align the scrap pieces into one or more singulated streams for alloy classification. For example, a passive singulator (e.g., static alignment rods or bars) 306 (or one similar to the singulator 206 of FIG. 2) may then be utilized to force the scrap pieces 301 into one or more singulated streams on the feeder conveyor belt 303. Within certain embodiments of the present disclosure, a vision, or optical recognition, system 381 may be implemented in order to identify, track, and/or classify the scrap pieces 301, as has been described herein with respect to the vision system 110 of FIG. 1 and/or with respect to the vision system described herein with respect to FIGS. 35-37I.

As the singulated stream of scrap pieces 301 travels further along (downstream) the conveyor belt 303, they then may be pushed by a robotic mechanism (such as N (N≥1) pneumatically actuated paint brush type plungers 351 . . . 354) onto another conveyor belt (or plurality of conveyor belts) 380 to form N (N≥1) singulated streams of scrap pieces 301 for travelling along the second conveyor belt 380. For purposes of illustration of certain embodiments of the present disclosure, a non-limiting example of four singulated streams is illustrated in FIG. 3. A collector receptacle (bin) 341 may be positioned at the end of the first conveyor belt 303 to collect any scrap pieces 301 that are not ejected onto the second conveyor belt 380. Alternatively, the first conveyor belt 303 may be a circular conveyor belt (not shown) whereby such scrap pieces 301 are returned to the beginning of the first conveyor belt 303 for again being singulated by the singulation device 306. As discussed herein with respect to FIG. 1, one or both of the conveyor belts 303, 380 may be motorized by a conveyor belt motor (e.g., see FIG. 1) to run at one or more predetermined speeds as controlled by the sorting system 300. Additionally, each of these one or more conveyor belts 303, 380 may also be configured to include a position detector and/or a vision system (e.g., see FIG. 1) to assist in tracking of each of the scrap pieces 301 as they travel along the second conveyor belt system 380.

Accordingly, each scrap piece 301 may be tracked by a process, such as implemented within a computer system, with the use of the vision system 381 and/or the vision system 310, or other position detector(s) (not shown). For example, different types of detectors or sensors may be used in order to detect the location of each scrap piece 301 on the conveyor belts 303, 380 (e.g., UV, IR, laser, sound). Each scrap piece 301 may be detected in order to assign a location of that scrap piece 301 for a given time. Based on that time/location measurement, the rest of the processes performed along the conveyor system are calculated so that different actions by the different components in the sorting system 300 take place at the appropriate time. For example, on the conveyor belt 380, there may be sensors that are placed at the beginning of the conveyor belt 380 to track the time and location of each scrap piece 301. The system 300 then anticipates when each piece will reach the vision system 310. In this fashion, the tracking process can then be utilized to relate the captured vision information to that unique scrap piece 301. The vision information is then associated in the sorting system 300 to that scrap piece 301, and the time to vision and/or XRF analysis is determined. After the scrap piece 301 leaves the vision and/or XRF analysis region, the tracking process is then able to associate the captured vision and/or XRF classification information to each scrap piece. The system 300 can then identify each scrap piece 301 and decide which pneumatic 391 ... 398 to use to push (eject) each scrap piece 301 off the conveyor belt 380. The system 300 knows when to eject each scrap piece 301 because the system 300 has tracked each scrap piece 301 in both location and time. As such, the sorting process uses tracking in order to maintain the location and unique identity of each scrap piece 301 throughout all stages of the sorting process.

As the N singulated streams of scrap pieces 301 begin travelling on the second conveyor belt 380, an optional mechanically operated gating mechanism 360 may be utilized to evenly space the scrap pieces 301 from each other within each of the singulated streams. Optionally, the vision, or optical recognition, system 310 may be utilized to assist in such a spacing process and/or to identify, track, and/or classify each of the scrap pieces 301 within each of the singulated streams, as described herein. Note that certain embodiments of the present disclosure do not require that the plurality of singulated streams have the scrap pieces 301 evenly spaced from each other within each stream.

In accordance with certain embodiments of the present disclosure that implement an XRF system 320, each of the singulated streams of scrap pieces 301 may then pass within the proximity of the XRF system 320. One or more x-ray sources as described herein may be implemented to irradiate each of the scrap pieces 301 within each of the singulated streams. In certain embodiments of the present disclosure, each singulated stream of scrap pieces 301 may be irradiated by a separately controlled x-ray source. As will be described herein with respect to FIGS. 9-13, the x-ray source may include an in-line x-ray fluorescence ("IL-XRF") tube. Such an IL-XRF tube may include a separate x-ray source dedicated for each of the singulated streams of conveyed scrap pieces, or may utilize M (M≥1) x-ray sources to irradiate the N streams. Likewise, one or more XRF detectors may be implemented to detect fluoresced x-rays from scrap pieces within each of the singulated streams. Detector electronics (e.g., see FIG. 1) may then be coupled to each of these XRF detectors to receive the signals corresponding to the detected x-ray fluorescence from each of the scrap pieces 301, which are then transmitted in a manner as described herein to an XRF processing module and/or a computer system (e.g., see FIG. 1) implementing a classification module for classifying each of the scrap pieces 301 within each of the singulated streams (e.g., see FIGS. 7 and 22).

In accordance with alternative embodiments of the present disclosure, one or more well-known chemical composition sensors and/or laser induced breakdown spectroscopy systems may be implemented within either of the systems 100 or 300 in lieu of, or in combination with, the XRF system 120, 320.

In embodiments of the present disclosure, N (N≥1) sorting devices may be configured (e.g., see FIG. 8) to eject classified scrap pieces 301 into corresponding sorting bins from the conveyor belt 380. Again, any type of well-known sorting device may be utilized (e.g., air jets, paint brush type plungers, robotic or pneumatic pistons, etc.). In the non-limiting example of FIG. 3, N sorting devices 391 ... 394 may be utilized to eject classified scrap pieces 301 into corresponding sorting bins 356 ... 359 from the two outside singulated streams while the singulated streams lying within the center portion of the conveyor belt 380 continue to travel along the conveyor belt 380 to additional N sorting devices 395 ... 398 where scrap pieces 301 travelling along these inner singulated streams are ejected into corresponding sorting bins 336 ... 339 in accordance with their determined classification by the sorting algorithm.

Within certain embodiments of the present disclosure, any scrap pieces 301 not ejected from the conveyor belt 380 by these two sets of sorting devices may then be collected by the receptacle (bin) 340, or may be returned for processing through another cycle through the sorting system, by either travelling along a circular conveyor system (not shown) or by the receptacle (bin) 340 being physically moved to the beginning of the sorting system 300 for distribution of such scrap pieces 301 onto the first conveyor belt 303.

It should be appreciated that embodiments of the present disclosure may be implemented so that any number of N (N≥1) singulated streams of scrap pieces 301 may be sorted by such a sorting system 300. For example, if four different types of materials are to be separated, then four sorting devices may be required to push each different material into one of four bins. In order to increase the rate of separation, multiple rows of sorting devices can be used. For example, if four rows of sorting devices were used, with four sorting devices per line, 16 total sorting devices would be positioned over the conveyor belt 380 in order to sort out four different materials into 16 total bins. The singulated lines could be placed parallel to each other, and follow a sequential pattern to sort the pieces 301, where the outer two lines are sorted first, and then the following inner lines are sorted. This method for using multiples lines for sorting is not limited to four lines but can increase to larger numbers of lines.

As previously noted, certain embodiments of the present disclosure may implement one or more vision systems (e.g., vision system 110, vision system 310, and vision system 381) in order to identify, track, and/or classify scrap pieces. In accordance with embodiments of the present disclosure, such a vision system(s) may operate alone to identify and/or classify and sort scrap pieces, or may operate in combination with an XRF system (e.g., XRF system 120, XRF system 320) to identify and/or classify and sort scrap pieces. If a scrap sorting system (e.g., system 100, system 300) is configured to operate solely with such a vision system(s), then the XRF system may be omitted from the system (or simply deactivated).

Such a vision system may be configured with one or more devices for capturing or acquiring images of the scrap pieces as they pass by on a conveyor system. The devices may be configured to capture or acquire any desired range of wavelengths reflected by the scrap pieces, including, but not limited to, visible, infrared ("IR"), ultraviolet ("UV") light. For example, the vision system may be configured with one or more cameras (still and/or video, either of which may be configured to capture two-dimensional, three-dimensional, and/or holographical images) positioned in proximity (e.g., above) the conveyor system so that visual images of the scrap pieces are captured as they pass by the vision system(s). In accordance with alternative embodiments of the present disclosure, XRF data captured by the XRF system 120, 320 may be processed (converted) into visual image data and delivered to the vision system to be utilized (either solely or in combination with the visual image data captured by the visual system 110, 310) for sorting of the scrap pieces (e.g., see FIG. 35). Such an implementation may be in lieu of, or in combination with, utilizing the XRF system 120, 320 for classifying scrap pieces as described with respect to FIGS. 7 and 22.

Regardless of the type(s) of images captured of the scrap pieces, the images may then be sent to a computer system (e.g., computer system 107) to be processed by a machine learning system in order to identify and/or classify each of the scrap pieces for subsequent sorting of the scrap pieces in a desired manner. Such a machine learning system may implement any well-known machine learning system, including one that implements a neural network (e.g., artificial neural network, deep neural network, convolutional neural network, recurrent neural network, autoencoders, reinforcement learning, etc.), fuzzy logic, artificial intelligence ("AI"), deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.) and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning software and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

Machine learning often occurs in two stages. For example, first, training occurs offline in that the sorting system 100, 300 is not being utilized to perform actual sorting of scrap pieces. The system 100, 300 may be utilized to train the vision system 110, 310 in that homogenous sets of scrap pieces (i.e., having the same material composition (e.g., aluminum (cast or wrought), steel, brass, paper, plastic, etc.)) are passed by the vision system 110, 310 by the conveyor system 103, 303, 380 (and all such scrap pieces are not sorted, but may be collected in a common bin (e.g., bin 140, 340)). Alternatively, the training may be performed at another location remote from the system 100, 300, including using some other mechanism for collecting images of homogenous sets of scrap pieces by a vision system. During this training stage, the machine learning algorithms extract features from the captured images using image processing techniques well known in the art. Non-limiting examples of training algorithms including, but are not limited to, linear regression, gradient descent, feed forward, polynomial regression, learning curves, regularized learning models, and logistic regression. It is during this training stage that the machine learning algorithms learn the relationships between different types of materials and their features (e.g., as captured by the images, such as color, texture, hue, shape, brightness, etc.), creating a knowledge base for later classification of a heterogeneous mixture of scrap pieces received by the sorting system 100, 300 for sorting by desired classifications. Such a knowledge base may include one or more libraries, wherein each library includes parameters for utilization by the vision system 110, 310 in classifying and sorting scrap pieces. For example, one particular library may include parameters configured by the training stage to recognize and classify a particular material. In accordance with certain embodiments of the present disclosure, such libraries may be inputted into the vision system and then the user of the system 100, 300 may be able to adjust certain ones of the parameters in order to adjust an operation of the system 100, 300 (for example, adjusting the threshold effectiveness of how well the vision system recognizes a particular material from a heterogeneous mix of materials).

For example, FIGS. 36A-36I show captured or acquired images of exemplary scrap pieces of cast aluminum. FIGS. 37A-37I show captured or acquired images of exemplary scrap pieces of wrought aluminum. During the training stage, a plurality of scrap pieces of a particular (homogenous) classification (type) of material, which are the control samples, may be delivered past the vision system by the conveyor system so that the machine learning algorithms detect, extract, and learn what features visually represent such a type of material. For example, images of cast aluminum pieces such as shown in FIGS. 36A-36I may be first passed through such a training stage so that the machine learning algorithm "learns" how to detect, recognize, and classify scrap pieces made of cast aluminum. This creates a library of parameters particular to cast aluminum scrap pieces. Then, the same process can be performed with respect to images of wrought aluminum pieces, such as shown in FIGS. 37A-37I, creating a library of parameters particular to wrought aluminum scrap pieces. For each type of material to be classified by the vision system, any number of exemplary scrap pieces of that type of material may be passed by the vision system. Given a captured image as input data, the machine learning algorithms may use N classifiers, each of which test for one of N different material types.

Secondly, after the algorithms have been established and the machine learning system has sufficiently learned the differences for the material classifications, the libraries for the different materials are then implemented into the material sorting system (e.g., system 100, system 300) to be used for identifying and/or classifying and then sorting scrap pieces (e.g., sorting cast aluminum scrap pieces from wrought aluminum scrap pieces).

Signatures that were used for XRF classifications as described herein may now be coded by specific feature sets that were discovered during the machine learning training for different materials. The terms used for the signatures may still apply, but instead of XRF spectra, it is a hierarchy of image features.

One point of mention here is that the detected/extracted features are not necessarily simply corners, or brightness, or shapes; they can be abstract formulations that can only be expressed mathematically, or not mathematically at all; nevertheless, the machine learning system parses all of the data to look for patterns that allow the control samples to be classified during the training stage. The machine learning system may take subsections of a captured image of a scrap piece and attempt to find correlations between the predefined classifications such as alloys 1 and 2.

Figure 34:
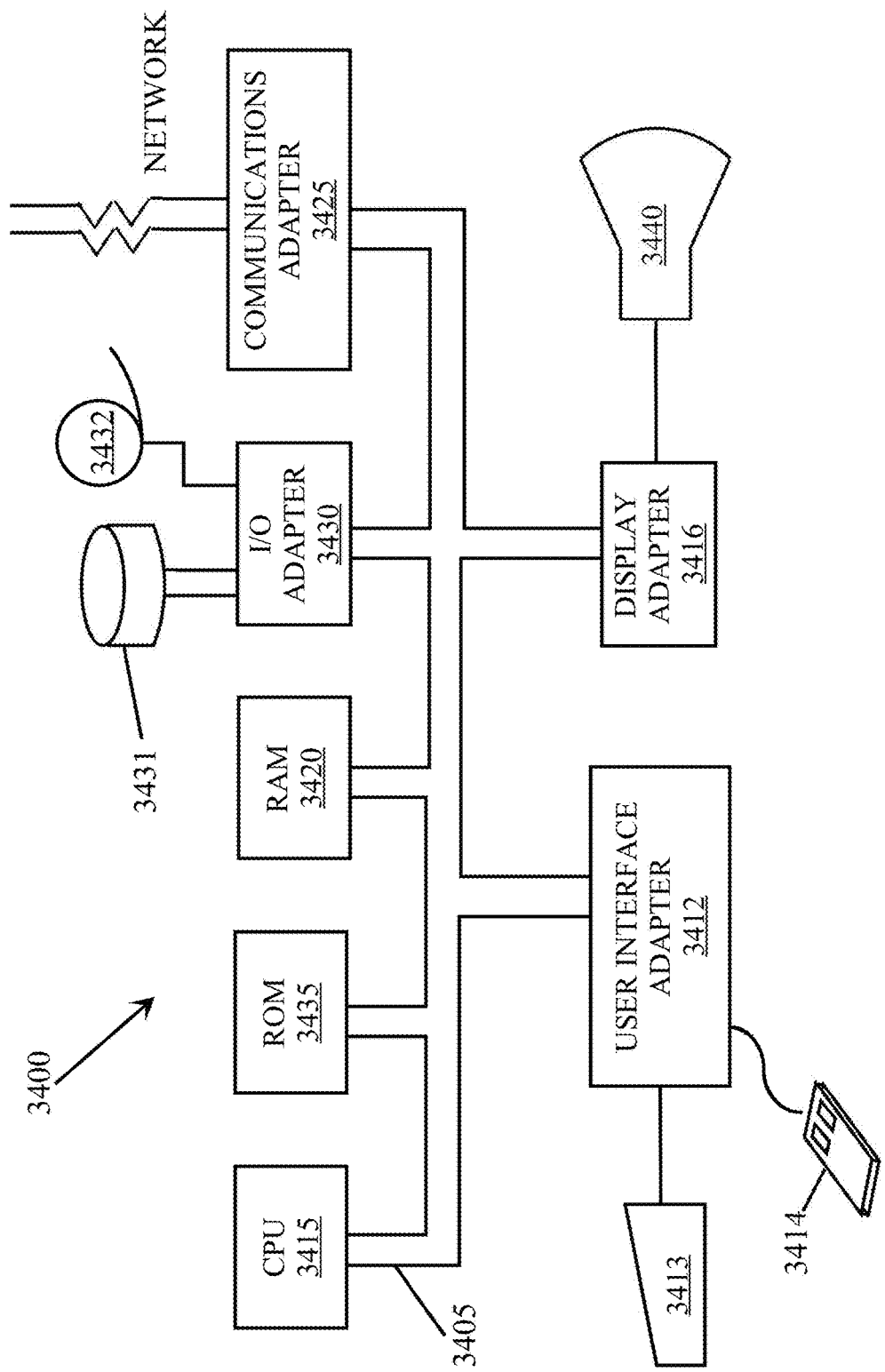
FIG. 34 illustrates a block diagram of a data processing system configured in accordance with certain embodiments of the present disclosure.
Figure 35:
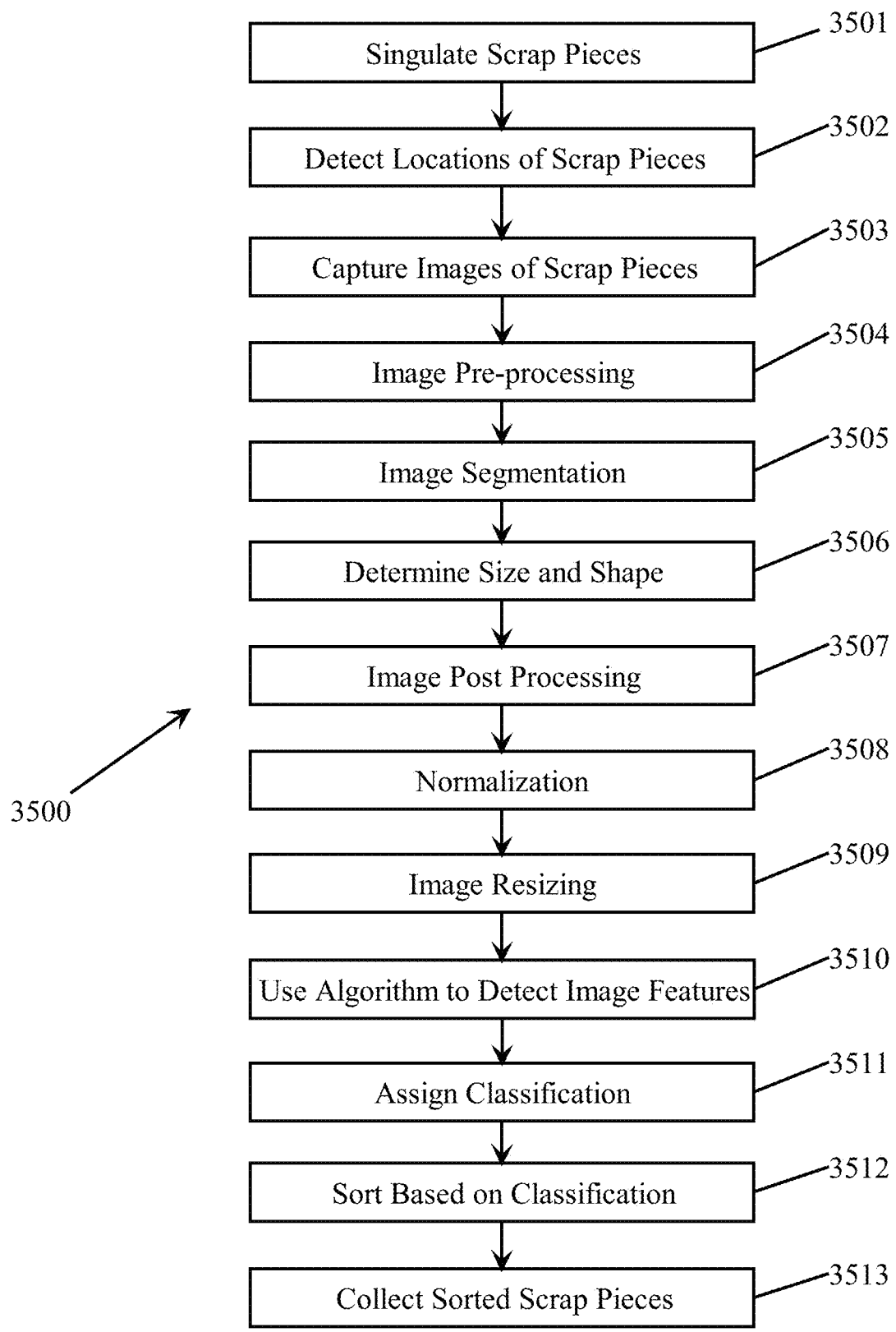
FIG. 35 illustrates a flowchart diagram configured in accordance with certain embodiments of the present disclosure.
Figure 36A:
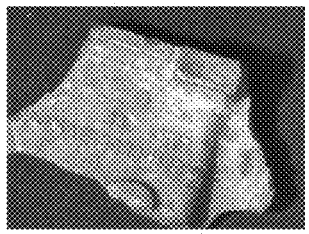
FIGS. 36A-36I show visual images of various exemplary scrap pieces of cast aluminum.
Figure 36B:
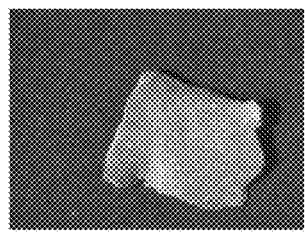
Figure 36C:
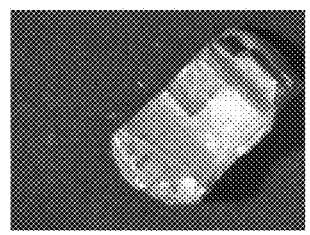
Figure 36D:
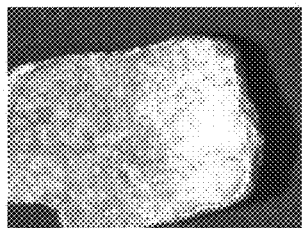
Figure 36E:
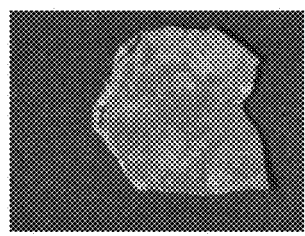
Figure 36F:
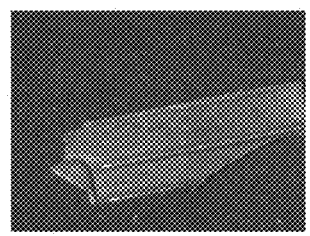
Figure 36G:
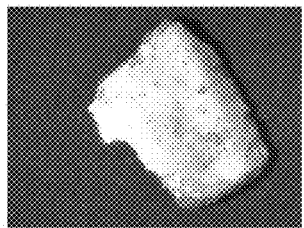
Figure 36H:
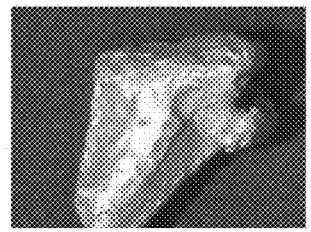
Figure 36I:
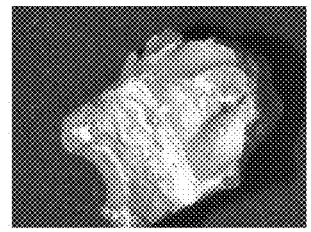
Figure 37A:
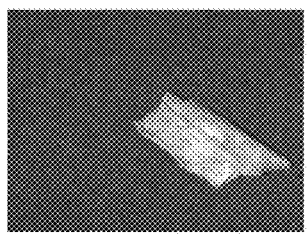
FIGS. 37A-37I show visual images of various exemplary scrap pieces of wrought aluminum.
Figure 37B:
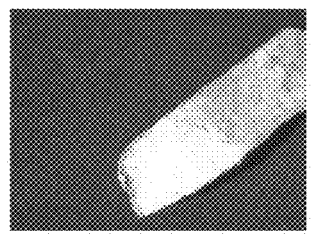
Figure 37C:
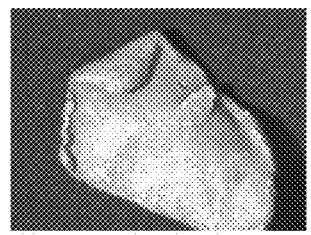
Figure 37D:
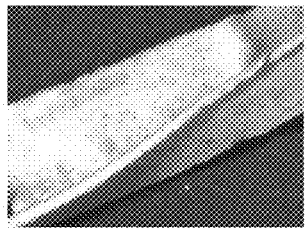
Figure 37E:
Figure 37F:
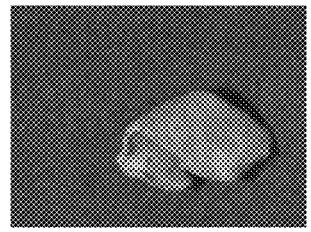
Figure 37G:
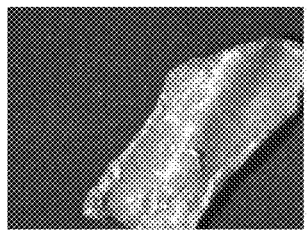
Figure 37H:
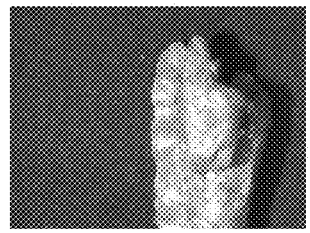
Figure 37I:
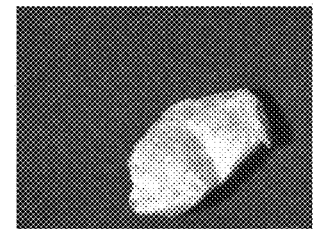

FIG. 35 illustrates a flowchart diagram depicting exemplary embodiments of a process 3500 of sorting scrap pieces utilizing a vision system and/or XRF system in accordance with certain embodiments of the present disclosure. The process 3500 may be configured to operate within any of the embodiments of the present disclosure described herein, including the sorting system 100 of FIG. 1 and the sorting system 300 of FIG. 3. Operation of the process 3500 may be performed by hardware and/or software, including within a computer system (e.g., computer system 3400 of FIG. 34) controlling the sorting system (e.g., the computer system 107 and/or the vision system 110 of FIG. 1, or the vision system 310 of FIG. 3). In the process block 3501, the scrap pieces may be manipulated into one or more singulated streams onto a conveyor belt. As previously disclosed, such singulation of the scrap pieces is optional. In the process block 3502, the location on the conveyor belt of each scrap piece is detected for tracking of each scrap piece as it travels through the sorting system. This may be performed by any one of the vision systems disclosed herein (for example, by distinguishing a scrap piece from the underlying conveyor belt material while in communication with a conveyor belt position detector (e.g., the position detector 105)). Alternatively, a linear sheet laser beam can be used to locate the pieces. Or, any system that can create a light source (including, but not limited to, visual light, UV, VIS, and IR) and have a detector can be used to locate the pieces. In the process block 3503, when a scrap piece has traveled in proximity to one or more vision systems (e.g., vision system 110, vision system 310), an image of the scrap piece is captured/acquired. In the process block 3504, a machine learning system, such as previously disclosed, may perform pre-processing of the images, which may be utilized to detect (extract) each of the scrap pieces from the background (e.g., the conveyor belt). In other words, the image pre-processing may be utilized to identify the difference between the scrap piece and the background. Well-known image processing techniques such as dilation, thresholding, and contouring may be utilized to identify the scrap piece as being distinct from the background. In the process block 3505, image segmentation may be performed. For example, one or more of the images captured by the camera of the vision system may include images of one or more scrap pieces. Additionally, a particular scrap piece may be located on a seam of the conveyor belt when its image is captured. Therefore, it may be desired in such instances to isolate the image of an individual scrap piece from the background of the image. In an exemplary technique for the process block 3505, a first step is to apply a high contrast of the image; in this fashion, background pixels are reduced to substantially all black pixels, and at least some of the pixels pertaining to the scrap piece are brightened to substantially all white pixels. The image pixels of the scrap piece that are white are then dilated to cover the entire size of the scrap piece. After this step, the location of the scrap piece is a high contrast image of all white pixels on a black background. Then, a contouring algorithm can be utilized to detect boundaries of the scrap piece. The boundary information is saved, and the boundary locations are then transferred to the original image. Segmentation is then performed on the original image on an area greater than the boundary that was earlier defined. In this fashion, the scrap piece is identified and separated from the background.

In the optional process block 3506, the scrap pieces may be conveyed along the conveyor system within proximity of a distance measuring device and/or a vision system in order to determine a size and/or shape of the scrap pieces (e.g., see FIG. 5), which may be useful if an XRF system is also implemented within the sorting system. In the process block 3507, image post processing may be performed. Image post processing may involve resizing the image to prepare it for use in the neural networks. This may also include modifying certain image properties (e.g., enhancing image contrast, changing the image background, or applying filters) in a manner that will yield an enhancement to the capability of the machine learning system to classify the scrap pieces. In the process block 3509, each of the images may be resized. Image resizing may be necessary under certain circumstances to match the data input requirements for certain machine learning systems, such as neural networks. Neural networks require much smaller image sizes (e.g., 225×255 pixels or 299×299 pixels) than the sizes of the images captured by typical digital cameras. Moreover, the smaller the image size, the less processing time is needed to perform the classification. Thus, smaller image sizes can ultimately increase the throughput of the sorter system and increase its value.

In the process blocks 3510 and 3511, for each scrap piece, the type of material is identified/classified based on the detected features. For example, the process block 3510 may be configured with a neural network employing one or more machine learning algorithms, which compare the extracted features with those stored in the knowledge base generated during the training stage, and assigns the classification with the highest match to each of the scrap pieces based on such a comparison. The machine learning algorithms may process the captured image in a hierarchical manner by using automatically trained filters. The filter responses are then successfully combined in the next levels of the algorithms until a probability is obtained in the final step. In the process block 3511, these probabilities may be used for each of the N classifications to decide into which of the N sorting bins the respective scrap pieces should be sorted. For example, each of the N classifications may be assigned to one sorting bin, and the scrap piece under consideration is sorted into that bin that corresponds to the classification returning the highest probability larger than a predefined threshold. Within embodiments of the present disclosure, such predefined thresholds may be preset by the user. A particular scrap piece may be sorted into an outlier bin (e.g., sorting bin 140, sorting bin 340) if none of the probabilities is larger than the predetermined threshold.

Figure 8:
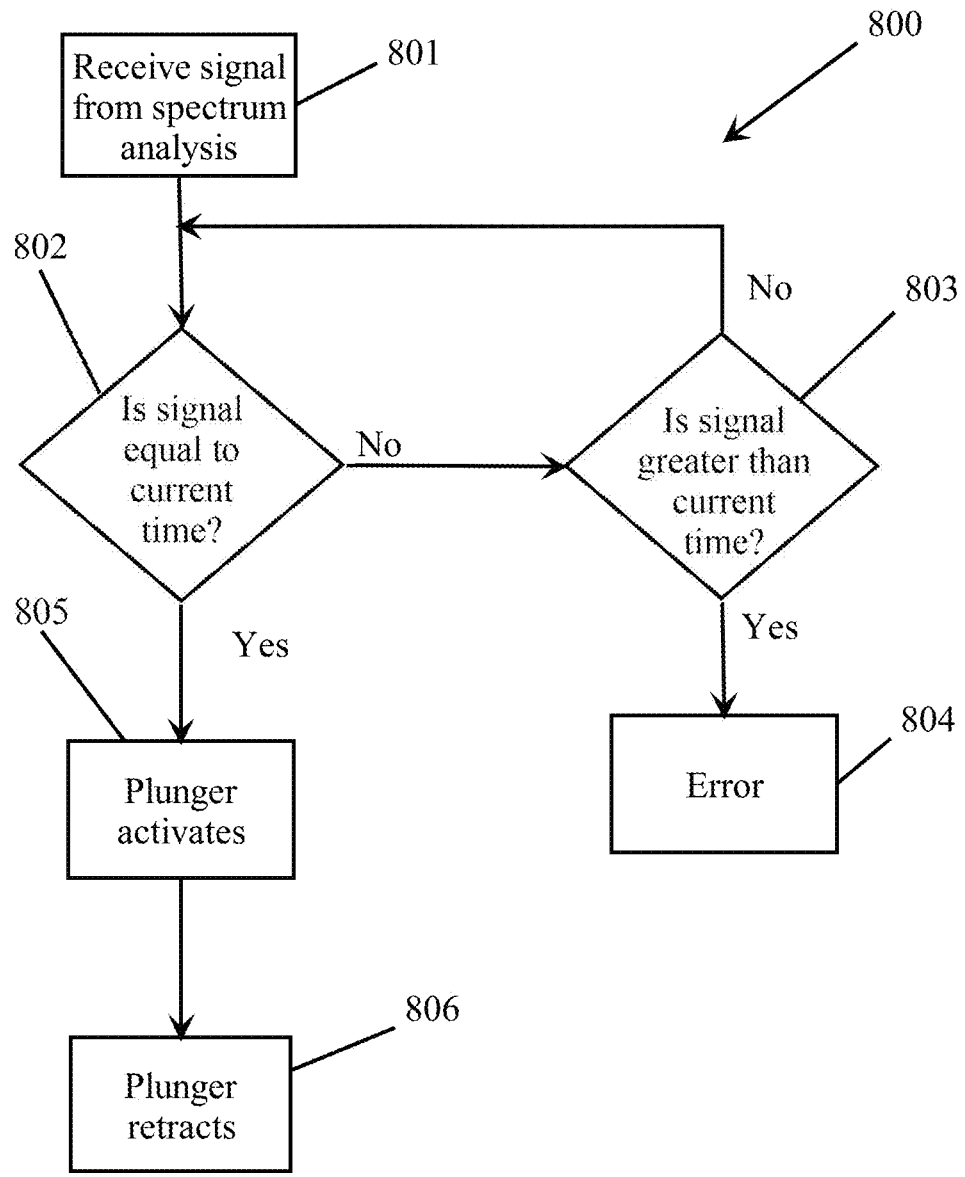
FIG. 8 illustrates a flowchart diagram of an operation of a sorting device configured in accordance with certain embodiments of the present disclosure.

Next, in the process block 3512, a sorting device corresponding to the classification, or classifications, of the scrap piece is activated (e.g., see FIG. 8). Between the time at which the image of the scrap piece was captured and the time at which the sorting device is activated, the scrap piece has moved from the proximity of the vision system to a location downstream on the conveyor belt, at the rate of conveying of the conveyor belt. In embodiments of the present disclosure, the activation of the sorting device is timed such that as the scrap piece passes the sorting device mapped to the classification of the scrap piece, the sorting device is activated, and the scrap piece is ejected from the conveyor belt into its associated sorting bin. Within embodiments of the present disclosure, the activation of a sorting device may be timed by a respective position detector that detects when a scrap piece is passing before the sorting device and sends a signal to enable the activation of the sorting device. In the process block 3513, the sorting bin corresponding to the sorting device that was activated receives the ejected scrap piece.

Figure 4:
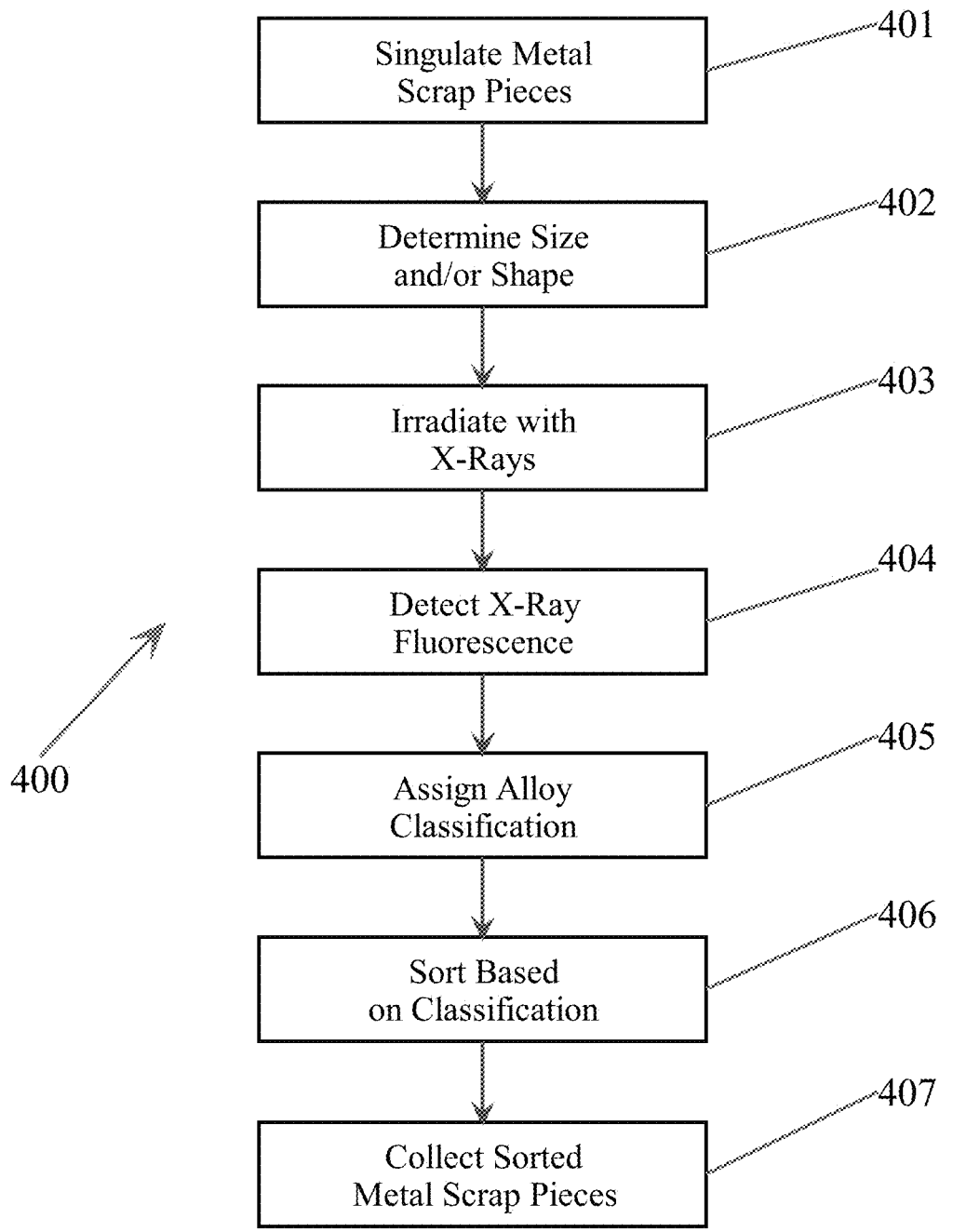
FIG. 4 illustrates a flowchart diagram configured in accordance with certain embodiments of the present disclosure.

FIG. 4 illustrates a flowchart diagram depicting exemplary embodiments of a process 400 of sorting scrap pieces in accordance with certain embodiments of the present disclosure. The process 400 may be configured to operate within any of the embodiments of the present disclosure described herein, including the sorting system 100 of FIG. 1 and the sorting system 300 of FIG. 3. The process 400 may be configured to operate in conjunction with the process 3500. For example, in accordance with certain embodiments of the present disclosure, the process blocks 403 and 404 may be incorporated in the process 3500 (e.g., operating in series or in parallel with the process blocks 3503-3510) in order to combine the efforts of a vision system (e.g., the vision system 110, 310) with an XRF system (e.g., the XRF system 120, 320) in order to classify and sort the scrap pieces.

Operation of the process 400 may be performed by hardware and/or software, including within a computer system (e.g., computer system 3400 of FIG. 34) controlling the sorting system (e.g., the computer system 107 of FIG. 1). In the process block 401, the scrap pieces may be manipulated into one or more singulated streams onto a conveyor belt. Next, in the process block 402, the scrap pieces may be conveyed along the conveyor belt within proximity of a distance measuring device and/or a vision system in order to determine a size and/or shape of the scrap pieces (e.g., see FIG. 5). In the process block 403, when a scrap piece has traveled in proximity of the XRF system, the scrap piece is irradiated with x-rays. The exposure to the x-rays from the x-ray source causes the scrap piece to fluoresce x-rays at various energy levels, producing an XRF spectrum, which has counts dependent upon the various elements present within the scrap piece. In the process block 404, this XRF fluorescence spectrum is detected by the one or more x-ray detectors (e.g., see FIG. 6). In the process block 405, for at least some of the scrap pieces, the type of material is identified/classified based (at least in part) on the detected XRF spectrum (e.g., see FIGS. 7 and 22).

Next, in the process block 406, a sorting device corresponding to the classification, or classifications, of the scrap piece is activated (e.g., see FIG. 8). Between the time at which the scrap piece was irradiated and the time at which the sorting device is activated, the scrap piece has moved from the proximity of the XRF system to a location downstream on the conveyor belt, at the rate of conveying of the conveyor belt. In certain embodiments of the present disclosure, the activation of the sorting device is timed such that as the scrap piece passes the sorting device mapped to the classification of the scrap piece, the sorting device is activated, and the scrap piece is ejected from the conveyor belt into its associated sorting bin. Within certain embodiments of the present disclosure, the activation of a sorting device may be timed by a respective position detector that detects when a scrap piece is passing before the sorting device and sends a signal to enable the activation of the sorting device. In the process block 407, the sorting bin corresponding to the sorting device that was activated receives the ejected scrap piece.

In accordance with certain embodiments of the present disclosure, a plurality of at least a portion of the system 100 or the system 300 may be linked together in succession in order to perform multiple iterations or layers of sorting. For example, when two or more systems 100, 300 are linked in such a manner, the conveyor system may be implemented with a single conveyor belt, or multiple conveyor belts, conveying the scrap pieces past a first vision system (and, in accordance with certain embodiments, an XRF system) configured for sorting scrap pieces of a first set of a heterogeneous mix of materials by a sorter (e.g., the first automation control system 108 and associated one or more sorting devices 126 . . . 129) into a first set of one or more receptacles (e.g., sorting bins 136 . . . 139), and then conveying the scrap pieces past a second vision system (and, in accordance with certain embodiments, an XRF system) configured for sorting scrap pieces of a second set of a heterogeneous mix of materials by a second sorter into a second set of one or more sorting bins.

Figure 38:
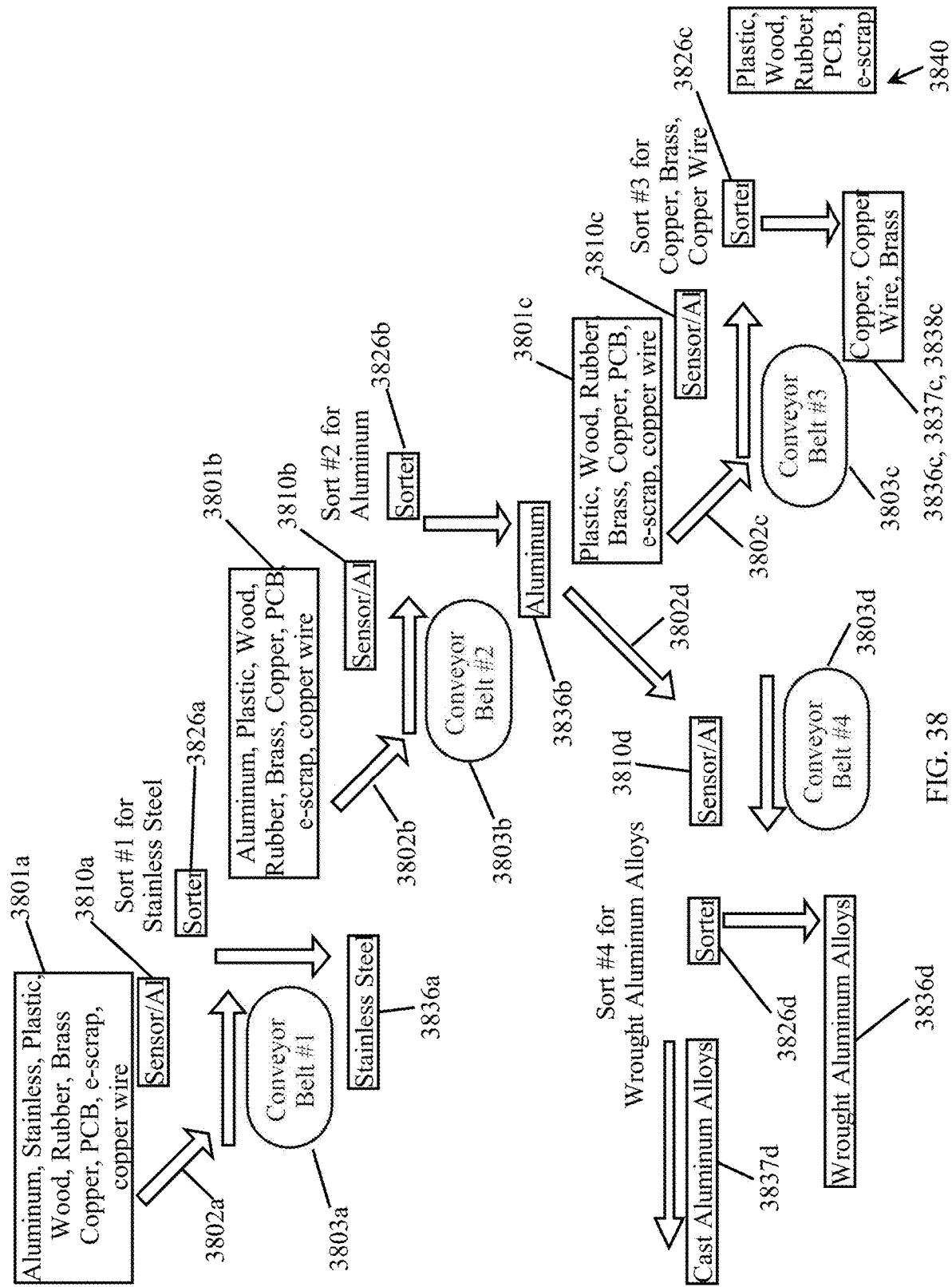
FIG. 38 illustrates linking of successive sorting systems in accordance with certain embodiments of the present disclosure.

A similar configuration can be accomplished with the system 300. Such successions of systems 100 or 300 can contain any number of such systems linked together in such a manner. In accordance with certain embodiments of the present disclosure, each successive vision system may be configured to sort out a different material than previous vision system(s). In accordance with certain embodiments of the present disclosure, one or more XRF systems may be implemented in combination with one or more of the vision systems. Referring to FIG. 38, there is illustrated a schematic diagram of a non-limiting example of a linking of successive sorting systems in a manner as previously described, which may be implemented with either or both of the sorting systems 100, 300, or any similar sorting system utilizing one or more vision systems, XRF systems and/or sensors as described herein (for the sake of simplicity, with respect to the following discussion of FIG. 38, such combinations of one or more vision systems, XRF systems and/or sensors will simply be referred to as a material classification system). In FIG. 38, the various arrows schematically depict how the various scrap pieces are conveyed along such an exemplary sorting system. In this non-limiting example, four separate sorting systems are utilized, though any number of such sorting systems may be combined in any manner in order to separate and sort various different classes of materials. The example in FIG. 38 describes various classes of materials to be sorted, but embodiments of the present disclosure are applicable to the sorting of any combination of a heterogenous mix of scrap pieces.

In this particular example, a group of materials that includes a heterogeneous mix 3801a of aluminum, stainless steel, plastic, wood, rubber, brass, copper, PCB, e-scrap, and copper wire is deposited onto a first conveyor system 3803a (identified as Conveyor Belt #1 in FIG. 38), for example, from a ramp or chute 3802a (e.g., ramp or chute 102, 302). The conveyor system 3803a conveys the scrap pieces 3801a past a material classification system 3810a, which may be configured to sort the scrap pieces made of stainless steel from the remainder of the scrap pieces (identified as Sort #1) utilizing the Sorter 3826a, which may utilize any of the sorting devices described herein, for deposit into a receptacle or bin 3836a.

The remaining heterogenous mix of scrap pieces 3801b may then be conveyed along the same conveyor system, or deposited 3802b onto a separate conveyor system 3803b (identified as Conveyor Belt #2 in FIG. 38). The conveyor system 3803b passes these scrap pieces 3801b past another material classification system 3810b, which is configured to identify and sort the scrap pieces made of aluminum (identified as Sort #2) using the Sorter 3826b for depositing in a separate bin 3836b or other receptacle.

In this particular example, the remaining heterogenous mix of scrap pieces 3801c (minus the stainless steel and aluminum scrap pieces) is then deposited 3802c onto another conveyor system 3803c (identified as Conveyor Belt #3 in FIG. 38) for identification by the material classification system 3810c to be sorted by a Sorter 3826c (identified as Sort #3). This section of the sorting system may be configured to separate and sort scrap pieces made of copper, copper wire, and brass, which may be deposited into one or more bins. In accordance with certain embodiments of the present disclosure, each of the copper, copper wire, and brass scrap pieces may be individually sorted and deposited into separate bins for copper 3836c, copper wire 3837c, and brass 3838c. The remaining heterogenous mix of scrap pieces (plastic wood, rubber, PCB, and e-scrap) may then be deposited into a receptacle or bin 3840, or may be further processed by an additional sorting system as previously described.

Embodiments of the present disclosure are not limited to a linear succession of such sorting systems, but may include a combination of branching of such sorting systems for further classification and sorting of a particular class or classes of materials. For example, FIG. 38 illustrates how the aluminum scrap pieces 3836b sorted in Sort #2 may then be deposited 3802d onto another conveyor system 3803d (identified as Conveyor Belt #4 in FIG. 38). For example, the Sorter 3826b may physically sort such aluminum scrap pieces onto another conveyor system, such as the conveyor system, or the receptacle 3836b in which the aluminum scrap pieces have been deposited may be a ramp or chute for depositing the aluminum scrap pieces onto the conveyor system, or the receptacle containing the aluminum scrap pieces may simply be manipulated to deposit the aluminum scrap pieces onto the conveyor system 3803d. A material classification system 3810d may then be configured to classify these aluminum scrap pieces into cast aluminum alloys and wrought aluminum alloys (e.g., such as described herein with respect to FIGS. 36A-37I). In this Sort #4, a Sorter 3826d may then be configured to separate the cast aluminum alloys from the wrought aluminum alloys based on the classification by the material classification system 3810d whereby the cast aluminum alloys may be deposited into a bin 3837d and the wrought aluminum alloys may be deposited into a bin 3836d.

As can be readily seen, the sorting system illustrated in FIG. 38 may be modified into any combination of sorting systems for sorting materials as desired.

Figure 16:
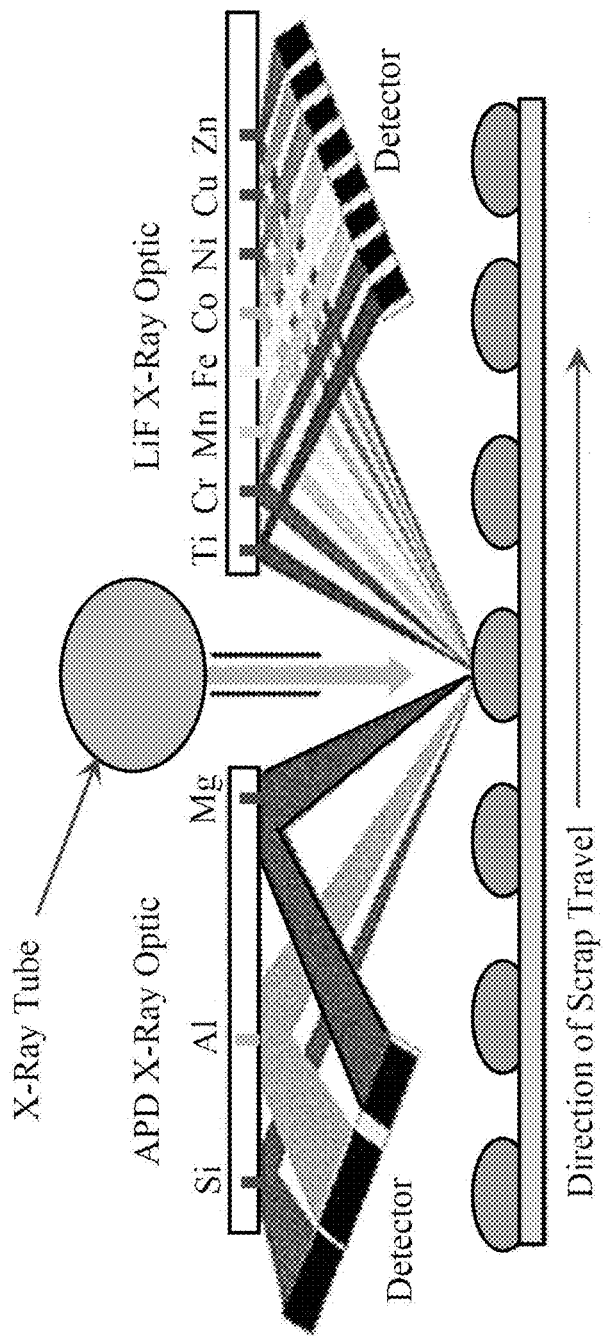
FIG. 16 schematically illustrates an exemplary XRF detector configured in accordance with certain embodiments of the present disclosure.

As has been described herein, certain embodiments of the present disclosure may utilize one or more detectors (e.g., see detectors 124 of FIG. 1) for detecting the fluoresced x-rays from the irradiated scrap pieces. Any well-known commercially available x-ray detector may be utilized. Furthermore, two or more such detectors may be implemented that each detects fluoresced x-rays for the same number of elements to be detected within the scrap pieces. Alternatively, as illustrated in the exemplary depiction of FIG. 16, one of the detectors may be configured to detect fluoresced x-rays for one or more predetermined elements while another detector is configured to detect fluoresced x-rays for other elements. The example depicted schematically in FIG. 16 shows one of the detectors configured to detect fluoresced x-rays for the elements silicon, aluminum, and magnesium, while the other detector is configured to detect fluoresced x-rays for the elements titanium, chromium, manganese, iron, cobalt, nickel, copper, and zinc. However, embodiments of the present disclosure should not be limited to the particular configuration illustrated in FIG. 16. Within certain embodiments of the present disclosure, the x-ray detectors may utilize a collimator (not shown) in which an aperture of the collimator is configured such that the detector directly receives fluoresced x-rays from the scrap piece while extraneous x-rays including x-rays irradiated from the x-ray source and incidental x-rays from other objects within the vicinity of the detector(s) are inhibited by the collimator from reaching the detector(s), thereby reducing detection of these extraneous x-rays.

Figure 5:
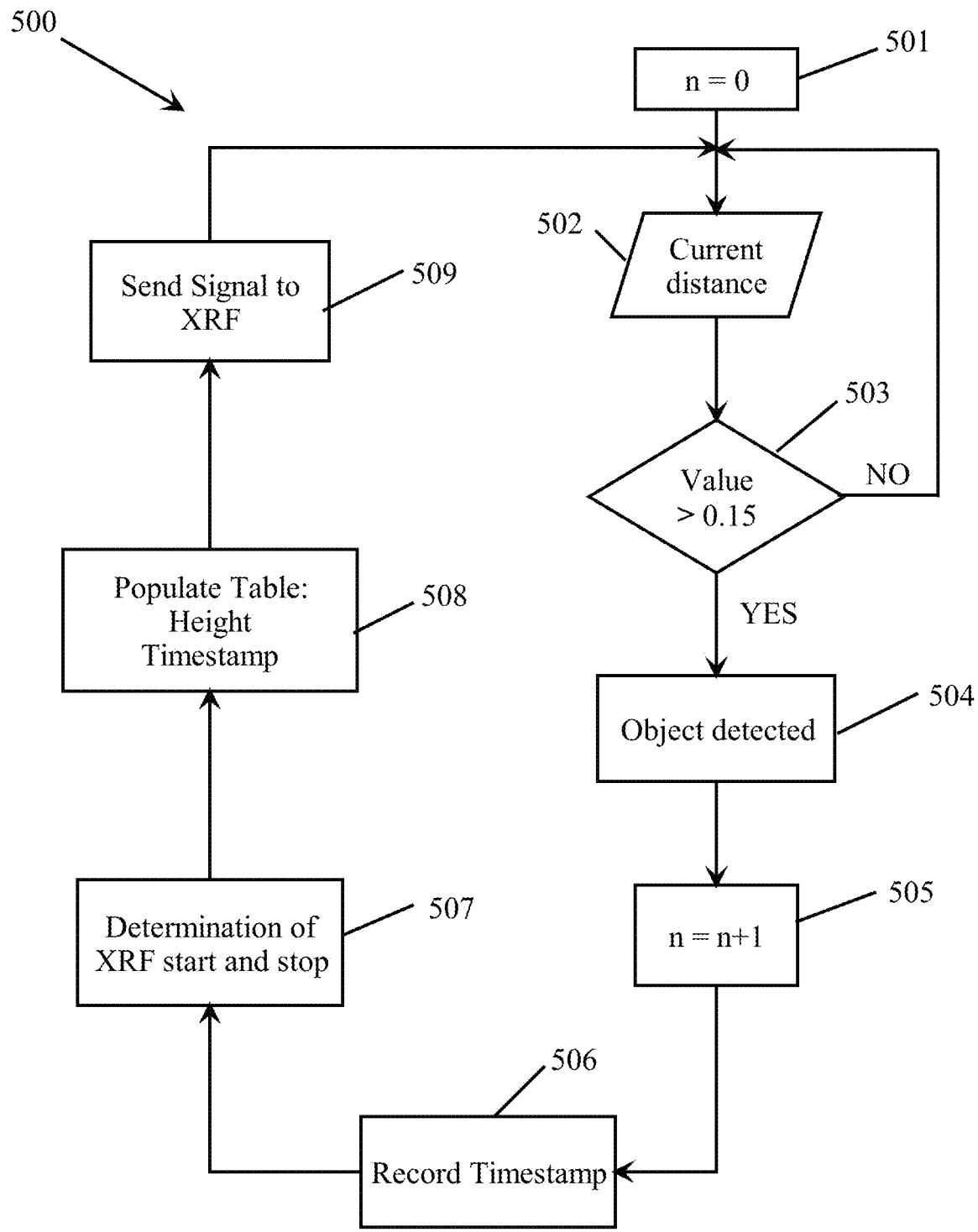
FIG. 5 illustrates a flowchart diagram of an operation of a distance measurement system configured in accordance with certain embodiments of the present disclosure.

Referring next to FIG. 5, there is illustrated a flowchart diagram of an exemplary system and process 500 for determining the approximate sizes and/or shapes of each scrap piece in accordance with certain embodiments of the present disclosure. Such a system and process 500 may be implemented within any of the vision/optical recognition systems and/or a distance measuring devices described herein, such as the distance measuring device illustrated in FIG. 1. In the process block 501, the distance measuring device may be initialized at n=0 whereby n represents a condition whereby the first scrap piece to be conveyed along the conveyor system has yet to be measured. As previously described, such a distance measuring device may establish a baseline signal representing the distance between the distance measuring device and the conveyor belt absent any presence of an object (i.e., a scrap piece) carried thereon. In the process block 502, the distance measuring device produces a continuous, or substantially continuous, measurement of distance. The process block 503 represents a decision within the distance measuring device whether the detected distance has changed to be greater than a predetermined threshold amount. Recall that once a sorting system has been initiated, at some point in time, a scrap piece will travel along the conveyor system in sufficient proximity to the distance measuring device as to be detected by the employed mechanism by which distances are measured. In certain embodiments of the present disclosure, this may occur when a travelling scrap piece passes within the line of a laser light utilized for measuring distances. Once an object, such as a scrap piece, begins to be detected by the distance measuring device (e.g., a laser light), the distance measured by the distance measuring device will change from its baseline value. The distance measuring device may be predetermined to only detect the presence of a scrap piece passing within its proximity if a height of any portion of the scrap piece is greater than the predetermined threshold distance value. FIG. 5 shows an example whereby such a threshold value is 0.15 (e.g., representing 0.15 mm), though embodiments of the present disclosure should not be limited to any particular value.

The system and process 500 will continue (i.e., repeat the process blocks 502-503) to measure the current distance as long as this threshold distance value has not been reached. Once a measured height greater than the threshold value has been detected, the process will proceed to the process block 504 to record that an object passing within proximity of the distance measuring device has been detected on the conveyor system. Thereafter, in the process block 505, the variable n may be incremented to indicate to the sorting system that another object has been detected on the conveyor system. This variable n may be utilized in assisting with tracking of each of the scrap pieces within each stream. In the process block 506, a time stamp is recorded for the detected object, which may be utilized by the sorting system to track the specific location and timing of a detected scrap piece as it travels on the conveyor system, while also representing a length of the detected scrap piece. In the process block 507, this recorded time stamp may then be utilized for determining when to activate (start) and deactivate (stop) the acquisition of an x-ray fluorescence spectrum from a scrap piece associated with the time stamp. The start and stop times of the time stamp may correspond to the aforementioned pulse signal produced by the distance measuring device. In the process block 508, this time stamp along with the recorded height of the scrap piece may be recorded within a table utilized by the sorting system to keep track of each of the scrap pieces and their resultant classification by an implemented XRF system.

Thereafter, in the process block 509, signals are then sent to the XRF system indicating the time period in which to activate/deactivate the acquisition of an x-ray fluorescence spectrum from the scrap piece, which may include the start and stop times corresponding to the length of the scrap piece determined by the distance measuring device. Embodiments of the present disclosure are able to accomplish such a task because of the time stamp and known predetermined speed of the conveyor system received from the distance measuring device indicating when a leading edge of the scrap piece will pass by the x-ray beam from the x-ray source, and when the trailing edge of the scrap piece will thereafter pass by the x-ray beam.

The system and process 500 for distance measuring of each of the scrap pieces travelling along the conveyor system is then repeated for each passing scrap piece.

Figure 6:
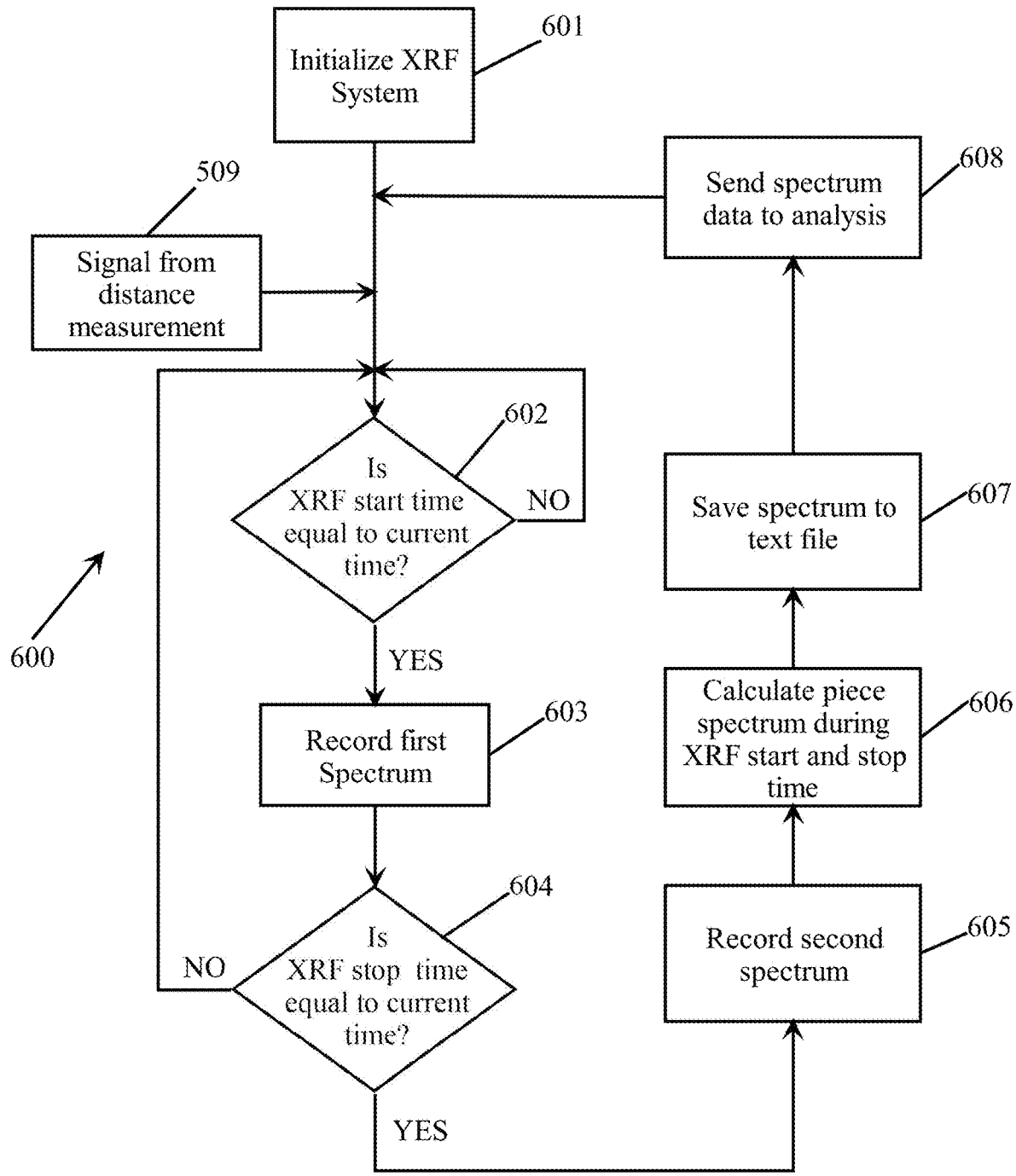
FIG. 6 illustrates a flowchart diagram of an operation of an x-ray fluorescence ("XRF") system configured in accordance with certain embodiments of the present disclosure.

Referring next to FIG. 6, there is illustrated a system and process 600 for acquiring an x-ray fluorescence spectrum from each of the scrap pieces in accordance with alternative embodiments of the present disclosure that implement an XRF system. Such a system and process 600 may be implemented within any of the XRF systems described herein.

The XRF systems utilize x-ray fluorescence for classification of scrap pieces. X-ray fluorescence detected from a material may be utilized to identify some or all of the elements present within the material, including the quantities or relative quantities of such elements. Certain embodiments of the present disclosure may then utilize the identification of such elements to identify the type of material pertaining to the detected fluoresced x-rays. Furthermore, certain embodiments of the present disclosure may utilize the identification of the elements within the material in order to classify the material according to a predetermined standard. For example, in accordance with certain embodiments of the present disclosure, x-ray fluorescence detected from an aluminum alloy material (e.g., an aluminum alloy scrap piece) may be utilized to assign an aluminum alloy classification to the material (including in accordance with the aluminum alloy classifications designated by the Aluminum Association).

Within x-ray fluorescence spectroscopy, the use of characteristic x-rays emitted under excitation provides a method for identification of elements and their relative amounts present in different materials. The energy of emitted x-rays depends on the atomic number of the fluorescing elements. Energy-resolving detectors are then used to detect the different energy levels at which x-rays are fluoresced, and generate an x-ray signal from the detected x-rays. This x-ray signal may then be used to build an energy spectrum of the detected x-rays, and from that information, the element or elements that produced the x-rays may be identified.

Fluorescent x-rays are emitted isotopically from an irradiated element, and the detected radiation depends on the solid angle subtended by the detector and any absorption of this radiation prior to the radiation reaching the detector. The lower the energy of an x-ray, the shorter the distance it will travel before being absorbed by air. Thus, when detecting x-rays, the amount of x-rays detected is a function of the quantity of x-rays emitted, the energy level of the emitted x-rays, the emitted x-rays absorbed in the transmission medium (e.g., air, a non-vacuumed environment, or a vacuumed environment), the angles between the detected x-rays and the detector, and the distance between the detector and the irradiated material. These x-rays cause each piece of material to fluoresce x-rays at various energy levels, depending on the elements contained in the piece. The fluoresced x-rays are detected, and the piece of material is then classified based on the fluoresced x-rays and sorted in accordance with this classification.

Elements or materials with low atomic numbers (such as present within aluminum alloys) do not lend themselves well to x-ray fluorescence analysis, since x-ray photons fluoresced from such low atomic number materials are at a low yield and are low energy (~1-2 keV). Because they are low energy, they are easily absorbed in the air before reaching the detection system. This process also, by nature of the detection system, requires a significant time interval to build and analyze spectral information for each piece of material analyzed. Consequently, systems that operate according to this process are limited in their throughput rate of materials. For high throughput rates, it is desired to have a faster acting analysis system in order to process materials faster and at greater volumes. As will be described herein, certain embodiments of the present disclosure are able to classify a heterogeneous mixture of materials from each other at a higher throughput rate.

At the start-up of the sorting system, the XRF system may be initialized in the process block 601, which may include powering up the x-ray source. The aforementioned signals generated by the process block 509 of FIG. 5 may then be received on a substantially continuous basis. Since the sorting system may be configured to coordinate the timing (e.g., from the aforementioned time stamp and XRF start and stop timers) generated by the distance measuring device with the timing of the XRF system (utilizing the predetermined speed of the conveyor system) these signals can then be utilized by the XRF system for activation and deactivation of the acquisition of fluoresced signals for classification of each of the scrap pieces.

As the XRF system receives the timing signals 509, it will determine whether an XRF start time in the signals is equal to the current time. In other words, the sorting system has determined from the distance measuring device the time in which the previously detected scrap piece will be passing within the proximity of the target location along the conveyor system to which the x-ray beam from the x-ray source is directed. The XRF system will continue to wait (by recycling through the process block 602) until it has determined that the previously detected scrap piece is expected to pass the target location of the x-ray beam. In the process block 603, when the XRF start time is equal to the current time, the detected XRF spectrum (e.g., the counts for each channel (corresponding to an element)) of the fluoresced x-rays is recorded by the XRF system, representing the total per-channel energy counts detected by the detector at the moment just before the x-ray beam begins to irradiate the leading edge of the scrap piece. This will continue (by recycling through process blocks 602 . . . 604) until the XRF stop time is determined to be equal to the current time. Thus, the per-channel counts are accumulated while the scrap piece is being irradiated by the x-ray beam. Once this has occurred, in the process block 605, a second (e.g., final) XRF spectrum is recorded, representing the final total per-channel counts for the scrap piece. As with the XRF start time, when the sorting system has determined that the trailing edge of the scrap piece is expected to pass by the x-ray beam, the accumulation of detector counts is stopped.

Within certain embodiments of the present disclosure, it may be important to only acquire and analyze the XRF spectra of the scrap pieces, and not any XRF emitted from the conveyor belt, since such conveyor belts may contain certain percentages of the elements that are important for distinguishing between the compositions of the various scrap pieces. Such elements may be present in the belt from when it was manufactured. More particularly, since aluminum alloys have low energy elements, fluorescence from the conveyor belt may prevent the sorting system from distinguishing between certain aluminum alloys. Additionally, in certain embodiments of the present disclosure, the per-channel counts acquired for each scrap piece are accumulated in the system as total running counts for a plurality of irradiated scrap pieces, and not reset for each scrap piece, in order to save on processing time by the system. As a result, it may be important within certain embodiments of the present disclosure to only acquire XRF spectra during time periods defined by the aforementioned XRF start and stop times.

In the process block 606, the total counts for each channel for the scrap piece as determined by the XRF start and stop times is determined (for example, by subtracting the total counts acquired at the XRF start time from the total counts acquired at the XRF stop time), which are then saved to a file (e.g., text file) in the process block 607. In the process block 608, the XRF system then sends this saved data file to the sorting system for analysis and classification of the scrap piece.

Alternatively, the system and process 600 may be utilized in order to calibrate the system, including to input data pertaining to standard reference materials and their classifications, which are then used to identify/classify unknown scrap pieces.

Figure 7:
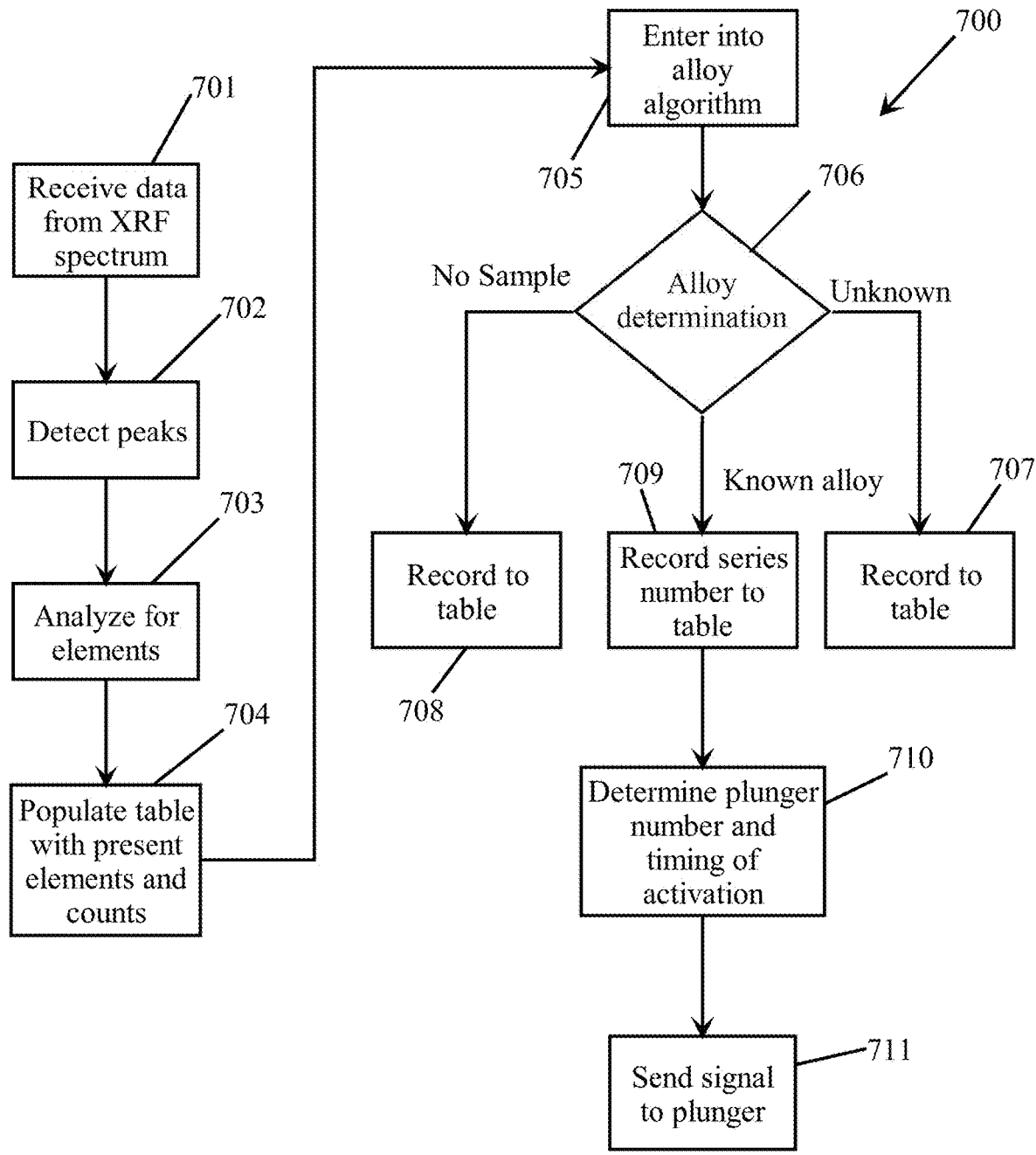
FIG. 7 illustrates a flowchart diagram of a system and process for classifying materials in accordance with certain embodiments of the present disclosure.

Referring next to FIG. 7, there is illustrated a system and process 700, configured in accordance with certain embodiments of the present disclosure, for classification of scrap pieces as a function of the detected XRF spectrum resulting from the system and process 600 previously described with respect to FIG. 6. The system and process 700 may be implemented with respect to any of the sorting system embodiments described herein. In the process block 701, the XRF spectrum data (representing the accumulated total counts for each channel pertaining to the irradiated scrap piece) is received (e.g., from the process block 608). In the process block 702, the peaks (e.g., the per-channel counts) of the spectrum are detected, and then in the process block 703, they are analyzed for associating with their various elements detected within the scrap piece. In the process block 704, the aforementioned table entry corresponding to the scrap piece may be populated with the determined elements and their respective counts, which are then entered in the process block 705 into a material classification algorithm, such as described in further detail herein (e.g., see FIGS. 17-22, 25-29, and 32-33).

In the process block 706, the system and process 700 makes a determination whether the composition of the scrap piece is known as a result of the implementation of the material classification algorithm. If the classification of the scrap piece is unknown, or if there is insufficient data to determine that a sample was even detected, these may be recorded into a table (process blocks 707 and 708, respectively). If the scrap piece classification has been determined by a material classification algorithm, then in the process block 709, the classification may be recorded in a table corresponding to the scrap piece; in certain embodiments of the present disclosure, the classification may include a particular alloy series number corresponding to the determined classification. In the process block 710, a sorting device (e.g., air jet, plunger, paint brush type plunger, etc.) positioned along the singulated stream in which the scrap piece is travelling, and associated with the determined material classification (which may be performed via a vision system 110, 310 in combination with the XRF system 120, 320), is identified along with the time period during which the scrap piece will pass by this sorting device. In the process block 711, signals pertaining to the identified time period are sent to the particular sorting device (or to a device controlling the sorting device, (e.g., see the automation control system 108 of FIG. 1)).

Referring next to FIG. 8, there is illustrated a system and process 800 for activation of each one of the sorting devices for ejecting a classified scrap piece into a sorting bin. Such a system and process 800 may be implemented within the automation control system 108 previously described with respect to FIG. 1, or within an overall computer system (e.g., the computer system 107) controlling the sorting system. In the process block 801, the aforementioned signal generated in the process block 711 of FIG. 7 is received. In process block 802, a determination is made whether the timing associated with this signal is equal to the current time. Similar to the previously described timing for activation and deactivation of the XRF system for each of the scrap pieces passing along the conveyor system, the system and process 800 determines whether the timing associated with the classified scrap piece corresponds to the expected time in which the classified scrap piece is passing within the proximity of the particular sorting device (e.g., air jet, pneumatic plunger, paint brush type plunger, etc.) associated with the classification pertaining to the classified scrap piece. If the timing signals do not correspond, a determination is made in the process block 803 whether the signal is greater than the current time. If YES, the system may return an error signal. In such an instance, the system may not be able to eject the piece into the appropriate bin. Once the system and process 800 determines that a classified scrap piece is passing within the vicinity of a sorting device associated with that classification, it will activate that sorting device in the process block 805 in order to eject the classified scrap piece into the sorting bin associated with that classification. This may be performed by activating a pneumatic plunger, paint brush type plunger, air jet, etc. In the process block 806, the selected sorting device is then deactivated.

Referring to FIGS. 9-13, certain embodiments of the present disclosure that implement an XRF system may be configured to utilize a novel in-line x-ray fluorescence ("IL-XRF") system, such as for the XRF system 120 of FIG. 1 or the XRF system 320 of FIG. 3. Such an IL-XRF system utilizes a novel linear x-ray tube 900, which may be configured with N (N≥1) separate x-ray sources, wherein the linear x-ray tube 900 is configured so that each of the N x-ray sources separately irradiates scrap pieces travelling along one or more of the singulated streams For example, referring to FIGS. 3 and 9, if the linear x-ray tube 900 was utilized in the XRF system 320, it could be configured and positioned over the conveyor belt 380 so that the x-ray source 910 would irradiate scrap pieces travelling in the left-most singulated stream initiated by the plunger 351, the x-ray source 911 would irradiate scrap pieces travelling in the second from the left-most singulated stream initiated by the plunger 352, the x-ray source 912 would irradiate scrap pieces travelling in the third from the left-most singulated stream initiated by the plunger 353, and the x-ray source 913 would irradiate scrap pieces travelling in the right-most stream initiated by the plunger 354. Though the linear x-ray tube 900 is described herein having four x-ray sources, such a linear x-ray tube may be configured with any number N (N≥1) of such x-ray sources.

Furthermore, the linear x-ray tube 900 may be configured so that any of its separate x-ray sources irradiates scrap pieces travelling in multiple parallel streams Note that a linear x-ray tube similar to the linear x-ray tube 900, but having any other number N of in-line arranged x-ray sources may be utilized in any sorting system as described herein, or any other sorting system known in the art, or yet to be developed. Such an IL-XRF system provides a linear x-ray tube having multiple sources instead of one each operable at a relatively low power, which significantly reduces the cost and power requirements versus having to utilize multiple separately powered x-ray sources for sorting multiple streams of materials.

Referring to FIGS. 9-12, a linear x-ray tube 900 includes an anode assembly 960, N cathode materials 990, and a grid assembly 939, positioned inside of a vacuum package 901. The anode assembly 960 may be composed of a conductive (e.g., copper) bar mechanically attached to a high voltage feed-through 921. This bar may substantially span a length of the x-ray tube 901. Alternatively, the anode assembly 960 may be a plurality (e.g., N) of separate conductive bars connected in series. Several different coatings may be added to the copper bar 960, including, molybdenum, tungsten, silver, or any metal. This metal or combinations of metals can then be brazed onto the copper bar 960 in order to provide a layer that will generate the desired x-ray spectrum. Different metals will generate different output spectra from the x-ray tube. In addition to brazing, these metals may be mechanically attached to the bar 960. The bar 960 may also be composed of any metal other than copper. The high voltage feed-through 921 transfers a high voltage from the external environment (e.g., see the x-ray power supply 122 of FIG. 1) of the x-ray tube to the inside of the x-ray tube 100. The anode 960 and all the materials it comes into contact may be held at this high voltage (e.g., 0-50 kV).

Figure 9:
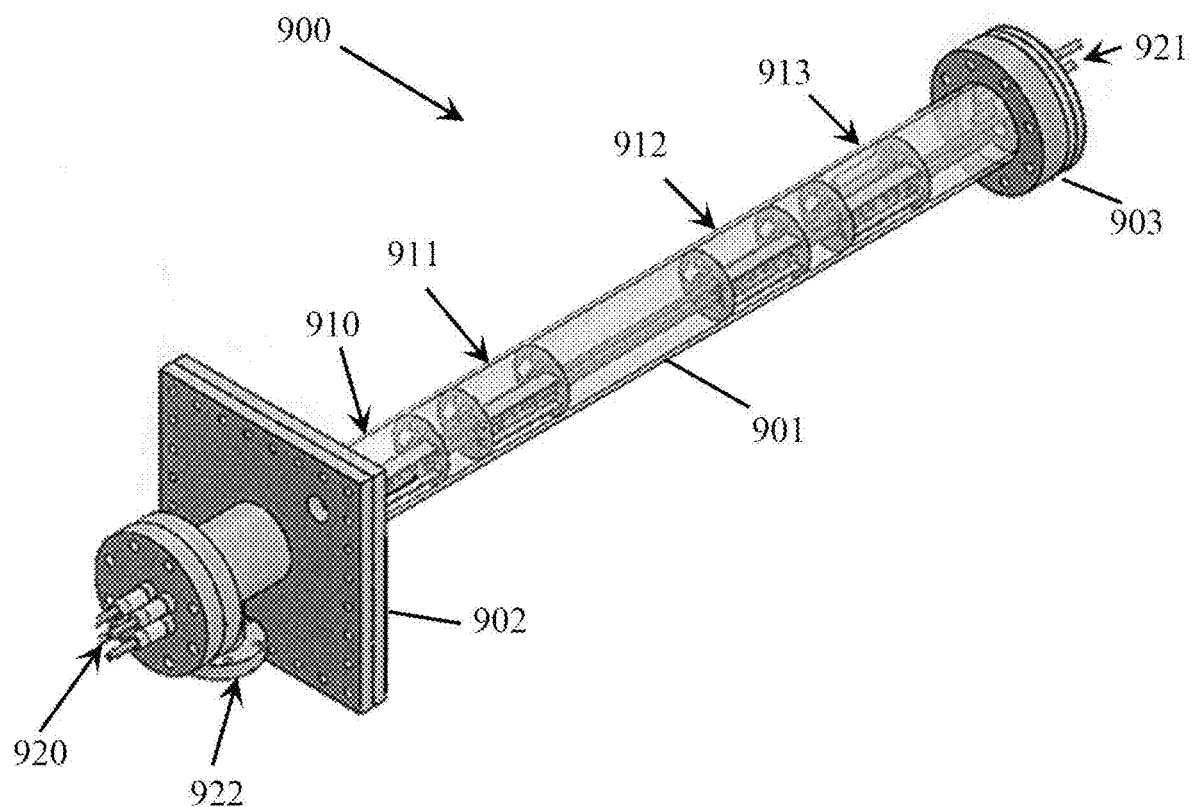
FIGS. 9-13 illustrate an exemplary in-line x-ray fluorescence ("IL-XRF") source configured in accordance with certain embodiments of the present disclosure.
Figure 10:
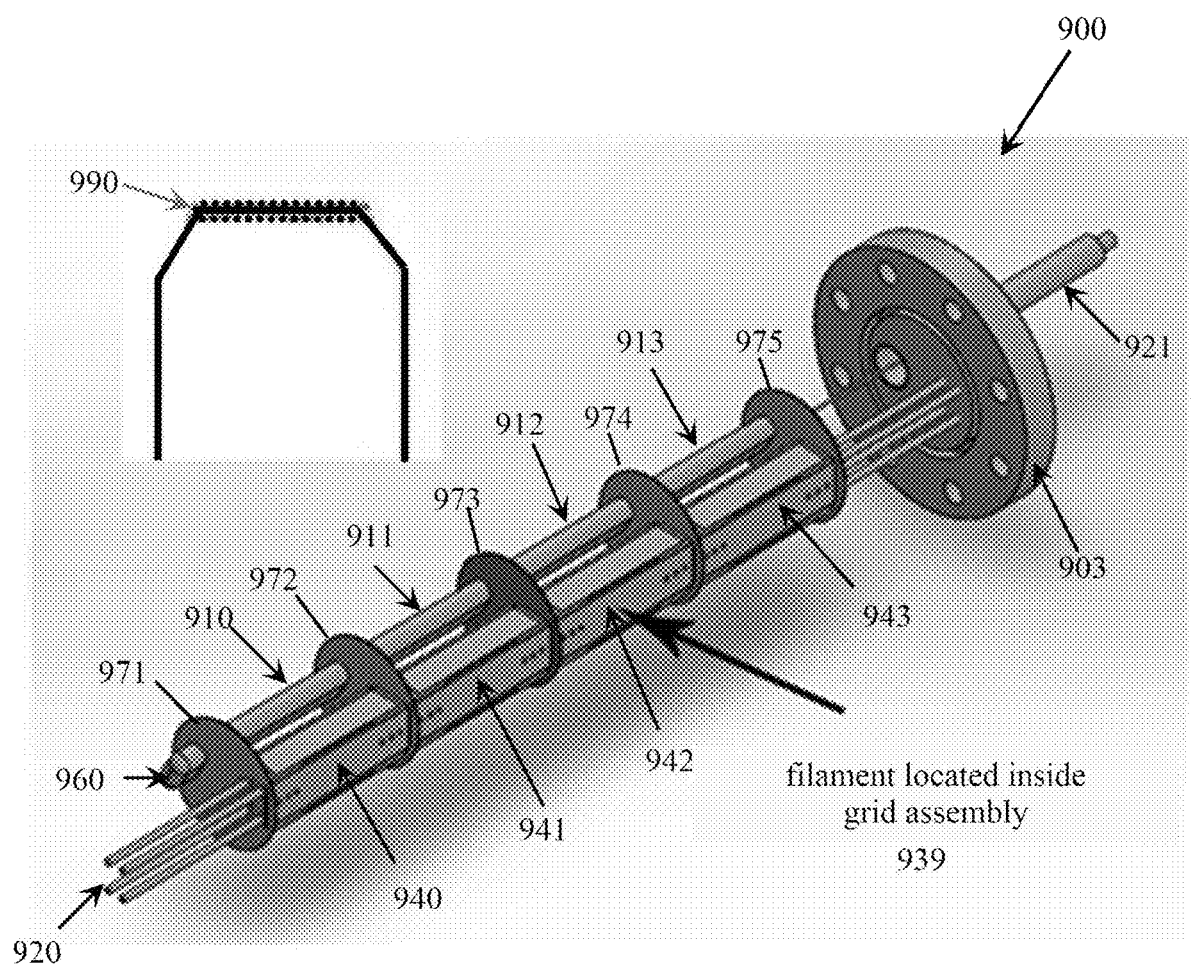

A purpose of the cathode material 990 (see inset) is to emit electrons. The cathode material 990 may be made of tungsten, but may also be thoriated tungsten, an oxide cathode, a cold cathode, or any electron emitter. The tungsten filaments may be wound into a spiral shape in order to increase the electron emission density for the volume of the spiral section of the filament shape. The two ends of the filament 990 may be held at a DC voltage, e.g., 0-15 volts with respect to ground. Application of the DC voltage causes the filaments 990 to heat to a very high temperature. When the temperature is sufficiently high, electrons are released (e-beam) from the filaments 990. A single cathode 990 produces an electron beam (e-beam) that is then focused onto a section of the anode assembly 960. The linear x-ray tube 900 may utilize an array of N (N≥1) cathodes 990 linearly arranged in order to produce multiple electron beams (e-beams), which impact the anode 960 in different sections along the length of the anode assembly 960. The cathodes may be connected to one or more feed-throughs 920 that transfer a voltage from outside the x-ray tube 900 to the filaments 990 inside the x-ray tube 900. As illustrated in FIGS. 9-10, a linear x-ray tube 900 having N x-ray sources may separately control activation and deactivation of each of the N x-ray sources by connecting each of the N cathode filaments 990 to a separate feed-through 920.

Each grid 940 . . . 943 within the grid assembly 939 may be a conductive (e.g., copper) block, which functions to isolate each of the N electron beams (e-beams) along specific paths inside the x-ray tube 900. Without the grid, electrons might scatter all around inside the x-ray tube 900 causing arcing and/or premature failure of the x-ray tube 900. The electrons that are not emitted along the intended path towards the anode 960 may be collected into the grid assembly where there are electrically removed through the grid circuit.

Figure 11:
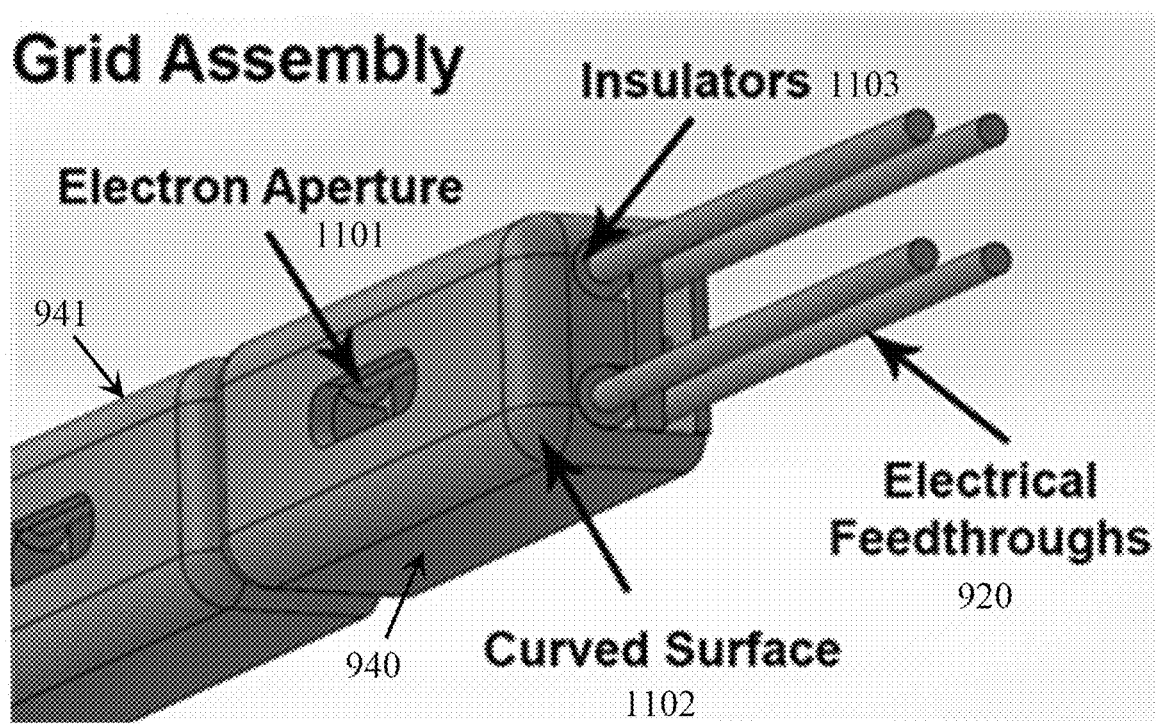
Figure 12:
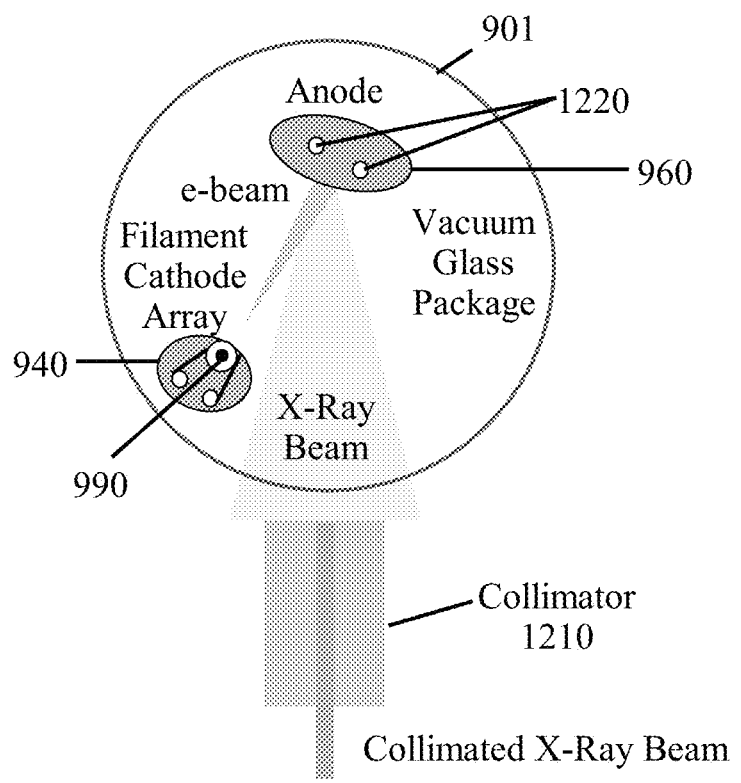

Referring to FIGS. 10-12, each of the grids 940 . . . 943 may be configured to hold a voltage used to control the flow of electrons through an aperture 1101 in the grid. Changing the voltage from a negative value to a relatively more positive value will focus the e-beam to a desired shape as the e-beam travels to the anode 960. Each grid may also be shaped to have curved surfaces, which function to generate a uniform electric field distribution in order to mitigate high voltage stress, thus helping to prevent arcs and premature failure of the x-ray tube 900. Each grid may also have a multitude of feed-throughs to allow conductive rods (e.g., copper) of differing voltages to pass through the grid assembly 939. Insulators (e.g., made of a ceramic) may be clamped to each grid to insulate these copper rods. The entire grid assembly 939 may be demountable, allowing the change of a filament 990 when it needs to be replaced.

Insulators (e.g., made of a ceramic) 971 . . . 975 may be used as high-voltage standoffs. These standoffs 971 . . . 975 may be spaced in between the grids 940 . . . 943 and in between the anode assembly 960 and cathode assembly 939. The insulators 971 . . . 975 may be utilized to mechanically hold the anode assembly 960 in place, and may also serve to separate the high voltage from the low voltages. These insulators 971 . . . 975 may also have special cutouts (not shown) to increase the rate of vacuum conduction within the tube package.

A demountable vacuum package configured for implementing a linear x-ray source may include a glass tube 901, O-rings, flanges 902, 903, a gated vacuum valve 922, a turbo pump (not shown), and a rough pump (not shown). The rough pump and turbo pump pull a vacuum on the tube to a high vacuum. The long glass tube 901 holds the x-ray components. The vacuum package 901 may be demountable (e.g., by removing one of the flanges 902, 903) to allow x-ray tube components to be replaced (e.g., when they have reached their end of life). The flanges and O-rings may be used to create a reusable vacuum seal. The linear x-ray tube 900 may include an integrated cooling system (e.g., utilizing water) (not shown). For example, water may be passed through a feed-through 1220 into the vacuum package 901 and into a cavity within the anode 960. There may also be a water feed-through (not shown) for water cooling into the grid assembly to cool the cathodes.

As shown in FIG. 12, the linear x-ray tube 901 may further include a collimator 1210 associated with each of the x-ray sources. The collimator 1210 may have an aperture that is aimed at a detection area where a particular scrap piece is to be irradiated. As used herein, a "collimator" is a device having an aperture that limits the transmission of x-rays of an x-ray beam such that the x-rays move in the same, or nearly the same, direction. Within certain embodiments of the present disclosure, such collimators may be made from a series of closely spaced parallel metal plates utilized to direct the x-ray beam. These direct and incidental x-rays are referred to herein as background noise. Background noise may include x-rays fluoresced or reflected from objects other than the scrap pieces, including any interior surfaces of an x-ray device chamber, the conveyor belt, or any other objects within the vicinity of the XRF system. Such background noise may be caused by the irradiating x-rays and fluoresced x-rays impacting other objects in proximity to the detector(s) and causing secondary fluorescence. Within certain embodiments of the present disclosure, the choice of resolution of an XRF spectrum may be a function of the resolution desired and the resolution capability of the one or more x-ray detectors. X-ray optics (not shown) may be used to focus a divergent primary x-ray beam into a convergent beam. X-ray optics may take the forms of crystals, capillaries, plastics, metals, or glass. The effect of the optics may reduce the amount of power needed by the x-ray tube and also increase the count rate of the spectrum as seen by the detector. Overall, this can reduce the analysis time for the XRF measurement.

Figure 13:
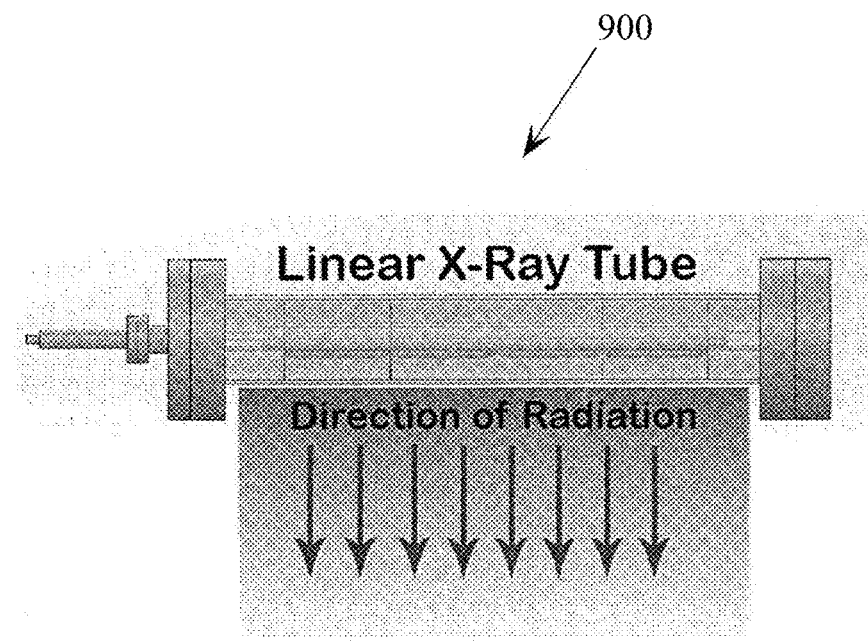
Figure 14:
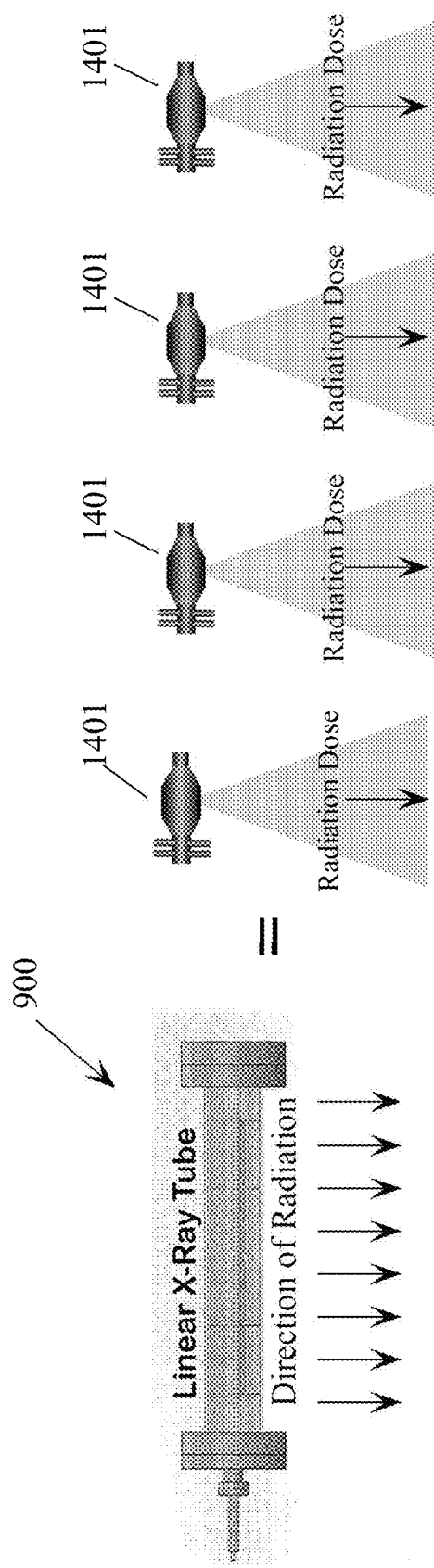
FIGS. 14-15 illustrate a comparison of an IL-XRF source to a prior art XRF source.
Figure 15:
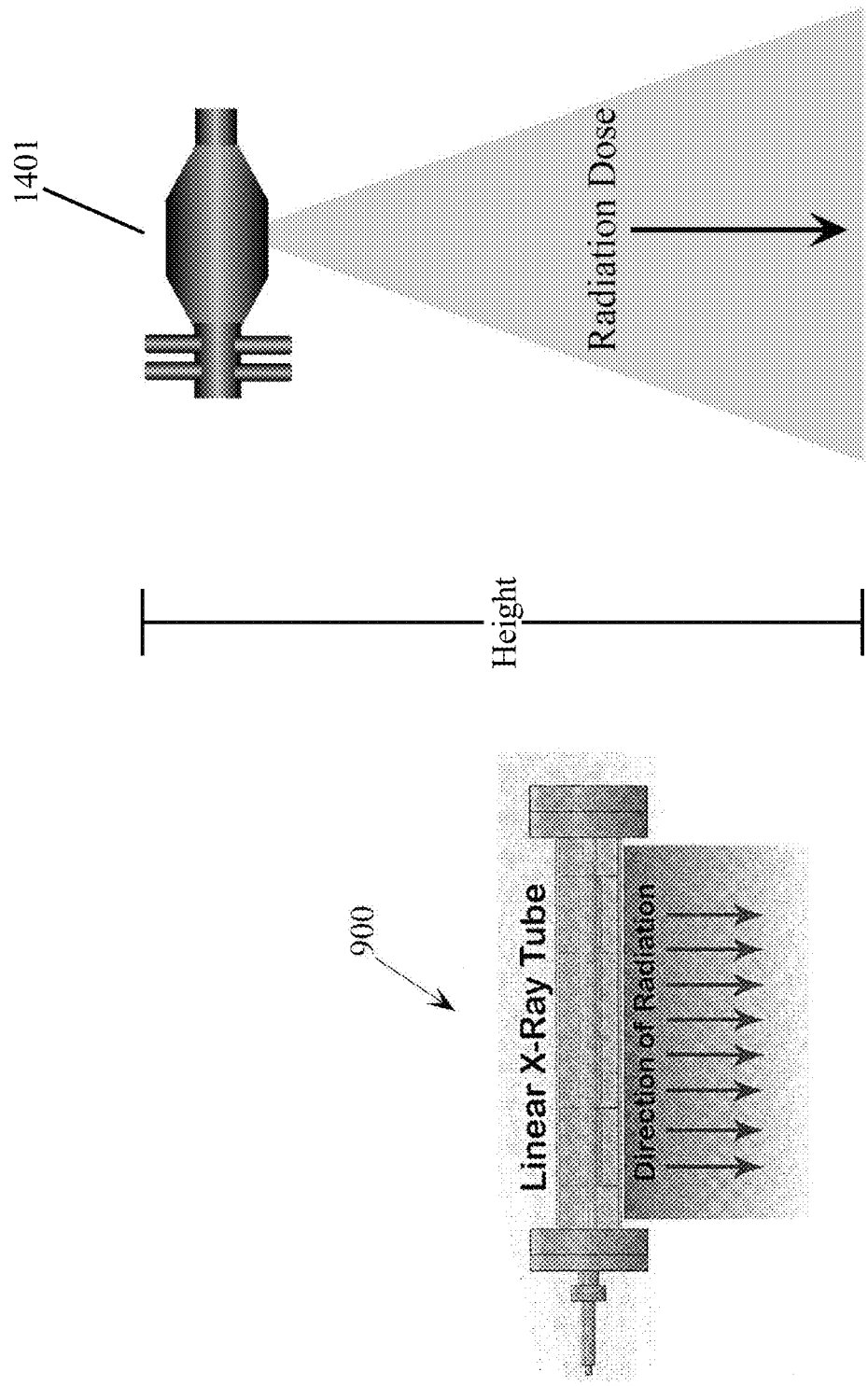

As depicted in FIGS. 13-14, the linear x-ray tube 900 delivers a linear radiation flux outside of the tube 901, which can then be utilized to irradiate along a line generally transverse to the travelling direction of the conveyor system. Conventional x-ray sources 1401 have one spot on their anode that coincides with the electron beam size. As depicted in FIGS. 14-15, the linear x-ray tube 900 is distinguished from a conventional x-ray source 1401 by having the ability to generate radiation in a linear and not a conical fashion. The generation of x-ray flux is dependent on this electron beam spot size. The linear x-ray tube 900 in accordance with certain aspects of the present disclosure has N electron beam spots arranged in a linear array, and therefore produces a directed x-ray flux with a linear component.

A conventional x-ray source 1401 only delivers conical radiation and cannot deliver linear radiation. The cost of one linear x-ray tube 900 is much less than the cost of an equivalent number of conventional x-ray sources 1401, which would be needed to deliver the equivalent linear radiation of the linear x-ray tube 900 (as depicted in FIG. 14). For example, compared to one linear x-ray tube 900 with ten cathodes in one linear array, it would take ten conventional x-ray sources 1401 to generate an equivalent radiation dose. The cost of 10 conventional x-ray sources is at least ten times the cost of one linear x-ray tube 900.

The attenuation rate of x-rays is proportional to the inverse square of the distance between the x-ray source and the sample. In other words, radiation intensity decreases exponentially as it travels through air. In order for a conventional x-ray source 1401 with a conical x-ray beam to cover a large area of radiation, the power level must be very high. As depicted in FIG. 15, a linear x-ray device 900 configured in accordance with certain aspects of the present disclosure, because it can be positioned closer to the sample (e.g., a scrap piece), does not suffer from as much air attenuation as does a conventional x-ray source 1401. In order for a conventional x-ray source 1401 to cover the same radiation level as a linear x-ray tube 900, it would have to generate an exponentially larger amount of power. Note that in certain embodiments of the present disclosure, except for a vacuum created within the immediate vicinity of the x-ray tube 900, the emitted x-rays travel through ambient air towards the scrap pieces.

Conventional x-ray sources 1401 use a tungsten anode and typically operate at 160 kV and 6 kW of power. They require this exponentially larger power because they cannot be positioned close to the sample and still maintain a sufficiently large surface area of coverage (see FIG. 15). When a linear x-ray tube 900 configured in accordance with certain aspects of the present disclosure is placed closer to the sample, it can thus operate at a lower power (e.g., 15 kV and 15 watts) because there is less attenuation of the radiation through the air.

Conventional x-ray sources 1401 with a conical beam shape whose radiation covers a large area operate at 160 kV in order to minimize the attenuation of the primary radiation beam through air. The primary radiation strikes the sample and scatters back into the detector. The scattered radiation entering the detector ranges from 0-160 kV and fills the detector with so many counts that the detector saturates. The detector when saturated is unable to accurately detect smaller numbers of photons (such as within aluminum alloys). When the detector is saturated, the characteristic fluorescence photons that are generated from the sample are not counted by the detector. Therefore, if the primary beam is operated at 160 kV, the detector will not be able to collect the characteristic fluorescence from the sample in a satisfactory manner in order to classify the material.

In order to view a characteristic radiation for lighter elements such as those within aluminum alloys (which are generally all less than 10 kV), an x-ray tube voltage much lower than 160 kV should be used. The inventors have determined that a voltage of approximately 12 kV-15 kV can be used for exciting an aluminum alloy piece and subsequently measuring the characteristic fluorescent photons at the detector in order to successfully classify the aluminum alloys.

As noted, x-ray radiation attenuates in air. Moreover, x-ray radiation attenuates in air as a function of its energy level. Therefore, a photon with an energy of 1 keV will absorb in air in less than 0.25 inches. A photon with an energy of 20 keV will travel several feet before it absorbs into air. The x-ray fluorescence from various metal alloys (e.g., aluminum alloys) cover a range from approximately 1.4 kV-10 keV. This means that the lower energy photons will attenuate at a faster rate than the higher energy photons. For example, if a metal alloy (e.g., aluminum alloy) has magnesium and zinc, it will fluoresce magnesium photons with an energy of 1.25 keV and zinc photons at 8.6 keV. If the fluorescence detector is positioned about 0.1 inches away from the sample (e.g., a scrap piece), both of the magnesium and zinc photons will be detected. However, if the detector is positioned further away (e.g., about 2 inches) from the sample, the magnesium photons will not be detected, because they will have been absorbed into the intervening air. Only the zinc photons will be detected. If the detector is positioned about 0.2 inches away from the detector, however, the same metal alloy would produce the same fluorescence, but the detector would measure less magnesium and the same amount of zinc.

Within aspects of the present disclosure, in order to account for the attenuation of photons in air, the detector (e.g., the detectors 124, or the entire x-ray system 120 of FIG. 1) may be automatically moved relative (i.e., closer and farther) to the scrap piece, with the distance between the scrap piece and the detector measured and retrieved. Based on the distance between the scrap piece and detector, certain aspects of the present disclosure (which may be implemented within a computer-operated process) would calculate the attenuation for each energy for each type of alloy. A process would then determine the original XRF spectrum from the scrap piece, minus the attenuation from air. This new XRF spectrum could then be utilized as input into a classification algorithm (e.g., see FIGS. 7 and 22) in order to classify the alloy.

Within the detector electronics (e.g., the detector electronics 125 of FIG. 1), a wavelength dispersive x-ray fluorescence ("WD-XRF") analysis or an energy dispersive x-ray fluorescence ("ED-XRF") analysis may be utilized. WD-XRF can be used to simultaneously determine the elemental concentrations of a scrap piece. WD-XRF detectors use crystals and Bragg diffraction to split the fluorescence radiation from the scrap piece into different paths. The location for each path is determined by the energy of fluorescence. Because the fluorescence is split into a fan beam where each location on the beam corresponds to a unique energy level, low cost detectors can be used to detect this location dependent fluorescence. For example, a linear array of a pulse counter, SiPN, or MPPC detector(s) could be used instead of SDD, SiLi, or Ge detectors. The use of pulse counters or SiPN diodes are less expensive and bring down the overall cost of the detection system.

WD-XRF differs from energy dispersive x-ray fluorescence ("ED-XRF") analysis by the use of the detectors. ED-XRF systems use a single detector operating in an energy dispersive mode. ED detectors, such as the SiLi and SDD, detect all energies of the fluorescent radiation and then electronically separate them all into bins in order to generate the spectrum.

Monochromators, filters, and optics may be used in an XRF system configured in accordance with certain embodiments of the present disclosure in order to enhance the signal-to-noise ("SNR") or peak-to-background ("P/B") ratio. The primary beam of radiation that exits the x-ray tube is polychromatic and divergent. The polychromatic nature of the primary x-ray beam includes Bremsstrahlung radiation, which contributes to background of the spectrum, reducing the quality of the spectrum. As this background value is reduced, the P/B ratio increases, allowing a more desirable high quality spectrum to be produced. Also, the divergence of the primary beam causes less primary radiation directed to the target. This is undesirable because the amount of fluorescence generated is proportional to the amount of primary radiation that strikes the target (e.g., a scrap piece). Increasing the amount of primary radiation to the scrap piece increases the fluorescent radiation and increases the peak in the P/B ratio, resulting in a more desirable and higher quality spectrum.

Monochromators may be used to filter the primary beam to a desired energy range, reducing the Bremsstrahlung generated in the x-ray tube. Reducing the Bremsstrahlung will result in reducing the background of the spectrum, producing a larger P/B ratio. Monochromators can take many forms, such as a multilayer mirror, a crystal, or a filter. A filter can be a single element, or a combination of elements, through which the primary beam passes.

Certain embodiments of the present disclosure are further illustrated by the following examples, which are set forth to illustrate the presently disclosed subject matter and are not to be construed as limiting.

As has been previously explained, x-ray fluorescence ("XRF") is the emission of characteristic "secondary" (or fluorescent) x-rays from a material that has been excited by irradiating it with x-rays or gamma rays. XRF is based on the principal that individual atoms, when excited by an external energy source, emit x-ray photons of a characteristic energy or wavelength. By counting the number of photons of each energy emitted from a sample, the elements present in the sample may be identified and quantitated. The counting of these photons is then performed on an element-by-element basis. As used herein, the term "counts" refers to the number of photons counted for each element, with the number of counts representing the relative quantities by weight of each of the elements within the irradiated material.

With XRF, quantitative analysis is possible as the net peak area for an element in an acquired XRF spectrum is directly proportional to the mass of the sample. For example, for an acquired XRF spectrum from a sample (e.g., a scrap piece), if an aluminum peak having an area of 10,000 counts represents 10 grams of aluminum, then a peak of 20,000 counts would represent 20 grams of aluminum, and a peak of 30,000 counts would represent 30 grams of aluminum. This linear methodology can be used to quantitatively determine both the type and quantity of various elements in a sample.

The XRF spectra utilized within the following examples were acquired from the irradiation of actual samples of such aluminum alloys with the indicated aluminum alloy classifications. Samples of such aluminum alloys can be commercially obtained from various aluminum companies such as ALCOA. Such standard materials are sold with a certification sheet that shows the elemental composition in a percentage form. Alternatively, such XRF spectrum of standard reference aluminum alloys can be commercially obtained from such aluminum companies as ALCOA.

Certain aspects of the present disclosure differ from traditional quantitative methodologies because they do not seek to determine the linear quantitative relationship for determining mass. The qualitative relationship is still present in order to determine the elements that are present in the sample. However, the matrix effect brought on from large bulk masses of samples does not allow for accurate use of linear quantitative methods. The matrix effects are, however, consistent and not a random event. Therefore, all alloys of a particular type will yield nearly identical spectrums as defined by their elemental composition. Certain aspects of the present disclosure define the spectrum for one alloy as a signature. Each alloy has a unique signature, which is utilized by certain aspects of the present disclosure for identifying/classifying metal alloys. For example, three different aluminum alloys, such as aluminum alloys 2024, 3003, and 5051, have three unique spectra. But, all alloys for 5051 have nearly identical spectra.

With respect to aluminum alloys, XRF has the ability to measure each element (e.g., any desired combination of Si, Al, Fe, Cu, Mn, Mg, Cr, Ni, An, Ti, Ag, and B) in each of these alloys. XRF is both a qualitative and quantitative form of spectroscopy; therefore, the spectrums generated by XRF directly correlate to the elemental chemical compositions defined by previously noted Aluminum Association. A system can then be calibrated to measure the elemental concentration of an unknown aluminum alloy sample. Once the system calculates the concentration of each element, it can then compare that data to a standard, or reference, set in order to identify/classify the unknown aluminum alloy of the sample.

Figure 24A:
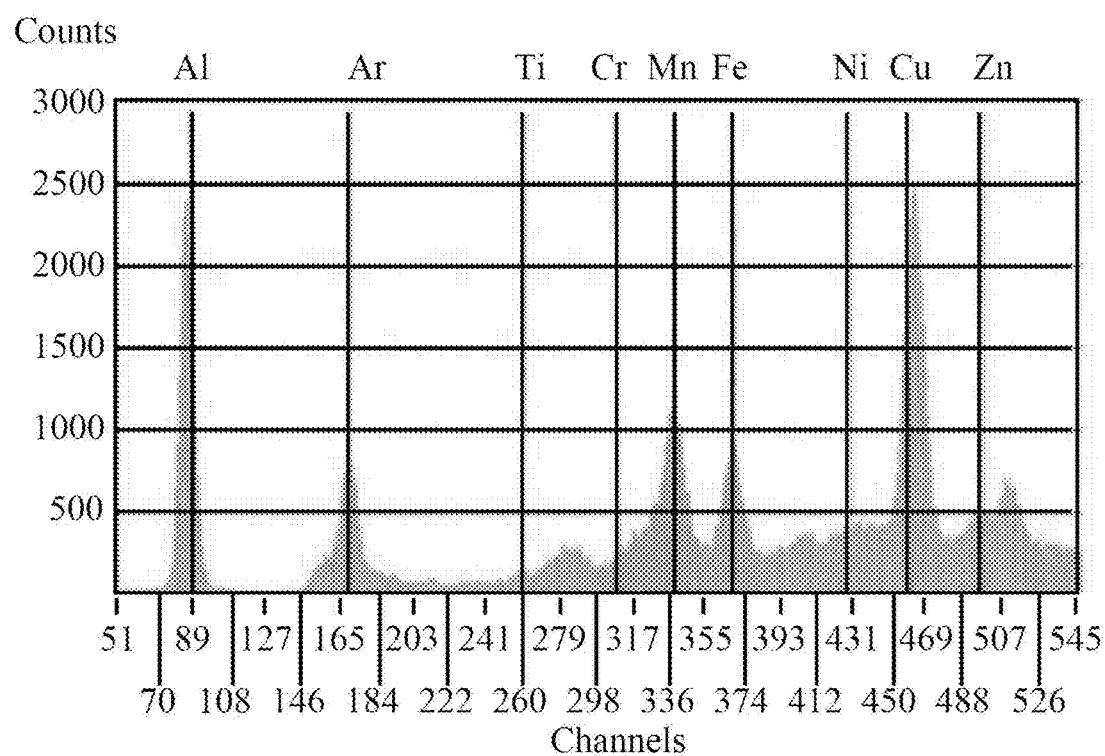
FIGS. 24A-24C show the XRF spectra for the aluminum alloy classifications 6013 (FIG. 24A), 6022 (FIG. 24B), and 6061 (FIG. 24C).
Figure 24B:
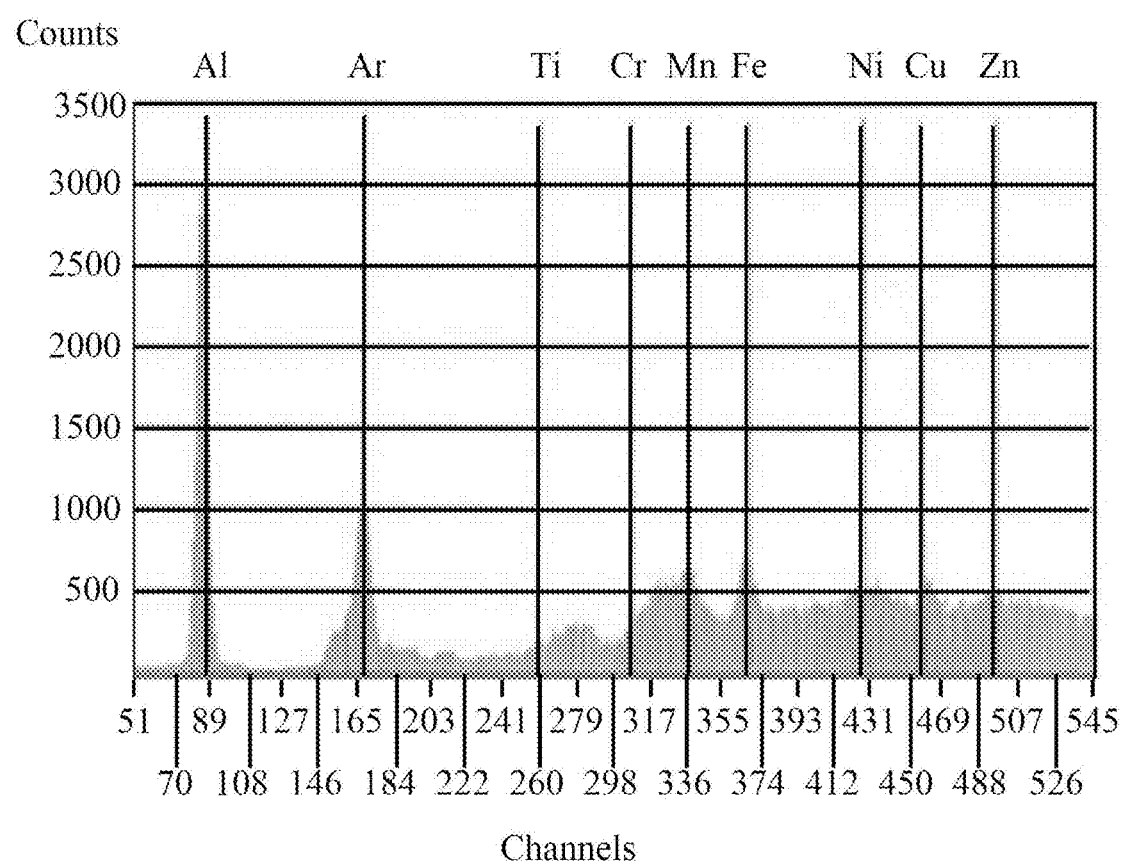
Figure 24C:
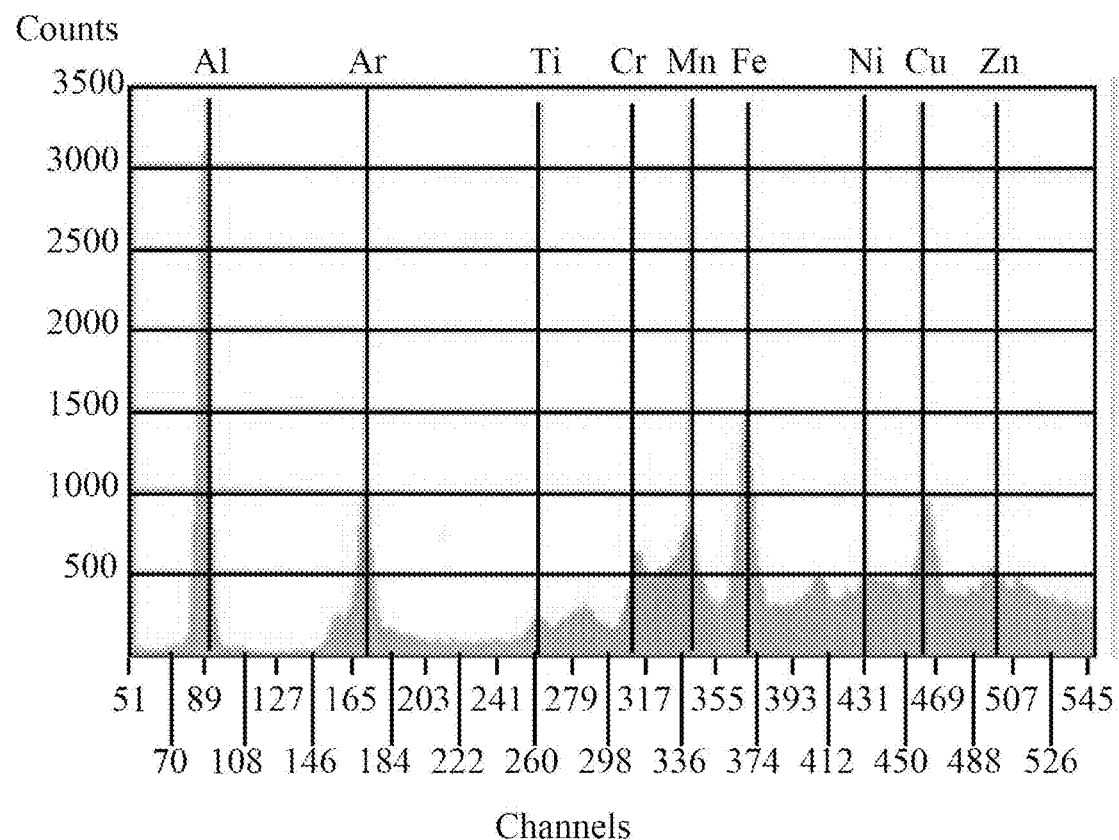

For example, as defined by the Aluminum Association, the published allowable chemical composition limits for aluminum alloy classifications 6013, 6002, and 6061 are shown in FIG. 23. FIGS. 24A-24C show the XRF spectra for the aluminum alloy classifications 6013 (FIG. 24A), 6022 (FIG. 24B), and 6061 (FIG. 24C). The spectrum illustrated in FIG. 24A shows the raw XRF data detected from a sample of an aluminum alloy 6013. The spectrum illustrated in FIG. 24B shows the raw XRF data detected from a sample of an aluminum alloy 6022. The spectrum illustrated in FIG. 24C shows the raw XRF data detected from a sample of an aluminum alloy 6061. These spectrums can be placed side by side for a quick comparison of their respective spectra. These alloys each contain the alloying elements Si, Fe, Cu, Mn, Mg, Cr, Zn, and Ti; however, the spectrums clearly highlight different peak heights for each of these elements. These peak heights directly correlate to elemental concentrations in the alloy; the larger the peak, the larger the element concentration in the alloy.

Referring to FIG. 23, it can be seen that the iron concentrations for aluminum alloys 6013, 6022, and 6061 are 0.5, 0.05-0.20, and 0.7, respectively. Aluminum alloy 6022 has the least amount of iron, aluminum alloy 6061 has the most amount of iron, and aluminum alloy 6013 is in the middle. The concentrations for each element in the Aluminum Association publication are easily and directly observable by the XRF spectra in FIGS. 24A-24C. For example, by looking closely at the spectra in FIGS. 24A-24C, the size of the iron peak directly correlates to those concentration values defined by the Aluminum Association. Just as the Aluminum Association has defined a unique set of data to define each alloy, XRF can be used to measure that unique set of data through spectroscopy.

Referring to the spectrum in FIG. 24A of the aluminum ("Al") alloy 6013, shown are peaks for such alloying elements as Al, Ti, Cr, Mn, Fe, Ni, Cu, and Zn. The channels in which these peaks are positioned within the spectrum correspond to detected XRF energy levels (net counts) for each of these elements. This XRF spectrum contains peaks and a background. The peaks are what contain the valuable information from the spectrum. The net peak area for each channel is a number that equals the peak counts minus the background counts (referred to herein as the "net counts" or the "net peak counts"). The net peak area of one peak therefore conveys quantitative information about the concentration of that alloying element in the sample. The larger the peak, the more of that element is found in the sample; the smaller the peak, the less of that element is found in the sample. Also, the location of the peak contains qualitative information about which element is in the sample. For example, in the spectrum of FIG. 24A, the peak at channel 370 corresponds to an energy level of 6.4 keV; therefore, that peak represents the fluorescence detected from iron in the sample. The XRF spectrum therefore contains qualitative and quantitative information about the sample, which is why it is useful in alloy identification/classification.

Table 1 shows the net peak counts determined from the XRF spectrum of FIG. 24A. One can easily see the correlations between peak size and net peak counts.

TABLE 1

| Al Alloy 6013 | Net Counts |
|---|---|
| Mg | 0 |
| Al | 20960 |
| Si | 0 |
| Ti | 272 |
| Cr | 0 |
| Mn | 5006 |
| Fe | 5998 |
| Cu | 18561 |
| Zn | 28 |

Various techniques and methodologies can be utilized to attempt to identify/classify materials, such as aluminum alloys for implementation into a sorting system, such as those disclosed herein. The following provides an example of the use of a dot product method for classifying materials, which is then compared to identification/classification techniques utilized within certain embodiments of the present disclosure.

The dot product has been used extensively in geometry regarding vector analysis. In the definition of the dot product, what is important to note is that the result is a single scalar. In other words, the result is typically an integer or decimal value, such as 27, or 36.53.

The data contained in Table 1, which is a summary of the useful information of an exemplary XRF spectrum of a material, is a one-dimensional array, which can also be referred to as a vector. In this example, Table 1 provides the net counts of aluminum alloy 6013.

Figure 25:
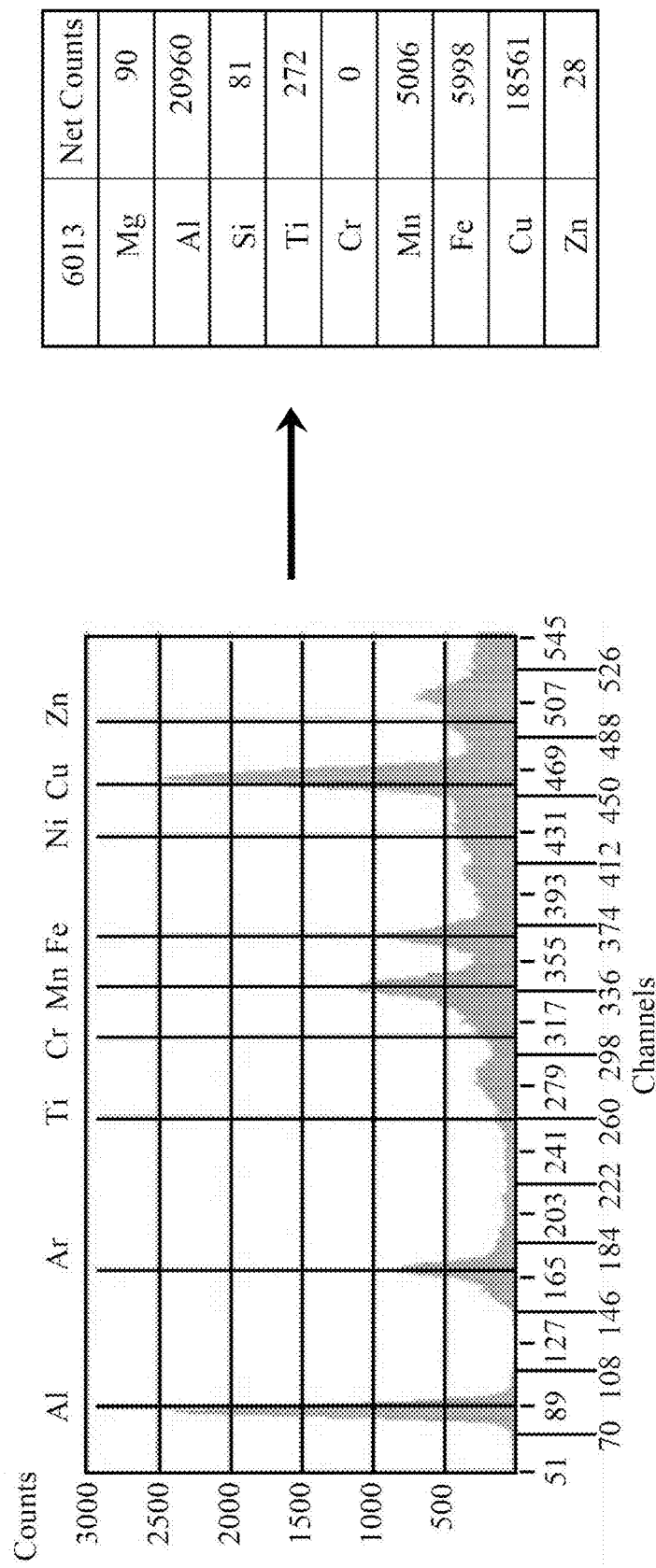
FIG. 25 shows a system and process for converting a spectrum into a vector of net counts for a material.
Figure 26:
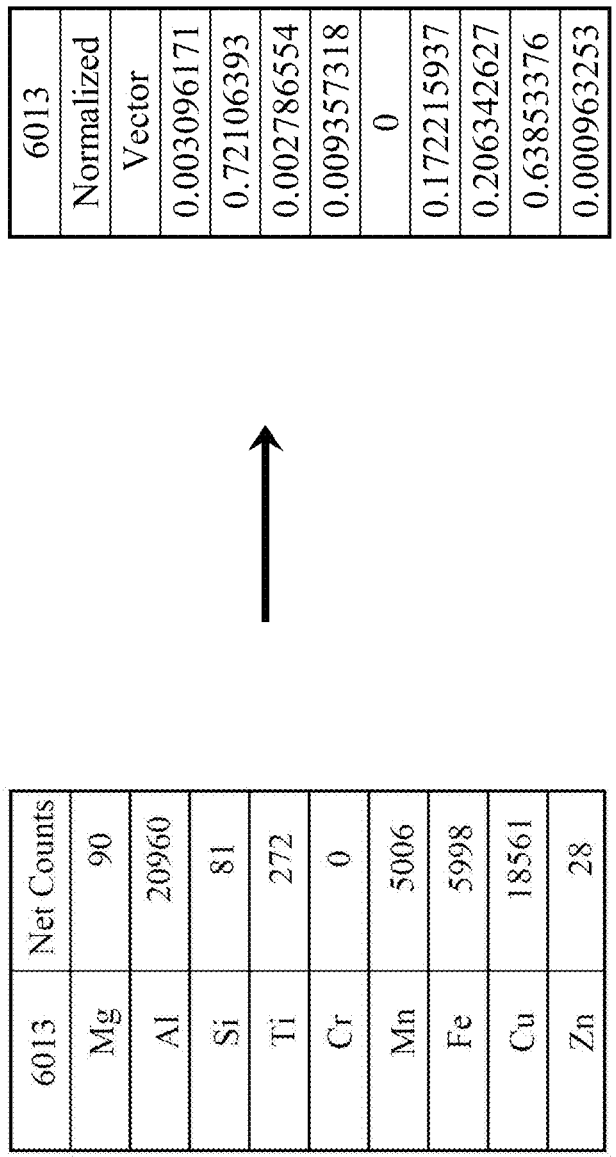
FIG. 26 shows a system and process for normalizing the vector of FIG. 25.

Referring to FIG. 25, a first step of the dot product method is to place the quantitative data from the XRF spectrum of an unknown material into a one-dimensional array (a vector) of the net peak counts. Referring to FIG. 26, a second step of the dot product method is to normalize that vector (for example, by calculating a ratio of each of the net counts to a square root of the sum of squares of the net counts). A third step of the dot product method is to calculate the dot product of the normalized vector from the unknown material with a standard reference material vector, which has also been normalized. If the dot product result is 1, then the materials are the same. If the dot product is below a threshold value less than but near 1, then the unknown material is a different material than the standard reference material.

TABLE 2

| Normalized Vector of Unknown Material | Normalized Vector of Al Alloy 6013 | Multiplied Components |
|---|---|---|
| 0.003096171 | 0.003096171 | 9.58628E−06 |
| 0.72106393 | 0.72106393 | 0.519933191 |
| 0.002786554 | 0.002786554 | 7.76488E−06 |
| 0.009357318 | 0.009357318 | 8.75594E−05 |
| 0 | 0 | 0 |
| 0.172215937 | 0.172215937 | 0.029658329 |
| 0.206342627 | 0.206342627 | 0.04257728 |
| 0.63853376 | 0.63853376 | 0.407725362 |
| 0.000963253 | 0.000963253 | 9.27857E−07 |
| | Dot Product | 1 |

The dot product is the sum of the multiplied components from each element in the array. As shown in Table 2, in this example, the sum of the multiplied components equals to 1. If this was a material analysis, and the first spectrum was from an unknown sample and the second spectrum was for aluminum alloy 6013, then the conclusion would be that the unknown sample is aluminum alloy 6013.

Referring to Table 3, when the dot product is calculated between aluminum alloys 6013 and 6022, the result is 0.79.

TABLE 3

| Normalized Vector of Al Alloy 6013 | Normalized Vector of Al Alloy 6022 | Multiplied Components |
|---|---|---|
| 0.003096171 | 0.00273983 | 8.48298E−06 |
| 0.72106393 | 0.986658319 | 0.711443725 |
| 0.002786554 | 0.004338064 | 1.20882E−05 |
| 0.009357318 | 0.004155408 | 3.88835E−05 |
| 0 | 0 | 0 |
| 0.172215937 | 0.051874108 | 0.008933548 |
| 0.206342627 | 0.140735916 | 0.029039819 |
| 0.63853376 | 0.060184925 | 0.038430106 |
| 0.000963253 | 0.01849385 | 1.78143E−05 |
| | Dot Product | 0.79 |

Referring to Table 4, when the dot product is calculated between aluminum alloys 6013 and 6061, the result is 0.81.

TABLE 4

| Normalized Vector of Al Alloy 6013 | Normalized Vector of Al Alloy 6061 | Multiplied Components |
|---|---|---|
| 0.003096171 | 0.003375856 | 1.04522E−05 |
| 0.72106393 | 0.830723021 | 0.599004406 |
| 0.002786554 | 0.00225057 | 6.27134E−06 |
| 0.009357318 | 0.323819562 | 0.003030083 |
| 0 | 0.084546426 | 0 |

TABLE 4-continued

| Normalized Vector of Al Alloy 6013 | Normalized Vector of Al Alloy 6061 | Multiplied Components |
|---|---|---|
| 0.172215937 | 0.091523194 | 0.015761753 |
| 0.206342627 | 0.397638269 | 0.082049725 |
| 0.63853376 | 0.174794296 | 0.111612059 |
| 0.000963253 | 0.0288073 | 2.77487E−05 |
| | Dot Product | 0.81 |

Therefore, consider an example in which the unknown sample to be identified/classified happens to be aluminum alloy 6013. Using the dot product method, if such an unknown sample was compared to the three reference vectors for aluminum alloys 6013, 6022, and 6061, and if a threshold value of 0.9 was chosen, then one would be able to identify the unknown aluminum alloy as aluminum alloy 6013 and not either of the aluminum alloys 6022 and 6013.

The larger the differences between samples, the better the dot product method is to use in material separation, which is why the dot product method is able to distinguish between significantly different materials, such as between brass, stainless steel, and aluminum. This method is problematic, however, when it comes to alloy identification as can be seen from the foregoing example, as the dots product for comparing aluminum alloys 6013 and 6022 (i.e., 0.79) and the dots products for comparing aluminum alloys 6013 and 6061 (i.e., 0.81) are very similar in number. That is because highly relevant spectral information is lost in the calculation for the dot product.

For example, consider an exemplary task of trying to identify aluminum alloy 5086 separate from aluminum alloys 5182, 5052, and 5754. The dots products for each of these alloy comparisons are shown in FIGS. 30-31. The net counts for each of these aluminum alloys are shown in FIGS. 32. The normalized vectors for each of these aluminum alloys were determined by calculating a ratio of each of the net counts to a square root of the sum of squares of the net counts.

Referring to FIG. 30, when the dot product is calculated between the normalized vectors of aluminum alloys 5086 and 5086, the result is 1. Referring to FIG. 30, when the dot product is calculated between the normalized vectors of aluminum alloys 5086 and 5052, the result is 0.95. Referring to FIG. 31, when the dot product is calculated between the normalized vectors of aluminum alloys 5086 and 5182, the result is 0.996. Referring to FIG. 31, when the dot product is calculated between the normalized vectors of aluminum alloys 5086 and 5454, the result is 0.981.

As can be seen, all of these dot products are very close to each other. In fact, these dot products are so close to each other that they are within the error margins of XRF measurements for XRF systems. Therefore, the dot product method cannot be reliably used to distinguish between individual aluminum alloys, especially those within a particular aluminum alloy series. The dot product method fails because this method is based on a singular value of the dot product and does not use the high quality spectral information that is preserved.

In contrast, certain embodiments of the present disclosure utilize an elemental composition signature ("ECS") technique, which preserves the spectral information from the spectrum, and then uses the normalized spectral information to compare to normalized standard references. The spectral data is not converted to a vector, and a dot product method is not performed. As a result, the ECS technique accounts for both qualitative and quantitative data, in addition to the errors, in XRF fluorescence measurements.

Within the ECS technique, in accordance with certain embodiments of the present disclosure, the raw XRF spectrum data is acquired from an irradiated sample (e.g., a scrap piece). Then, the net peak areas are determined for each element in the spectrum. The net peak areas are then normalized in order to generate an ECS for that sample (e.g., by dividing each of the net counts for each element by the sum of all of the net counts). The resulting ECS is a table of numbers used to identify/classify the sample. The ECS quantifies the elemental concentrations for the irradiated sample, which is independent of shape, size, and distance of the sample from the XRF detector. In this fashion, irregular shapes and distances of samples, such as scrap pieces, will still yield quantified results that can be used to identify/classify the sample (e.g., the alloy type). For example, with respect to identifying/classifying aluminum alloys, the ECS defines a unique property for each aluminum alloy, which exists independently of the size, shape, and distance of the aluminum alloy. Additionally, the ECS is a direct measurement of the elemental concentrations for each aluminum alloy that are defined by the Aluminum Association, validating the use of the ECS for aluminum alloy identification/classification.

Figure 27:
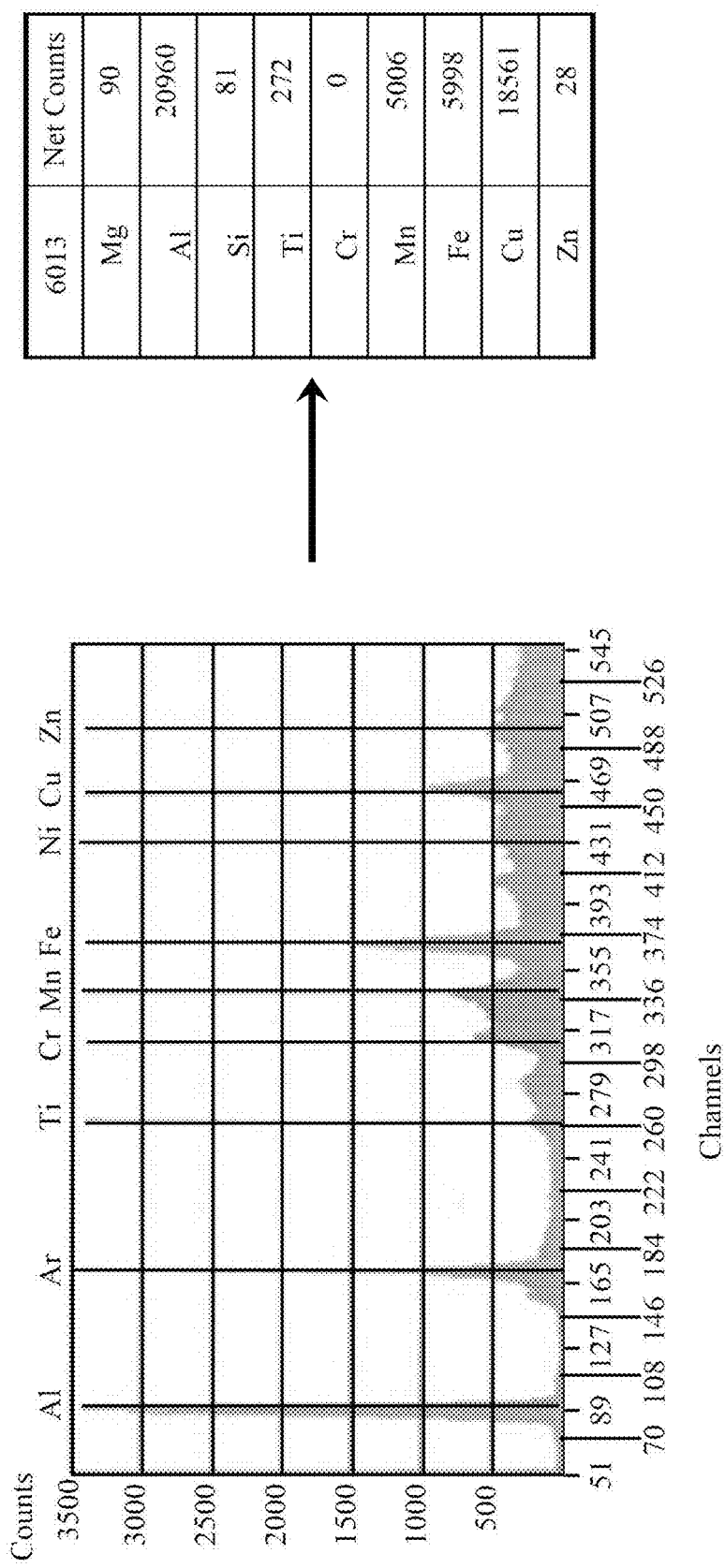
FIG. 27 shows a system and process for converting a spectrum into a vector of net counts for an exemplary material in accordance with certain embodiments of the present disclosure.
Figure 28:
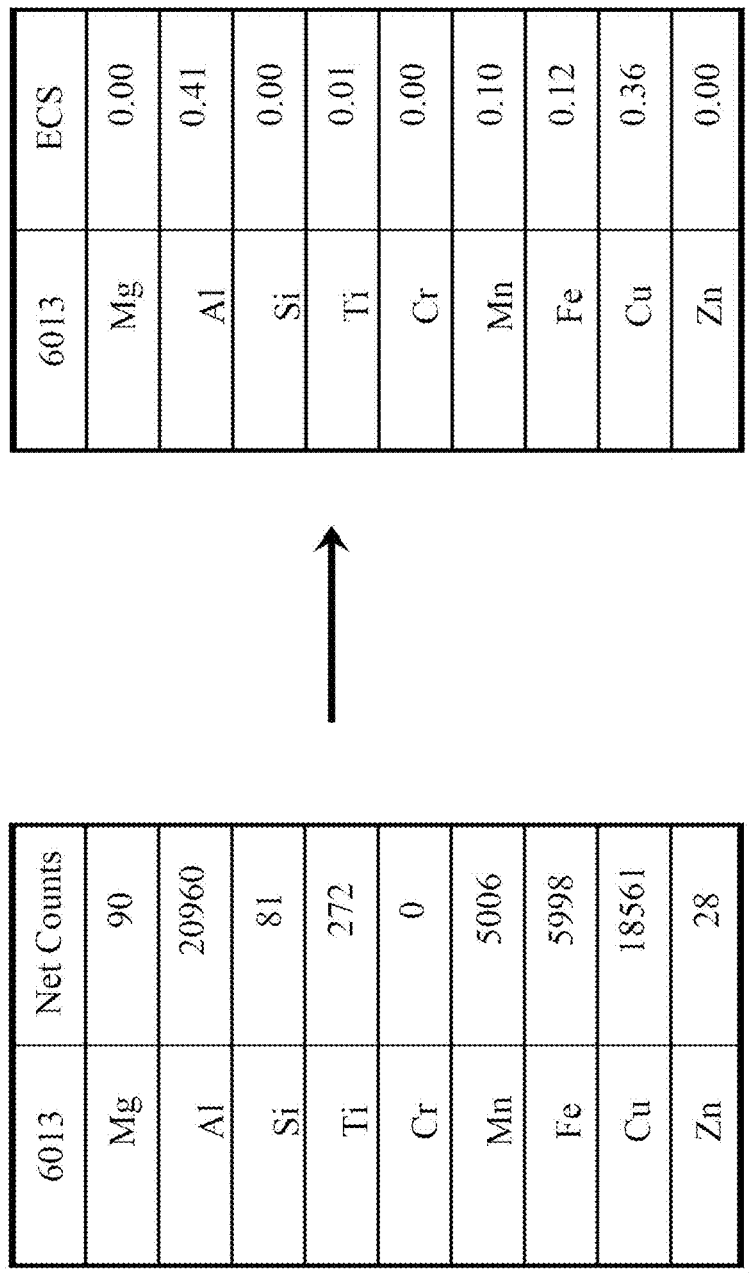
FIG. 28 shows a system and process for normalizing the vector of FIG. 27 for the exemplary material into an elemental composition signature ("ECS"), in accordance with certain embodiments of the present disclosure.

FIGS. 27-29 provide an example of an operation of an alloy identification/classification algorithm utilizing an ECS technique, configured in accordance with certain embodiments of the present disclosure. First, the raw XRF spectrum data of an unknown irradiated sample (e.g., a scrap piece) is acquired utilizing an XRF system, and the net counts determined for each of the elemental channels. These net counts are converted to an ECS for the unknown irradiated sample, which is a one-dimensional array. For purposes of illustration, assume that the unknown irradiated sample is composed of an aluminum alloy 6013. The raw XRF spectrum data and the ECS in this example are shown in FIG. 27. Next, the ECS of the unknown irradiated sample is normalized, as shown in FIG. 28. In this example, the ECS is normalized by dividing each of the net counts for each element by the sum of all of the net counts. However, certain embodiments of the present disclosure may normalize the ECS for the unknown samples and the standard references by taking the ratio of the net counts of each element with the net count of aluminum within the unknown sample or the standard reference(s), as the case may be.

Next, referring to FIG. 29, the normalized ECS of the unknown sample (e.g., a scrap piece) is compared to one or more normalized standard reference ECS's, each pertaining to a standard reference metal alloy, which have built-in ranges for error in XRF measurement. In this example, one of the standard reference ECS's pertains to aluminum alloy 6013, while the other standard reference ECS pertains to aluminum alloy 6022. If the ECS of the unknown sample falls within the ECS ranges of one of the standard reference metal alloys, then the unknown sample can be identified/classified. If the ECS of the unknown unknown sample falls outside of the defined ECS ranges of a particular standard reference metal alloy, then the unknown scrap piece is of a different alloy than that particular standard reference metal alloy.

In FIG. 29, the normalized ECS of the unknown sample is on the left and is compared to the normalized standard reference ECS's for the aluminum alloys 6013 and 6022. The comparison clearly shows that the unknown sample is aluminum alloy 6013, and not aluminum alloy 6022, based on their aluminum and copper content. Thus, it is clearly shown that the ECS technique is successful in identifying alloys because it preserves the quantitative and qualitative data.

For comparison of the ECS technique to the dot product method previously discussed with respect to FIGS. 30-31, consider the exact same data set of XRF spectra for aluminum alloys 5052, 5086, 5182, and 5454. Utilizing these XRF spectra, the following example will utilize the ECS technique for determining alloys. FIG. 32 shows the four aluminum alloys 5052, 5086, 5182, and 5454 and their respective ECS values (e.g., the net counts normalized by determining the ratio of each net count to a sum of all of the net counts for that alloy).

As noted herein, a difference between the ECS technique and the dot product method is that instead of using one value to identify the alloys, the ECS technique uses the individual information from all of the alloying elements to determine the alloy, which in this example are Mg, Si, Ti, Cr, Mn, Fe, Cu, and Zn. Based on the data sets in FIG. 32, an identification/classification algorithm, such as described herein with respect to FIGS. 7 and 22, can separate out these alloys, which are within the errors of XRF measurement. The error measurements for each of the ECS values for these exemplary aluminum alloys are shown in FIG. 33. The error measurements associated with the various standard reference ECS disclosed herein can be user defined for each of the elements within a particular ECS. Since typical XRF systems have inherent errors in measurement as high as plus or minus 10-15%, with the best XRF systems claiming a plus or minus 5% error, such error measurements may be utilized for determining the error measurements for each of the ECS values utilized within certain embodiments of the present disclosure.

As a result of the utilization of the entire XRF spectrum as a data set by the ECS technique, the differences between the ECS values for these four alloys can be readily seen. For example, the aluminum alloy 5052 is the only alloy with a Cr value of 0.09±0.02, which is much greater than the Cr values of the other three alloys. Additionally, the aluminum alloy 5454 is the only alloy with a Mn value of 0.28±0.02, which is much greater than the other three alloys. And, the aluminum alloy 5086 has a copper value of 0.04±0.01, while the aluminum alloy 5182 has a copper value of 0.00±0.01.

Therefore, an identification/classification sorting algorithm, which may be implemented within any of the embodiments of the present disclosure, to identify/classify an aluminum alloy of an unknown scrap piece based on the aforementioned ECS values for the aluminum alloys 5052, 5086, 5182, and 5454 may be configured to perform the following determinations:

(a) For an unknown scrap piece, if its determined ECS value for Cr is between 0.07 and 0.11, then the unknown scrap piece can be identified/classified as aluminum alloy 5052;

(b) For an unknown scrap piece, if its determined ECS value for Mn is between 0.26 and 0.30, then the unknown scrap piece can be identified/classified as aluminum alloy 5454.

(c) For an unknown scrap piece, if its determined ECS value for Cr is not between 0.07 and 0.11, and its determined ECS value for Mn is not between 0.26 and 0.30, but its determined ECS value for Cu is between 0.03 and 0.05, then the unknown scrap piece can be identified/classified as aluminum alloy 5086, else the unknown scrap piece can be identified/classified as aluminum alloy 5182.

Furthermore, the aforementioned normalization techniques for producing the ECS values can be enhanced to add sensitivity and discrimination to the sorting systems and processes disclosed herein.

Referring next to FIGS. 17-22, a system and process, configured in accordance with certain embodiments of the present disclosure, is described for classifying materials (e.g., scrap pieces, such as aluminum alloys) utilizing x-ray fluorescence. Any of the embodiments of sorting systems (e.g., the sorting system 100 and the sorting system 300) described herein may be configured to utilize the system and process 2200 of FIG. 22 in order to classify materials (e.g., scrap pieces) for sorting into separate bins based on the classification(s) determined by the system and process 2200. Additionally, material sorting systems other than those described herein, including those well known in the art and those yet to be developed, may be configured to utilize the system and process 2200 of FIG. 22 in order to classify materials for sorting into separate bins based on the classification(s) determined by the system and process 2200. The system and process 2200 may be utilized within the process block 405 of FIG. 4 and/or the process block 706 of FIG. 7.

The system and process 2200 is configured to determine net peak areas for providing the net counts utilized to produce the ECS values for unknown samples (e.g., irradiated scrap pieces as described herein) and the ECS values for standard reference materials (e.g., standard reference aluminum alloys, including those corresponding to the classifications published by the Aluminum Association).

Figure 17:
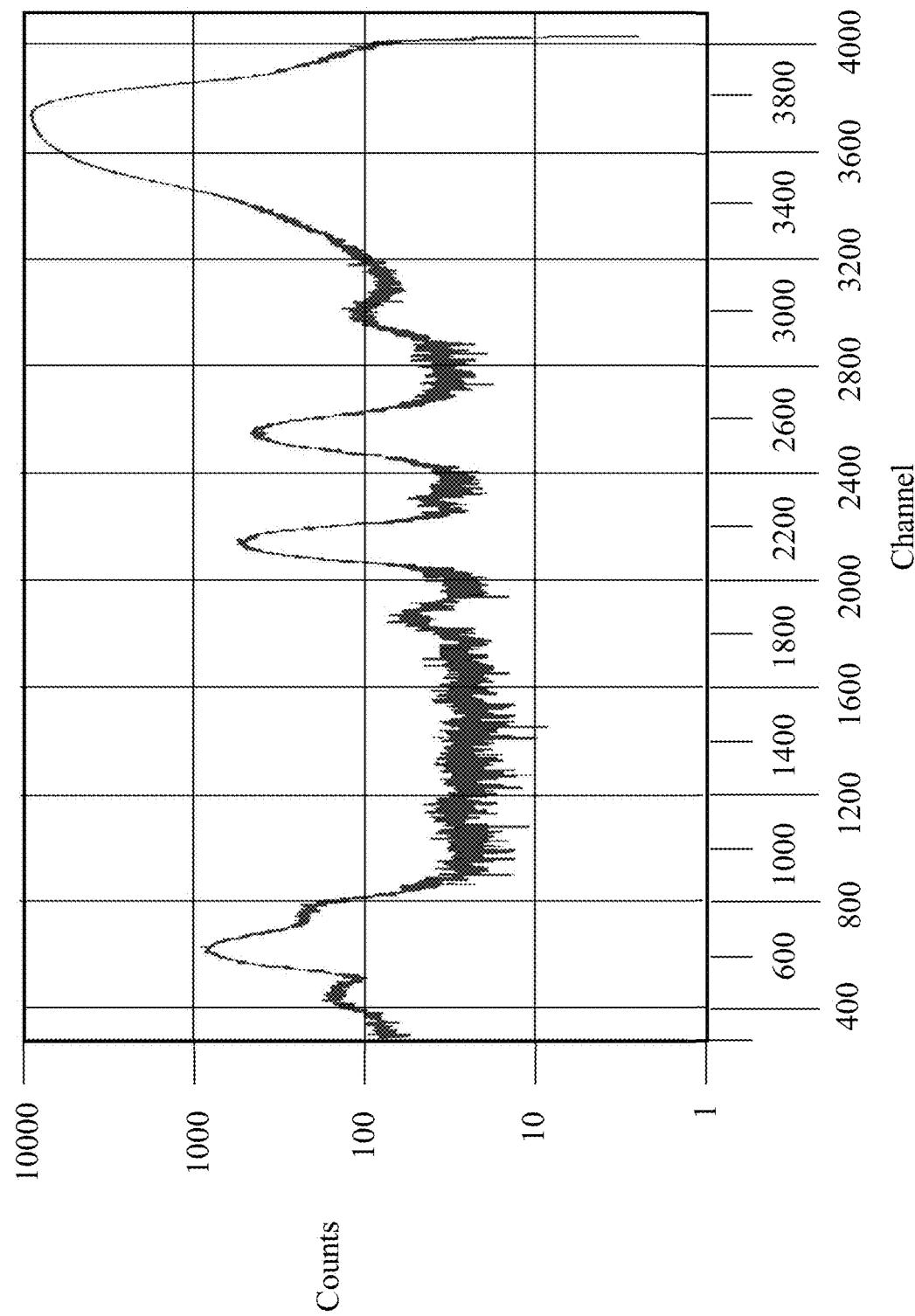
FIGS. 17-21 illustrate an example of a system and process for classifying materials as a function of their x-ray fluorescence.
Figure 18:
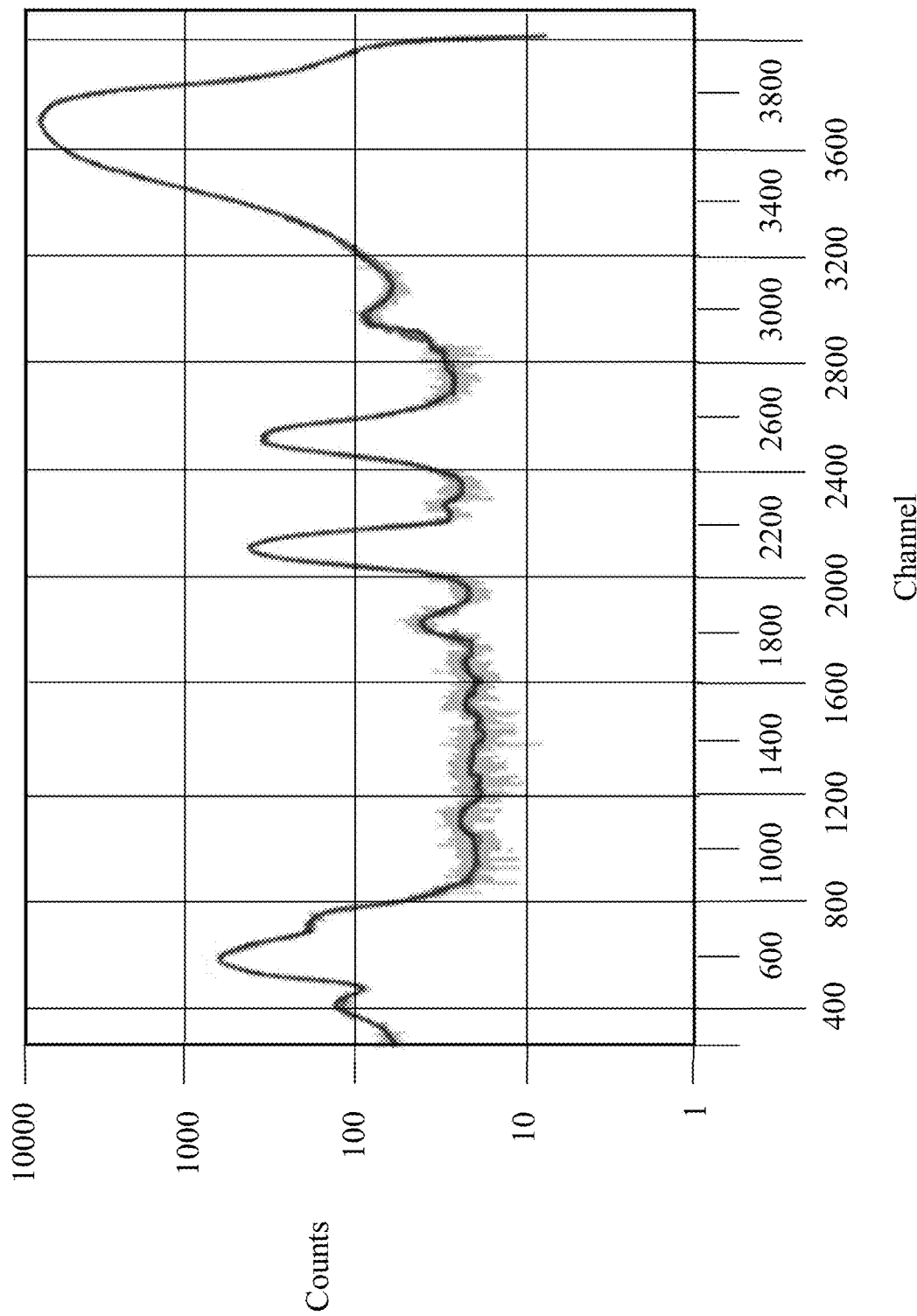
Figure 19:
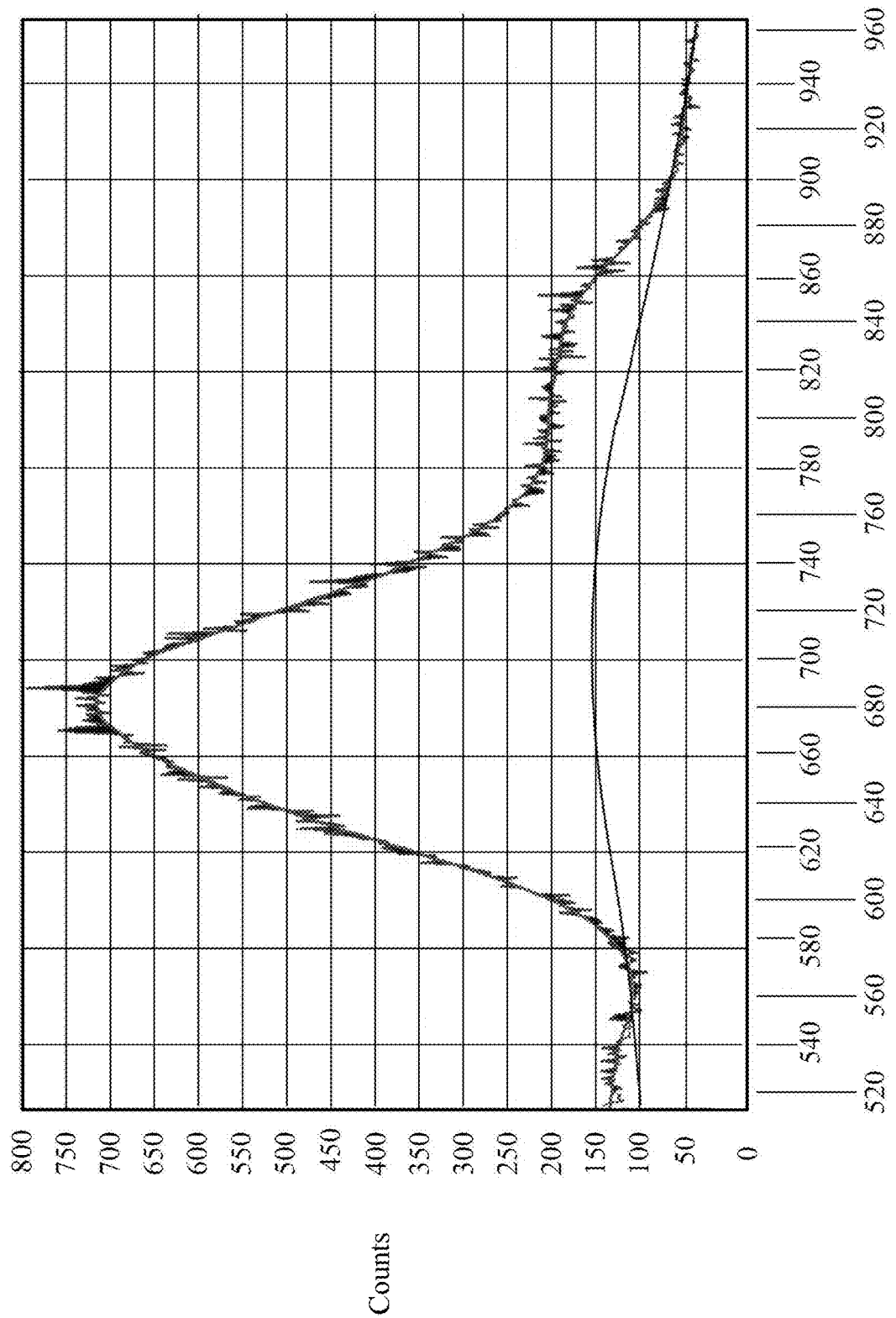
Figure 20:
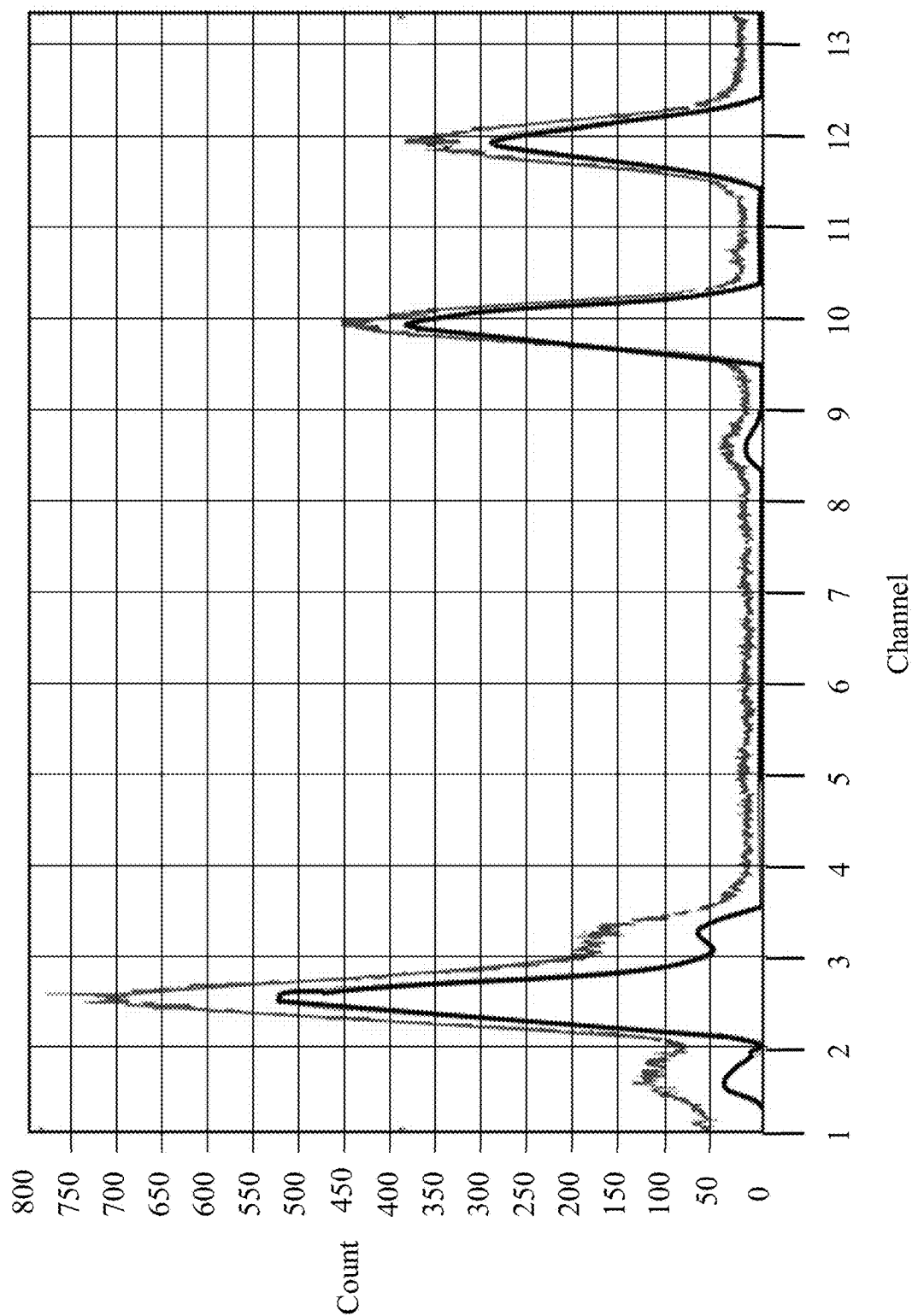
Figure 21:
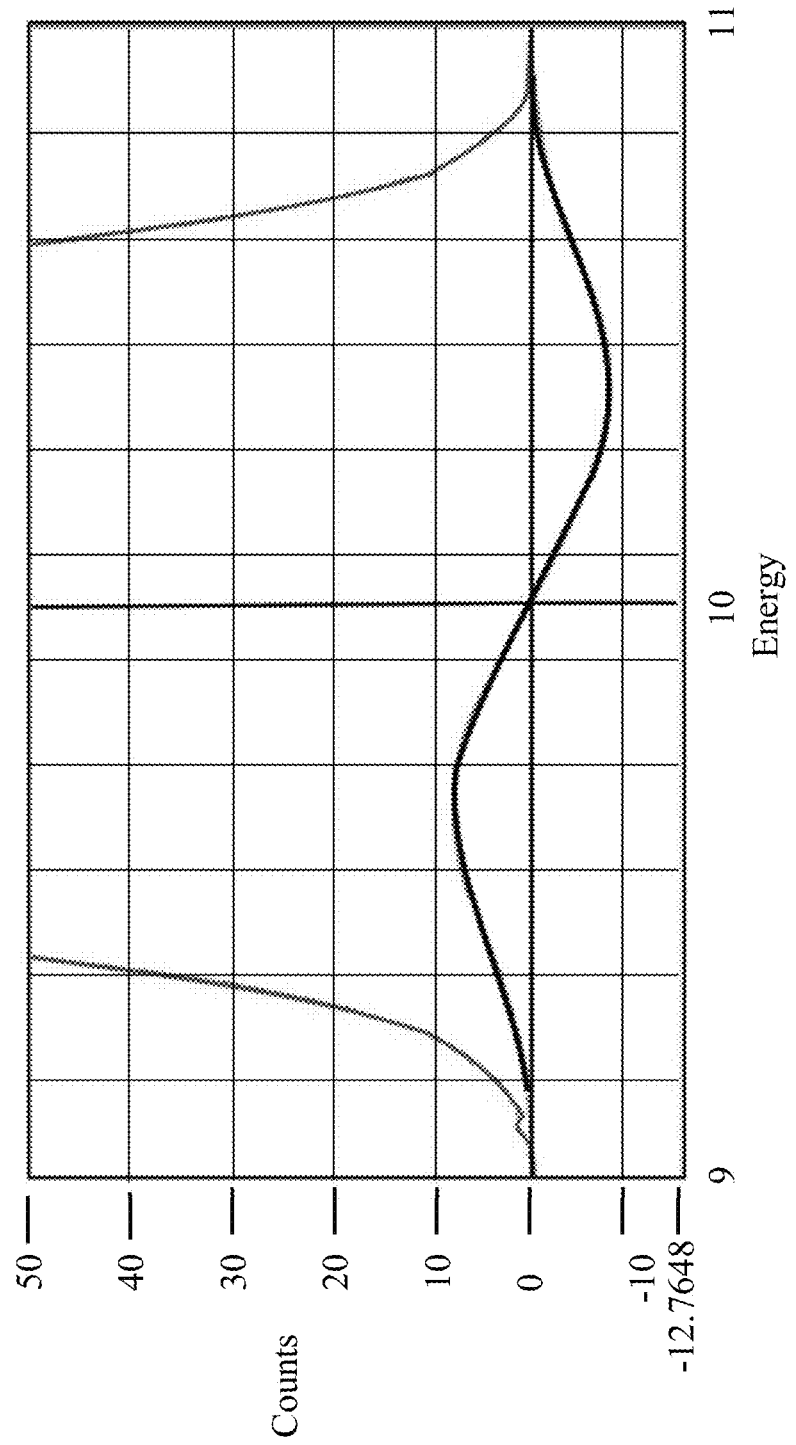

In the process block 2201, the raw XRF spectrum data pertaining to an irradiated material (e.g., a scrap piece) is received from the XRF detector(s). FIG. 17 illustrates an exemplary graph of such an XRF spectrum. In the process block 2202, the square root of the raw XRF spectrum data may be produced to decrease the processing time needed for further calculations (e.g., the following process blocks). In the process block 2203, a smoothing filter, such as a Savistsky-Golay filter or a least squares method, is applied to the data from the process block 2202. Referring to FIG. 18, such a smoothing filter plots a smooth curve of the raw XRF spectrum data (or the square root of the raw XRF spectrum data produced in the process block 2202). In FIG. 18, the raw XRF spectrum data is labeled as 1801, while the smoothed spectrum is labeled as 1802. In the process block 2204, the peaks are stripped away by using mathematical formulas of moving averages in order to estimate the background counts. Referring to FIG. 19, a portion of the total XRF spectrum is represented to show the original XRF spectrum labeled as 1901, the smoothed spectrum labeled as 1902, and the estimated background labeled as 1903. In the process block 2205, the estimated background is then subtracted from the smoothed spectrum in order to generate a spectrum that only includes the net peak areas. In FIG. 20, the raw spectrum data is labeled as 2001, while the final spectrum showing the produced net peak areas is labeled as 2002. In the process block 2206, these final spectrum counts may then be squared to correspond to their original values (since the original data may have had their square roots calculated in the process block 2202). In the process block 2207, the derivative of this spectrum is taken in order to locate and determine the peak centers and edges for determining the peak widths in order to accurately determine the net peak area counts. In FIG. 21, the first derivative is labeled as 2101. The net peak area counts are then calculated based on the peak widths, such as described with respect to FIG. 27. In the process block 2208, the normalized counts for each element are then used to determine the ECS values for the material, such as described with respect to FIG. 28. In the process block 2209, the ECS values are then compared to the ECS values for one or more standard reference materials, such as described with respect to FIGS. 29 and 33. In the process block 2210, the material is then identified/classified based on the results of the comparison(s) of the ECS's.

As has been described herein, embodiments of the present disclosure may be implemented to perform the various functions described for identifying, tracking, classifying, and sorting materials, such as scrap pieces. Such functionalities may be implemented within hardware and/or software, such as within one or more data processing systems (e.g., the data processing system 3400 of FIG. 34), such as the previously noted computer system 107, vision systems 110, 310, and/or automation control system 108. Nevertheless, the functionalities described herein are not to be limited for implementation into any particular hardware/software platform. As will be appreciated by one skilled in the art, aspects of the present disclosure may be embodied as a system, process, and/or program product. Accordingly, aspects of the present disclosure may take the form of an entirely hardware embodiment, an entirely software embodiment (including firmware, resident software, micro-code, etc.), or embodiments combining software and hardware aspects that may all generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM") (e.g., RAM 3420 of FIG. 34), a read-only memory ("ROM") (e.g., ROM 3435 of FIG. 34), an erasable programmable read-only memory ("EPROM" or flash memory), an optical fiber, a portable compact disc read-only memory ("CD-ROM"), an optical storage device, a magnetic storage device (e.g., hard drive 3431 of FIG. 34), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart and block diagrams in the figures illustrate architecture, functionality, and operation of possible implementations of systems, methods, processes, and program products according to various embodiments of the present disclosure. In this regard, each block in the flowcharts or block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) of the computer or other programmable data processing apparatus, create circuitry or means for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

Computer program code, i.e., instructions, for carrying out operations for aspects of the present disclosure may be written in any combination of one or more programming languages, including an object oriented programming language such as Java, Smalltalk, Python, C++, or the like, conventional procedural programming languages, such as the "C" programming language or similar programming languages, or any of the machine learning software disclosed herein. The program code may execute entirely on the user's computer system, partly on the user's computer system, as a stand-alone software package, partly on the user's computer system (e.g., the computer system utilized for sorting) and partly on a remote computer system (e.g., the computer system utilized to train the vision system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider).

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data (e.g., for each of the scrap pieces processed by a sorting system described herein) may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a retrofit control device, wiring discrete hardware components, or a combination of any or all of the foregoing.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

With reference now to FIG. 34, a block diagram illustrating a data processing ("computer") system 3400 is depicted in which aspects of embodiments of the disclosure may be implemented. (The terms "computer," "system," "computer system," and "data processing system" may be used interchangeably herein.) The computer system 107 of FIG. 1, a computer system for utilization in the sorting system 300 of FIG. 3, and/or any of the vision systems 110, 310 may be configured similarly as the computer system 3400. The computer system 3400 may employ a local bus 3405 (e.g., a peripheral component interconnect ("PCI") local bus architecture). Any suitable bus architecture may be utilized such as Accelerated Graphics Port ("AGP") and Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units and/or one or more tensor processing units. Additional connections to the local bus 3405 may be made through direct component interconnection or through add-in boards. In the depicted example, a communication (e.g., network (LAN)) adapter 3425, an I/O (e.g., small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 provides a connection for a keyboard 3413 and a mouse 3414, modem (not shown), and additional memory (not shown). The I/O adapter 3430 provides a connection for a hard disk drive 3431, a tape drive 3432, and a CD-ROM drive (not shown).

An operating system may be run on the one or more processors 3415 and used to coordinate and provide control of various components within the computer system 3400. In FIG. 34, the operating system may be a commercially available operating system. An object-oriented programming system (e.g., Java, Python, etc.) may run in conjunction with the operating system and provide calls to the operating system from programs or programs (e.g., Java, Python, etc.) executing on the system 3400. Instructions for the operating system, the object-oriented operating system, and programs may be located on non-volatile memory 3435 storage devices, such as a hard disk drive 3431, and may be loaded into volatile memory 3420 for execution by the processor 3415.

Those of ordinary skill in the art will appreciate that the hardware in FIG. 34 may vary depending on the implementation. Other internal hardware or peripheral devices, such as flash ROM (or equivalent nonvolatile memory) or optical disk drives and the like, may be used in addition to or in place of the hardware depicted in FIG. 34. Also, any of the processes of the present disclosure may be applied to a multiprocessor computer system, or performed by a plurality of such systems 3400. For example, training of the vision system 110, 310 may be performed by a first computer system 3400, while operation of the vision system 110, 310 for sorting may be performed by a second computer system 3400.

As another example, the computer system 3400 may be a stand-alone system configured to be bootable without relying on some type of network communication interface, whether or not the computer system 3400 includes some type of network communication interface. As a further example, the computer system 3400 may be an embedded controller, which is configured with ROM and/or flash ROM providing non-volatile memory storing operating system files or user-generated data.

The depicted example in FIG. 34 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

Aspects of the present disclosure provide a system for classifying and sorting a first heterogeneous mix of materials including a first device configured to produce image data of the first heterogeneous mix of materials, a first conveyor system configured to convey the first heterogeneous mix of materials past the first device, a first data processing system including a machine learning system configured to assign a first classification to a first one of the materials based on the image data of the first heterogeneous mix of materials, wherein the first classification is based on a first knowledge base containing a previously generated library of observed characteristics captured from a homogenous set of samples of the first one of the materials, and a first sorter configured to sort the first one of the materials from the first heterogeneous mix of materials as a function of the first classification of the first one of the materials. In accordance with aspects of the present disclosure, the library of observed characteristics were captured by a camera configured to capture images of the homogenous set of samples of the first one of the materials as they were conveyed past the camera. In accordance with aspects of the present disclosure, the first device is a camera configured to capture visual images of the materials to produce the image data, wherein the observed characteristics are visually observed characteristics. In accordance with aspects of the present disclosure, the system further includes an x-ray source configured to illuminate the materials, an x-ray fluorescence detector configured to detect x-ray fluorescence spectra from the materials, and circuitry configured to assign a second classification to the first one of the materials as a function of the detected x-ray fluorescence spectra, wherein the sorting by the first sorter of the first one of the materials from the first heterogeneous mix of materials is performed as a function of a combination of the first and second classifications. In accordance with aspects of the present disclosure, the system further includes an x-ray source configured to illuminate the materials, an x-ray fluorescence detector configured to detect x-ray fluorescence spectra from the materials, and circuitry configured to convert the detected x-ray fluorescence spectra into the image data. In accordance with aspects of the present disclosure, the sorting by the first sorter of the first one of the materials from the first heterogeneous mix of materials produces a second heterogeneous mix of materials that includes the first heterogeneous mix of materials minus the sorted first one of the materials, wherein the system further includes a second device configured to produce image data of the second heterogeneous mix of materials, a second conveyor system configured to convey the second heterogeneous mix of materials past the second device, a second data processing system including a machine learning system configured to assign a second classification to a second one of the materials based on the image data of the second heterogeneous mix of materials, wherein the second classification is based on a second knowledge base containing a previously generated library of observed characteristics captured from a homogenous set of samples of the second one of the materials, and a second sorter configured to sort the second one of the materials from the second heterogeneous mix of materials as a function of the second classification of the second one of the materials. In accordance with aspects of the present disclosure, the sorting by the first sorter of the first one of the materials from the first heterogeneous mix of materials results in a plurality of pieces of the first one of the materials, wherein the system further includes a second device configured to produce image data of the plurality of pieces of the first one of the materials, a second conveyor system configured to convey the plurality of pieces of the first one of the materials past the second device after the plurality of pieces of the first one of the materials has been sorted by the first sorter from the first heterogeneous mix of materials, a second data processing system including a machine learning system configured to assign a second classification to certain ones of the plurality of pieces of the first one of the materials based on the image data of the plurality of pieces of the first one of the materials, wherein the second classification is based on a second knowledge base containing a previously generated library of observed characteristics captured from a homogenous set of samples of the certain ones of the plurality of pieces of the first one of the materials, and a second sorter configured to sort the certain ones of the plurality of pieces of the first one of the materials from the plurality of pieces of the first one of the materials as a function of the second classification. In accordance with aspects of the present disclosure, the plurality of pieces of the first one of the materials includes one or more pieces of wrought aluminum and one or more pieces of cast aluminum, wherein the second classification distinguishes wrought aluminum from cast aluminum so that the second sorter is configured to sort the one or more pieces of wrought aluminum from the one or more pieces of cast aluminum. In accordance with aspects of the present disclosure, the sorting by the first sorter of the first one of the materials from the first heterogeneous mix of materials produces a second heterogeneous mix of materials that includes the first heterogeneous mix of materials minus the sorted first one of the materials, wherein the system further includes a third device configured to produce image data of the second heterogeneous mix of materials, a third conveyor system configured to convey the second heterogeneous mix of materials past the third device after the first one of the materials has been sorted by the first sorter from the first heterogeneous mix of materials, a third data processing system including a machine learning system configured to assign a third classification to a second one of the materials within the second heterogeneous mix of materials based on the image data of the second heterogeneous mix of materials, wherein the third classification is based on a third knowledge base containing a previously generated library of observed characteristics captured from a homogenous set of samples of the second one of the materials, and a second sorter configured to sort the second one of the materials from the second heterogeneous mix of materials as a function of the second classification of the second one of the materials within the second heterogeneous mix of materials. In accordance with aspects of the present disclosure, the system further includes a chemical sensor configured to determine at least one chemical element within one or more pieces of the first heterogeneous mix of materials, wherein the first sorter is configured to sort the first one of the materials from the first heterogeneous mix of materials as a function of a combination of the first classification of the first one of the materials and the at least one chemical element determined by the chemical sensor. In accordance with aspects of the present disclosure, the machine learning system includes an artificial intelligence neural network.

Aspects of the present disclosure provide a device for identifying at least one characteristic of a material, including an x-ray source configured to illuminate the material to produce an x-ray fluorescence spectrum from the material, an x-ray fluorescence detector configured for recoding the x-ray fluorescence spectrum from the material into x-ray fluorescence data that is characteristic of the material, an optical sensor configured to capture visual image data of the material, and a processing unit configured with a machine learning system configured to identify a characteristic of the material from the x-ray fluorescence data and/or the visual image data. In accordance with aspects of the present disclosure, the machine learning system includes an artificial intelligence neural network. In accordance with aspects of the present disclosure, the machine learning system includes one or more algorithms configured to identify the characteristic of the material from the x-ray fluorescence data and/or the visual image data, wherein the one or more algorithms are selected from the group consisting of a support vector machine, nearest neighbor, naïve Bayes, decision trees, linear regression, clustering, k-means clustering, association rules, q-learning, temporal difference, deep adversarial network, gradient descent, polynomial regression, learning curves, regularized learning model, logistic regression, svm regression, nonlinear svm, cart algorithm, random forests, boosting, stacking, projection, manifold learning, principal component analysis, dimensionality reduction, cart training, autoencoders, reinforcement learning, and any combination thereof. In accordance with aspects of the present disclosure, the machine learning system utilizes one or more algorithms configured to identify the characteristic of the material from the x-ray fluorescence data and/or the visual image data, wherein the one or more algorithms are selected from the group consisting of supervised learning, unsupervised learning, semi-supervised learning, reinforcement learning, and any combination thereof.

Aspects of the present disclosure provide a method for extracting a characteristic of a first object within a moving stream of objects, including detecting a location of the first object relative to the moving stream of objects, illuminating the first object with x-rays, recording an x-ray fluorescence spectrum emanating from the first object, capturing a visual image of the first object, and utilizing a machine learning system to identify the characteristic of the first object based on either the x-ray fluorescence spectrum or the visual image of the first object, or a combination thereof. In accordance with aspects of the present disclosure, the characteristic of the first object is selected from the group consisting of a size of the first object, a structure of the first object, a finish of the first object, a color of the first object, a grain of the first object, folds or tears in the first object, a single or group of visual or chemical features of the first object, and any combination thereof. In accordance with aspects of the present disclosure, the method further includes redirecting the first object from the stream of objects as a function of the identification of the characteristic of the first object. In accordance with aspects of the present disclosure, the machine learning system utilizes one or more algorithms configured to identify the characteristic of the first object, wherein the one or more algorithms are selected from the group consisting of supervised learning, unsupervised learning, semi-supervised learning, reinforcement learning, and any combination thereof. In accordance with aspects of the present disclosure, the machine learning system includes an artificial intelligence neural network.

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the disclosure unless expressly described as essential or critical.

Those skilled in the art having read this disclosure will recognize that changes and modifications may be made to the embodiments without departing from the scope of the present disclosure. It should be appreciated that the particular implementations shown and described herein may be illustrative of the disclosure and its best mode and may be not intended to otherwise limit the scope of the present disclosure in any way. Other variations may be within the scope of the following claims.

While this specification contains many specifics, these should not be construed as limitations on the scope of the disclosure or of what can be claimed, but rather as descriptions of features specific to particular implementations of the disclosure. Headings herein may be not intended to limit the disclosure, embodiments of the disclosure or other matter disclosed under the headings.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein with respect to an identified property or circumstance, "substantially" refers to a degree of deviation that is sufficiently small so as to not measurably detract from the identified property or circumstance. The exact degree of deviation allowable may in some cases depend on the specific context. As used herein, "significance" or "significant" relates to a statistical analysis of the probability that there is a non-random association between two or more entities. To determine whether or not a relationship is "significant" or has "significance," statistical manipulations of the data can be performed to calculate a probability, expressed as a "p value." Those p values that fall below a user-defined cutoff point are regarded as significant. In some embodiments, a p value less than or equal to 0.05, in some embodiments less than 0.01, in some embodiments less than 0.005, and in some embodiments less than 0.001, are regarded as significant. Accordingly, a p value greater than or equal to 0.05 is considered not significant.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms (such as acronyms used for chemical elements within the periodic table) used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter. As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

What is claimed is:

1. A system for classifying and sorting a first heterogeneous mix of materials comprising:
   a first device configured to produce image data of the first heterogeneous mix of materials;
   a first conveyor system configured to convey the first heterogeneous mix of materials past the first device;
   a first data processing system comprising a machine learning system configured to assign a first classification to a first one of the materials based on the image data of the first heterogeneous mix of materials, wherein the first classification is based on a first knowledge base containing a previously generated library of observed characteristics captured from a homogeneous set of samples of the first one of the materials; and
   a first sorter configured to sort the first one of the materials from the first heterogeneous mix of materials as a function of the first classification of the first one of the materials.

2. The system as recited in claim 1, wherein the library of observed characteristics were captured by a camera configured to capture images of the homogenous set of samples of the first one of the materials as they were conveyed past the camera.

3. The system as recited in claim 1, wherein the first device is a camera configured to capture visual images of the materials to produce the image data, and wherein the observed characteristics are visually observed characteristics.

4. The system as recited in claim 3, further comprising:
   an x-ray source configured to illuminate the materials;
   an x-ray fluorescence detector configured to detect x-ray fluorescence spectra from the materials; and
   circuitry configured to assign a second classification to the first one of the materials as a function of the detected x-ray fluorescence spectra, wherein the sorting by the first sorter of the first one of the materials from the first heterogeneous mix of materials is performed as a function of a combination of the first and second classifications.

5. The system as recited in claim 1, further comprising:
an x-ray source configured to illuminate the materials;
an x-ray fluorescence detector configured to detect x-ray fluorescence spectra from the materials; and
circuitry configured to convert the detected x-ray fluorescence spectra into the image data.

6. The system as recited in claim 1, wherein the sorting by the first sorter of the first one of the materials from the first heterogeneous mix of materials produces a second heterogeneous mix of materials that comprises the first heterogeneous mix of materials minus the sorted first one of the materials, the system further comprising:
a second device configured to produce image data of the second heterogeneous mix of materials;
a second conveyor system configured to convey the second heterogeneous mix of materials past the second device;
a second data processing system comprising a machine learning system configured to assign a second classification to a second one of the materials based on the image data of the second heterogeneous mix of materials, wherein the second classification is based on a second knowledge base containing a previously generated library of observed characteristics captured from a homogenous set of samples of the second one of the materials; and
a second sorter configured to sort the second one of the materials from the second heterogeneous mix of materials as a function of the second classification of the second one of the materials.

7. The system as recited in claim 1, wherein the sorting by the first sorter of the first one of the materials from the first heterogeneous mix of materials results in a plurality of pieces of the first one of the materials, the system further comprising:
a second device configured to produce image data of the plurality of pieces of the first one of the materials;
a second conveyor system configured to convey the plurality of pieces of the first one of the materials past the second device after the plurality of pieces of the first one of the materials has been sorted by the first sorter from the first heterogeneous mix of materials;
a second data processing system comprising a machine learning system configured to assign a second classification to certain ones of the plurality of pieces of the first one of the materials based on the image data of the plurality of pieces of the first one of the materials, wherein the second classification is based on a second knowledge base containing a previously generated library of observed characteristics captured from a homogenous set of samples of the certain ones of the plurality of pieces of the first one of the materials; and
a second sorter configured to sort the certain ones of the plurality of pieces of the first one of the materials from the plurality of pieces of the first one of the materials as a function of the second classification.

8. The system as recited in claim 7, wherein the plurality of pieces of the first one of the materials includes one or more pieces of wrought aluminum and one or more pieces of cast aluminum, wherein the second classification distinguishes wrought aluminum from cast aluminum so that the second sorter is configured to sort the one or more pieces of wrought aluminum from the one or more pieces of cast aluminum.

9. The system as recited in claim 7, wherein the sorting by the first sorter of the first one of the materials from the first heterogeneous mix of materials produces a second heterogeneous mix of materials that comprises the first heterogeneous mix of materials minus the sorted first one of the materials, the system further comprising:
a third device configured to produce image data of the second heterogeneous mix of materials;
a third conveyor system configured to convey the second heterogeneous mix of materials past the third device after the first one of the materials has been sorted by the first sorter from the first heterogeneous mix of materials;
a third data processing system comprising a machine learning system configured to assign a third classification to a second one of the materials within the second heterogeneous mix of materials based on the image data of the second heterogeneous mix of materials, wherein the third classification is based on a third knowledge base containing a previously generated library of observed characteristics captured from a homogenous set of samples of the second one of the materials; and
a second sorter configured to sort the second one of the materials from the second heterogeneous mix of materials as a function of the second classification of the second one of the materials within the second heterogeneous mix of materials.

10. The system as recited in claim 1, further comprising a chemical sensor configured to determine at least one chemical element within one or more pieces of the first heterogeneous mix of materials, wherein the first sorter is configured to sort the first one of the materials from the first heterogeneous mix of materials as a function of a combination of the first classification of the first one of the materials and the at least one chemical element determined by the chemical sensor.

11. A device for identifying at least one characteristic of a material, comprising:
an x-ray source configured to illuminate the material to produce an x-ray fluorescence spectrum from the material;
an x-ray fluorescence detector configured for recoding the x-ray fluorescence spectrum from the material into x-ray fluorescence data that is characteristic of the material;
an optical sensor configured to capture visual image data of the material; and
a processing unit configured with a machine learning system configured to identify a characteristic of the material from the x-ray fluorescence data and/or the visual image data wherein the machine learning system is configured with a neural network trained to compare the captured visual image data of the material with a library of visually observed characteristics captured from images of a homogenous set of material samples all possessing the at least one characteristic.

12. The device as recited in claim 11, wherein the machine learning system comprises one or more algorithms configured to identify the characteristic of the material from the x-ray fluorescence data and/or the visual image data, wherein the one or more algorithms are selected from the group consisting of a support vector machine, nearest neighbor, naïve Bayes, decision trees, linear regression, clustering, k- means clustering, association rules, q-learning, temporal difference, deep adversarial network, gradient descent, polynomial regression, learning curves, regularized learning model, logistic regression, svm regression, nonlinear svm, cart algorithm, random forests, boosting, stacking, projection, manifold learning, principal component analysis, dimensionality reduction, cart training, autoencoders, reinforcement learning, and any combination thereof.

13. A method for extracting a characteristic of a first object within a moving stream of objects, comprising:
   detecting a location of the first object relative to the moving stream of objects;
   illuminating the first object with x-rays;
   recording an x-ray fluorescence spectrum emanating from the first object;
   capturing a visual image of the first object; and
   utilizing a machine learning system to identify the characteristic of the first object based on either the x-ray fluorescence spectrum or the visual image of the first object, or a combination thereof, wherein the machine learning system is configured with a neural network trained to compare the captured visual image of the first object with a library of visually observed characteristics captured from visual images of a homogenous set of objects all possessing the characteristic.

14. The method as recited in claim 13, wherein the characteristic of the first object is folds in the first object.

15. The method as recited in claim 14, further comprising redirecting the first object from the stream of objects as a function of the identification of the characteristic of the first object.

16. A method for extracting a characteristic of a first object within a moving stream of objects, comprising:
   detecting a location of the first object relative to the moving stream of objects;
   illuminating the first object with x-rays;
   recording an x-ray fluorescence spectrum emanating from the first object;
   capturing a visual image of the first object;
   utilizing a machine learning system to identify the characteristic of the first object based on either the x-ray fluorescence spectrum or the visual image of the first object, or a combination thereof, wherein the characteristic of the first object is folds in the first object, wherein the machine learning system comprises an artificial intelligence neural network; and
   redirecting the first object from the stream of objects as a function of the identification of the characteristic of the first object.

17. The system as recited in claim 1, wherein the first classification is assigned to the first one of the materials without a benefit of an analysis based on irradiating the first heterogeneous mix of materials with an x-ray source.

18. The system as recited in claim 1, wherein the first heterogeneous mix of materials includes one or more pieces of wrought aluminum and one or more pieces of cast aluminum, wherein the first classification distinguishes wrought aluminum from cast aluminum so that the first sorter is configured to sort the one or more pieces of wrought aluminum from the one or more pieces of cast aluminum.

19. The system as recited in claim 1, further comprising:
   a camera configured to produce image data of the homogenous set of samples of the first one of the materials; and
   the machine learning system configured to produce the first knowledge base containing the previously generated library of observed characteristics from the image data captured from the homogenous set of samples of the first one of the materials.

20. The system as recited in claim 1, wherein the machine learning system implements one or more machine learning algorithms configured to perform the assigning of the first classification to the first one of the materials as a function of the first knowledge base, wherein the first knowledge base contains parameters configured during a training stage to visually recognize the observed characteristics, wherein the training stage is configured to process a control sample of a plurality of the homogenous set of samples of the first one of the materials through the machine learning system in order to create the knowledge base.

* * * * *